United States Patent
Lewis

(10) Patent No.: US 11,178,043 B1
(45) Date of Patent: Nov. 16, 2021

(54) PRIORITIZED DATA ROUTING OVER MESSAGE BROKERING SYSTEM NETWORK FOR CONNECTED DEVICES

(71) Applicant: CenturyLink Intellectual Property LLC, Broomfield, CO (US)

(72) Inventor: Ronald A. Lewis, Montgomery, AL (US)

(73) Assignee: CenturyLink Intellectual Property LLC, Broomfield, CO (US)

( * ) Notice: Subject to any disclaimer, the term of this patent is extended or adjusted under 35 U.S.C. 154(b) by 0 days.

(21) Appl. No.: 17/037,258

(22) Filed: Sep. 29, 2020

Related U.S. Application Data

(60) Provisional application No. 63/068,066, filed on Aug. 20, 2020.

(51) Int. Cl.
| | | |
|---|---|---|
| H04L 12/721 | (2013.01) | |
| H04L 29/08 | (2006.01) | |
| H04L 12/715 | (2013.01) | |
| H04L 12/46 | (2006.01) | |

(52) U.S. Cl.
CPC .......... *H04L 45/12* (2013.01); *H04L 12/4633* (2013.01); *H04L 45/04* (2013.01); *H04L 67/2809* (2013.01); *H04L 2212/00* (2013.01)

(58) Field of Classification Search
CPC . H04L 45/12; H04L 12/4633; H04L 67/2809; H04L 45/04; H04L 2212/00
See application file for complete search history.

(56) References Cited

U.S. PATENT DOCUMENTS

| | | | |
|---|---|---|---|
| 10,554,604 B1* | 2/2020 | Burcham | H04L 51/20 |
| 2014/0201378 A1* | 7/2014 | Elliott | A63F 13/30 |
| | | | 709/227 |
| 2018/0167476 A1* | 6/2018 | Hoffner | H04L 67/26 |
| 2019/0215753 A1* | 7/2019 | Sathya | H04W 40/10 |
| 2019/0306124 A1* | 10/2019 | Bild | H04W 12/009 |
| 2020/0290657 A1* | 9/2020 | Eckelmann-Wendt | |
| | | | H04L 12/18 |

\* cited by examiner

*Primary Examiner* — Afshawn M Towfighi

(57) ABSTRACT

Novel tools and techniques are provided for implementing data routing over message brokering system network. In various embodiments, in response to receiving a request to transfer data from a source to a destination over a network, a computing system might map, and analyze the map of, messaging connections among two or more nodes among a plurality of nodes within a message brokering system to identify connection paths between the source associated with a first participant in the message brokering system and the destination associated with a second participant. The computing system might encapsulate information associated with each of the source (and/or the first participant), the destination (and/or the second participant), and data protocol in a header portion of at least one message batch, and might encapsulate and send the requested data distributed amongst payload portions of each of the at least one message batch transported via an identified connection path.

20 Claims, 13 Drawing Sheets

PRIORITIZED DATA ROUTING OVER MESSAGE BROKERING SYSTEM NETWORK FOR CONNECTED DEVICES

CROSS-REFERENCES TO RELATED APPLICATIONS

This application claims priority to U.S. Patent Application Ser. No. 63/068,066 (the "'066 Application"), filed Aug. 20, 2020 by Ronald A. Lewis, entitled, "Prioritized Data Routing Over Message Brokering System Network for Connected Devices," the disclosure of which is incorporated herein by reference in its entirety for all purposes.

This application may be related to U.S. patent application Ser. No. 17/037,280 (the "'280 Application"), filed Sep. 29, 2020 by Ronald A. Lewis, entitled, "Home Health Monitoring of Patients via Extension of Healthcare System Network into Customer Premises," which claims priority to U.S. Patent Application Ser. No. 63/068,072 (the "'072 Application"), filed Aug. 20, 2020 by Ronald A. Lewis, entitled, "Home Health Monitoring of Patients via Extension of Healthcare System Network into Customer Premises," the disclosure of each of which is incorporated herein by reference in its entirety for all purposes.

This application may also be related to U.S. patent application Ser. No. 16/363,918 (the "'918 Application"), filed Mar. 25, 2019 by Ronald A. Lewis, entitled, "Method and System for Implementing Intelligence Enabled Things (IET)," which claims priority to U.S. Patent Application Ser. No. 62/792,753 (the "'753 Application"), filed Jan. 15, 2019 by Ronald A. Lewis, entitled, "Method and System for Implementing Intelligence Enabled Things (IET)," the disclosure of each of which is incorporated herein by reference in its entirety for all purposes.

The respective disclosures of these applications/patents (which this document refers to collectively as the "Related Applications") are incorporated herein by reference in their entirety for all purposes.

COPYRIGHT STATEMENT

A portion of the disclosure of this patent document contains material that is subject to copyright protection. The copyright owner has no objection to the facsimile reproduction by anyone of the patent document or the patent disclosure as it appears in the Patent and Trademark Office patent file or records, but otherwise reserves all copyright rights whatsoever.

FIELD

The present disclosure relates, in general, to methods, systems, and apparatuses for implementing data routing over message brokering system network, and, more particularly, to methods, systems, and apparatuses for implementing data routing over message brokering system network for connected devices, in some cases, implementing prioritized data routing over message brokering system network for connected devices.

BACKGROUND

Conventionally, in response to receiving a request to transfer data from a first source to a first destination over a network, a data routing system might route the requested data through one or more nodes among a plurality of nodes over one or more data networks from a source device associated with the first source to a destination device associated with the first destination, in some cases, via a data routing path. Such data routing, however, is susceptible to at least one of latency issues, bandwidth constraints, network hand-off issues between or among networks that are owned and/or operated by different network service providers, and/or the like.

Hence, there is a need for more robust and scalable solutions for implementing data routing over message brokering system network, and, more particularly, to methods, systems, and apparatuses for implementing (prioritized) data routing over message brokering system network for connected devices.

BRIEF DESCRIPTION OF THE DRAWINGS

A further understanding of the nature and advantages of particular embodiments may be realized by reference to the remaining portions of the specification and the drawings, in which like reference numerals are used to refer to similar components. In some instances, a sub-label is associated with a reference numeral to denote one of multiple similar components. When reference is made to a reference numeral without specification to an existing sub-label, it is intended to refer to all such multiple similar components.

DETAILED DESCRIPTION OF CERTAIN EMBODIMENTS

Overview

Figure 1:
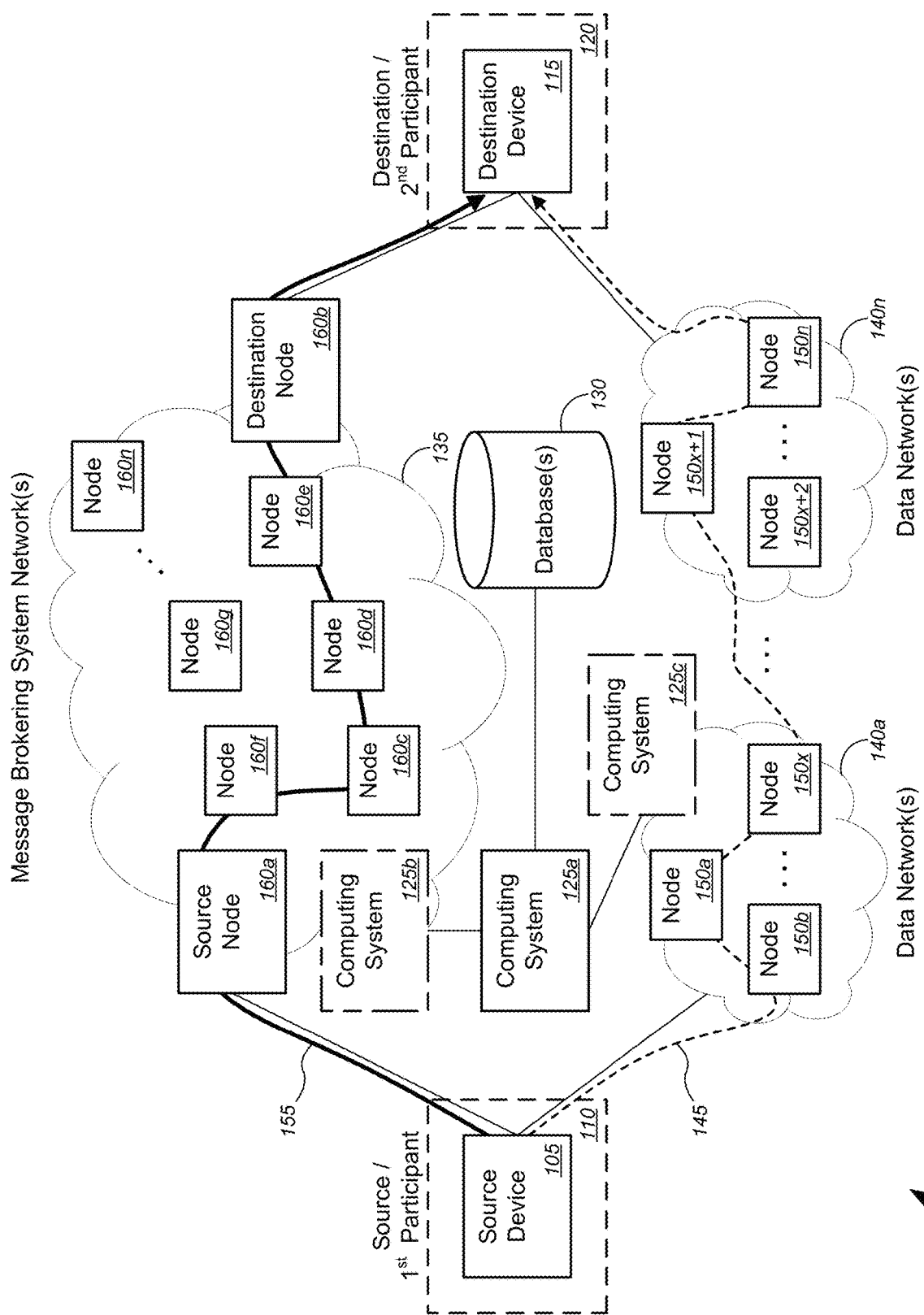
FIG. 1 is a schematic diagram illustrating a system for implementing data routing or prioritized data routing over message brokering system network for connected devices, in accordance with various embodiments.

Various embodiments provide tools and techniques for implementing data routing over message brokering system network, and, more particularly, to methods, systems, and apparatuses for implementing data routing over message brokering system network for connected devices, in some cases, implementing prioritized data routing over message brokering system network for connected devices.

In various embodiments, a computing system might receive a request to transfer data from a first source to a first destination over a network. In some instances, the request might be sent by the first source (or the source device) or might be sent by the first destination (or the destination device).

Rather than using data routing over data networks as is conventionally performed, the various embodiments adapt and utilize message brokering systems to route or redistribute data, by converting the data packets into data message batches. In some embodiments, the messaging brokering systems might be adapted with a hardware and/or software overlay (e.g., creating a special type of software defined network ("SDN"), or the like) that allows use of the messaging brokering systems (e.g., Apache Kafka® or Confluent® Platform, or the like) to act as a packet relay agent. In some cases, reduced instruction set computing ("RISC") architectures (such as ARM-based hardware) and/or software components, and/or the like, may be used to plug into the framework of the messaging brokering systems. The use of the message brokering systems, as described herein with respect to the various embodiments, allows one to sustain a maximum throughput (e.g., 4 Tbps or greater) across a highly distributed network without regard for network ownership, resulting in an "over-the-top ('OTT') network translation." In other words, rather than encapsulating network traffic and routing information in packet header and packet body, the packet information and payload are abstracted (in some cases, at the network layer and rewritten as OSI model layer 7 message)—with a consumer (i.e., the destination) and a producer (i.e., the source), along with header attributes (such as protocol, etc.), encapsulated in a message header. A message clustering solution of the message brokering systems is designed to manage the faster route between the consumer and the producer. The system also provides a registration process that allows consumers to sign up for the OTT routing capability.

In response to receiving the request to transfer data from the first source to the first destination over a network, the computing system might map messaging connections among two or more nodes among a plurality of nodes within the message brokering system or the message brokering system network(s), each node among the plurality of nodes being associated with a participant among a plurality of participants in the message brokering system. In some instances, the first source might be associated with the first participant among the plurality of participants and the first destination might be associated with the second participant among the plurality of participants. The computing system might analyze a map of messaging connections among the two or more nodes within the message brokering system or the message brokering system network(s) to identify a connection path between the first source associated with the first participant and the first destination associated with the second participant within the message brokering system.

The computing system might encapsulate first information associated with at least one of the first participant or the first source, second information associated with at least one of the second participant or the first destination, and third information regarding data protocol in a header portion of each of at least one first message batch transported using the message brokering system; might encapsulate the requested data distributed amongst payload portions of each of the at least one first message batch transported using the message brokering system or the message brokering system network(s); and might send the at least one first message batch from the first source associated with the first participant to the first destination associated with the second participant over the network via the message brokering system or the message brokering system network(s) over the identified connection path. Here, if the requested data can be contained within the payload portion of a single message batch, only a single message batch of the at least one first message batch may be used or sent from the first source associated with the first participant to the first destination associated with the second participant over the network via the message brokering system or the message brokering system network(s) over the identified connection path. However, if the requested data cannot be contained within the payload portion of a single message batch, the requested data is distributed across the payload portions of multiple message batches of the at least one first message batch (as described above) and the multiple message batches are subsequent sent from the first source associated with the first participant to the first destination associated with the second participant over the network via the message brokering system or the message brokering system network(s) over the identified connection path.

In some cases, the identified connection path might include routing through the plurality of nodes. According to some embodiments, encapsulating the first information, the second information, and the third information in the header portion of each of at least one first message batch and encapsulating the requested data distributed amongst payload portions of each of the at least one first message batch might occur at layer 7 or application layer of open systems interconnection ("OSI") model. The computing system might extract the requested data from the payload portions of the at least one first message batch after the first destination associated with the second participant has received the at least one first message batch via the message brokering system.

In some embodiments, identifying a connection path between the first source associated with the first participant and the first destination associated with the second participant within the message brokering system might comprise determining whether there is a direct connection between the first source associated with the first participant and the first destination associated with the second participant within the message brokering system. Based on a determination that there is a direct connection between the first source associated with the first participant and the first destination associated with the second participant within the message brokering system, the computing system might encapsulate first information associated with at least one of the first participant or the first source, second information associated with at least one of the second participant or the first destination, and third information regarding data protocol in a header portion of each of at least one first message batch transported using the message brokering system; might encapsulate the requested data distributed amongst payload portions of each of the at least one first message batch transported using the message brokering system; might send the at least one first message batch from the first source associated with the first participant to the first destination associated with the second participant over the network via the message brokering system; and might extract the requested data from the payload portions of the at least one first message batch after the first destination associated with the second participant has received the at least one first message batch via the message brokering system.

Based on a determination that there is no direct connection between the first source associated with the first participant and the first destination associated with the second participant within the message brokering system, the computing system might analyze the map of messaging connections among the two or more nodes within the message brokering system to identify one or more intermediate nodes or participants between the first source associated with the first participant and the first destination associated with the second participant within the message brokering system. Based on a determination that one or more intermediate nodes or participants between the first source associated with the first participant and the first destination associated with the second participant within the message brokering system have been identified, the computing system might encapsulate the first information associated with at least one of the first participant or the first source, the second information associated with at least one of the second participant or the first destination, the third information regarding data protocol, and fourth information associated with each of the one or more intermediate nodes or participants in a header portion of each of at least one second message batch transported using the message brokering system; might encapsulate the requested data distributed amongst payload portions of each of the at least one second message batch transported using the message brokering system; might send the at least one second message batch from the first source associated with the first participant to the first destination associated with the second participant via each of the one or more intermediate nodes over the network via the message brokering system; and might extract the requested data from the payload portions of the at least one second message batch after the first destination associated with the second participant has received the at least one second message batch via the message brokering system.

In some embodiments, the one or more intermediate nodes might include, but are not limited to, one or more of at least one first intermediate node each associated with a third participant among a plurality of third participants listed in a contact list of the first participant, at least one second intermediate node each associated with a fourth participant among a plurality of fourth participants listed in a contact list of the second participant, or at least one third intermediate node each associated with one of a fourth participant among a plurality of fourth participants listed in a contact list of a third participant or a fifth participant among a plurality of fifth participants listed in a contact list of a fourth participant, and/or the like. Alternatively, the one or more intermediate nodes might include, without limitation, one or more fourth intermediate nodes each not associated with any contact lists of the first participant, the second participant, and the third participants.

According to some embodiments, sending the at least one second message batch from the first source associated with the first participant to the first destination associated with the second participant via each of the one or more intermediate nodes over the network via the message brokering system might comprise the computing system causing the first source to publish the at least one second message batch; causing each of the one or more intermediate nodes, in turn, to subscribe to the at least one second message batch and to publish the at least one second message batch; and causing the first destination to subscribe to the at least one second message batch.

According to some embodiments, the system might take into account priority for data transfer. After encapsulating the first, second, and third information in the header portion of each of the at least one first message batch and after encapsulating the requested data distributed amongst the payload portions of each of the at least one first message batch, the computing system might determine whether the requested data comprises one or more sub-data having different priority levels. Based on a determination that one or more sub-data of the requested data have different priority levels, identifying, with the computing system, one or more first sub-data among the one or more sub-data that has the highest priority, the computing system might identify one or more first sub-data among the one or more sub-data that has the highest priority. In such cases, sending the at least one first message batch from the first source associated with the first participant to the first destination associated with the second participant over the network via the message brokering system over the identified connection path might comprise the computing system sending the identified one or more first sub-data having the highest priority ahead of the other sub-data (or in order of priority) among the one or more sub-data via the message brokering system over the identified connection path.

These and other aspects of the data routing or prioritized data routing over message brokering system network for connected devices are described in greater detail with respect to the figures.

The following detailed description illustrates a few exemplary embodiments in further detail to enable one of skill in the art to practice such embodiments. The described examples are provided for illustrative purposes and are not intended to limit the scope of the invention.

In the following description, for the purposes of explanation, numerous specific details are set forth in order to provide a thorough understanding of the described embodiments. It will be apparent to one skilled in the art, however, that other embodiments of the present invention may be practiced without some of these specific details. In other instances, certain structures and devices are shown in block diagram form. Several embodiments are described herein, and while various features are ascribed to different embodiments, it should be appreciated that the features described with respect to one embodiment may be incorporated with other embodiments as well. By the same token, however, no single feature or features of any described embodiment should be considered essential to every embodiment of the invention, as other embodiments of the invention may omit such features.

Unless otherwise indicated, all numbers used herein to express quantities, dimensions, and so forth used should be understood as being modified in all instances by the term "about." In this application, the use of the singular includes the plural unless specifically stated otherwise, and use of the terms "and" and "or" means "and/or" unless otherwise indicated. Moreover, the use of the term "including," as well as other forms, such as "includes" and "included," should be considered non-exclusive. Also, terms such as "element" or "component" encompass both elements and components comprising one unit and elements and components that comprise more than one unit, unless specifically stated otherwise.

Various embodiments described herein, while embodying (in some cases) software products, computer-performed methods, and/or computer systems, represent tangible, concrete improvements to existing technological areas, including, without limitation, data routing technology, message brokering technology, and/or the like. In other aspects, certain embodiments, can improve the functioning of user equipment or systems themselves (e.g., data routing systems and/or networks, message brokering systems and/or networks, etc.), for example, by receiving, with a computing system, a request to transfer data from a first source to a first destination over a network; mapping, with the computing system, messaging connections among two or more nodes among a plurality of nodes within a message brokering system, each node among the plurality of nodes being associated with a participant among a plurality of participants in the message brokering system, wherein the first source is associated with a first participant among the plurality of participants and the first destination is associated with a second participant among the plurality of participants; analyzing, with the computing system, a map of messaging connections among the two or more nodes within the message brokering system to identify a connection path between the first source associated with the first participant and the first destination associated with the second participant within the message brokering system; encapsulating, with the computing system, first information associated with at least one of the first participant or the first source, second information associated with at least one of the second participant or the first destination, and third information regarding data protocol in a header portion of each of at least one first message batch transported using the message brokering system; encapsulating, with the computing system, the requested data distributed amongst payload portions of each of the at least one first message batch transported using the message brokering system; sending, with the computing system, the at least one first message batch from the first source associated with the first participant to the first destination associated with the second participant over the network via the message brokering system over the identified connection path; and extracting, with the computing system, the requested data from the payload portions of the at least one first message batch after the first destination associated with the second participant has received the at least one first message batch via the message brokering system; and/or the like.

In particular, to the extent any abstract concepts are present in the various embodiments, those concepts can be implemented as described herein by devices, software, systems, and methods that involve specific novel functionality (e.g., steps or operations), such as, adapting the message brokering system to relay, route, or transport data from the source to the destination rather than relaying, routing, or transporting the data over conventional data networks, and/or the like, to name a few examples, that extend beyond mere conventional computer processing operations. These functionalities can produce tangible results outside of the implementing computer system, including, merely by way of example, optimized routing of data across the message brokering system network, providing for sustained maximum throughput (e.g., 4 Tbps or greater) across a highly distributed network without regard for network ownership, resulting in an "over-the-top ('OTT') network translation," and/or the like, at least some of which may be observed or measured by users, participants, and/or service providers.

In an aspect, a method might comprise receiving, with a computing system, a request to transfer data from a first source to a first destination over a network; mapping, with the computing system, messaging connections among two or more nodes among a plurality of nodes within a message brokering system, each node among the plurality of nodes being associated with a participant among a plurality of participants in the message brokering system, wherein the first source is associated with a first participant among the plurality of participants and the first destination is associated with a second participant among the plurality of participants; and analyzing, with the computing system, a map of messaging connections among the two or more nodes within the message brokering system to determine whether there is a direct connection between the first source associated with the first participant and the first destination associated with the second participant within the message brokering system.

The method might further comprise, based on a determination that there is a direct connection between the first source associated with the first participant and the first destination associated with the second participant within the message brokering system, performing the following: encapsulating, with the computing system, first information associated with at least one of the first participant or the first source, second information associated with at least one of the second participant or the first destination, and third information regarding data protocol in a header portion of each of at least one first message batch transported using the message brokering system; encapsulating, with the computing system, the requested data distributed amongst payload portions of each of the at least one first message batch transported using the message brokering system; sending, with the computing system, the at least one first message batch from the first source associated with the first participant to the first destination associated with the second participant over the network via the message brokering system; and extracting, with the computing system, the requested data from the payload portions of the at least one first message batch after the first destination associated with the second participant has received the at least one first message batch via the message brokering system.

The method might further comprise, based on a determination that there is no direct connection between the first source associated with the first participant and the first destination associated with the second participant within the message brokering system, performing the following: analyzing, with the computing system, the map of messaging connections among the two or more nodes within the message brokering system to identify one or more intermediate nodes or participants between the first source associated with the first participant and the first destination associated with the second participant within the message brokering system. The method might further comprise, based on a determination that one or more intermediate nodes or participants between the first source associated with the first participant and the first destination associated with the second participant within the message brokering system have been identified, performing the following: encapsulating, with the computing system, the first information associated with at least one of the first participant or the first source, the second information associated with at least one of the second participant or the first destination, the third information regarding data protocol, and fourth information associated with each of the one or more intermediate nodes or participants in a header portion of each of at least one second message batch transported using the message brokering system; encapsulating, with the computing system, the requested data distributed amongst payload portions of each of the at least one second message batch transported using the message brokering system; sending, with the computing system, the at least one second message batch from the first source associated with the first participant to the first destination associated with the second participant via each of the one or more intermediate nodes over the network via the message brokering system; and extracting, with the computing system, the requested data from the payload portions of the at least one second message batch after the first destination associated with the second participant has received the at least one second message batch via the message brokering system.

In another aspect, a method might comprise receiving, with a computing system, a request to transfer data from a first source to a first destination over a network; mapping, with the computing system, messaging connections among two or more nodes among a plurality of nodes within a message brokering system, each node among the plurality of nodes being associated with a participant among a plurality of participants in the message brokering system, wherein the first source is associated with a first participant among the plurality of participants and the first destination is associated with a second participant among the plurality of participants; and analyzing, with the computing system, a map of messaging connections among the two or more nodes within the message brokering system to identify a connection path between the first source associated with the first participant and the first destination associated with the second participant within the message brokering system.

The method might further comprise encapsulating, with the computing system, first information associated with at least one of the first participant or the first source, second information associated with at least one of the second participant or the first destination, and third information regarding data protocol in a header portion of each of at least one first message batch transported using the message brokering system; encapsulating, with the computing system, the requested data distributed amongst payload portions of each of the at least one first message batch transported using the message brokering system; sending, with the computing system, the at least one first message batch from the first source associated with the first participant to the first destination associated with the second participant over the network via the message brokering system over the identified connection path; and extracting, with the computing system, the requested data from the payload portions of the at least one first message batch after the first destination associated with the second participant has received the at least one first message batch via the message brokering system.

In some embodiments, the computing system might comprise at least one of a computing system of the message brokering system, a controller of the message brokering system, a zookeeper of the message brokering system, a data routing computing system, a network routing computing system, a server computer, a distributed computing system, or a cloud computing system, and/or the like.

According to some embodiments, identifying a connection path between the first source associated with the first participant and the first destination associated with the second participant within the message brokering system might comprise determining whether there is a direct connection between the first source associated with the first participant and the first destination associated with the second participant within the message brokering system. The method might further comprise, based on a determination that there is a direct connection between the first source associated with the first participant and the first destination associated with the second participant within the message brokering system, performing the following: encapsulating, with the computing system, first information associated with at least one of the first participant or the first source, second information associated with at least one of the second participant or the first destination, and third information regarding data protocol in a header portion of each of at least one first message batch transported using the message brokering system; encapsulating, with the computing system, the requested data distributed amongst payload portions of each of the at least one first message batch transported using the message brokering system; sending, with the computing system, the at least one first message batch from the first source associated with the first participant to the first destination associated with the second participant over the network via the message brokering system; and extracting, with the computing system, the requested data from the payload portions of the at least one first message batch after the first destination associated with the second participant has received the at least one first message batch via the message brokering system.

The method might further comprise, based on a determination that there is no direct connection between the first source associated with the first participant and the first destination associated with the second participant within the message brokering system, performing the following: analyzing, with the computing system, the map of messaging connections among the two or more nodes within the message brokering system to identify one or more intermediate nodes or participants between the first source associated with the first participant and the first destination associated with the second participant within the message brokering system. The method might further comprise, based on a determination that one or more intermediate nodes or participants between the first source associated with the first participant and the first destination associated with the second participant within the message brokering system have been identified, performing the following: encapsulating, with the computing system, the first information associated with at least one of the first participant or the first source, the second information associated with at least one of the second participant or the first destination, the third information regarding data protocol, and fourth information associated with each of the one or more intermediate nodes or participants in a header portion of each of at least one second message batch transported using the message brokering system; encapsulating, with the computing system, the requested data distributed amongst payload portions of each of the at least one second message batch transported using the message brokering system; sending, with the computing system, the at least one second message batch from the first source associated with the first participant to the first destination associated with the second participant via each of the one or more intermediate nodes over the network via the message brokering system; and extracting, with the computing system, the requested data from the payload portions of the at least one second message batch after the first destination associated with the second participant has received the at least one second message batch via the message brokering system.

In some embodiments, the one or more intermediate nodes might comprise one or more of at least one first intermediate node each associated with a third participant among a plurality of third participants listed in a contact list of the first participant, at least one second intermediate node each associated with a fourth participant among a plurality of fourth participants listed in a contact list of the second participant, or at least one third intermediate node each associated with one of a fourth participant among a plurality of fourth participants listed in a contact list of a third participant or a fifth participant among a plurality of fifth participants listed in a contact list of a fourth participant, and/or the like. Alternatively, the one or more intermediate nodes might comprise one or more fourth intermediate nodes each not associated with any contact lists of the first participant, the second participant, and the third participants. In some cases, sending the at least one second message batch from the first source associated with the first participant to the first destination associated with the second participant via each of the one or more intermediate nodes over the network via the message brokering system might comprise causing, with the computing system, the first source to publish the at least one second message batch; causing, with the computing system, each of the one or more intermediate nodes, in turn, to subscribe to the at least one second message batch and to publish the at least one second message batch; and causing, with the computing system, the first destination to subscribe to the at least one second message batch.

According to some embodiments, identifying a connection path between the first source associated with the first participant and the first destination associated with the second participant within the message brokering system might comprise identifying, with the computing system, a plurality of different candidate connection paths between the first source associated with the first participant and the first destination associated with the second participant within the message brokering system, based on analysis of the map of messaging connections among the two or more nodes within the message brokering system; determining, with the computing system, a bandwidth available over each sub-path for each candidate connection path among the plurality of different candidate connection paths between the first source associated with the first participant and the first destination associated with the second participant within the message brokering system; and selecting, with the computing system, a candidate connection path among the plurality of different candidate connection paths that best matches available bandwidth across each sub-path of the candidate connection path.

Alternatively, or additionally, identifying a connection path between the first source associated with the first participant and the first destination associated with the second participant within the message brokering system might comprise identifying, with the computing system, a plurality of different candidate connection paths between the first source associated with the first participant and the first destination associated with the second participant within the message brokering system, based on analysis of the map of messaging connections among the two or more nodes within the message brokering system; determining, with the computing system, at least one of a message transfer latency or a message transfer length over each sub-path for each candidate connection path among the plurality of different candidate connection paths between the first source associated with the first participant and the first destination associated with the second participant within the message brokering system; and selecting, with the computing system, a candidate connection path among the plurality of different candidate connection paths that provides the most optimal connection path between the first source associated with the first participant and the first destination associated with the second participant within the message brokering system in terms of at least one of time or distance.

In some embodiments, encapsulating the first information, the second information, and the third information in the header portion of each of at least one first message batch and encapsulating the requested data distributed amongst payload portions of each of the at least one first message batch might occur at layer 7 or application layer of open systems interconnection ("OSI") model.

According to some embodiments, the method might further comprise determining, with the computing system, whether the requested data comprises one or more sub-data having different priority levels; and based on a determination that one or more sub-data of the requested data have different priority levels, identifying, with the computing system, one or more first sub-data among the one or more sub-data that has the highest priority. In such cases, sending the at least one first message batch from the first source associated with the first participant to the first destination associated with the second participant over the network via the message brokering system over the identified connection path might comprise sending, with the computing system, the identified one or more first sub-data having the highest priority ahead of the other sub-data among the one or more sub-data via the message brokering system over the identified connection path.

In some embodiments, the plurality of participants might be people, wherein the plurality of nodes might comprise one of one or more user devices each associated with a participant, one or more proxy devices each associated with a participant, one or more virtual devices each associated with a participant, or one or more user accounts each associated with a participant, and/or the like.

Alternatively, the plurality of participants or the plurality of nodes might be connected devices, wherein the connected devices might comprise at least one of one or more Internet of things ("IoT") or IoT-capable devices, one or more intelligence enabled things ("IET") tagged objects, one or more user devices, one or more user interface devices, one or more network devices, one or more kitchen appliances, one or more household devices, one or more environmental control systems, one or more landscape maintenance systems, one or more device maintenance systems, one or more cleaning devices, one or more office devices, one or more communications devices, one or more lighting systems, one or more tools, one or more vehicles, one or more drones, or one or more sensors, and/or the like.

Alternatively, the plurality of nodes might comprise at least one patient device each associated with a patient and at least one healthcare device each associated with one or more healthcare providers, wherein the one or more healthcare providers might comprise at least one of a physician, a doctor, a surgeon, a nurse practitioner, a nurse, a medical assistant, a clinical receptionist, a pharmacist, a medical laboratory technician, a healthcare scheduler, or a health insurance agent, and/or the like. In some cases, the at least one patient device might comprise at least one of one or more health monitoring devices, one or more personal tracking devices, an insulin pump, a pace maker, a drug delivery device, a drug storage and dispensing device, or one or more patient user devices, and/or the like. The at least one healthcare device might comprise at least one of a healthcare server, an electronic medical record ("EMR") system, an electronic health record ("EHR") system, or one or more healthcare provider user devices, and/or the like. According to some embodiments, the first source might comprise the at least one patient device, wherein the first destination might comprise the at least one healthcare device, wherein the requested data might comprise at least one of data regarding physiology of the patient, health tracking data of the patient, or data regarding a health alert associated with the patient, and/or the like. Alternatively, the first source might comprise the at least one healthcare device, wherein the first destination might comprise the at least one patient device, wherein the requested data might comprise at least one of data regarding drug prescriptions for the patient, data regarding fitness regime, or data regarding diet, and/or the like.

In yet another aspect, a system might comprise a computing system, which might comprise at least one first processor and a first non-transitory computer readable medium communicatively coupled to the at least one first processor. The first non-transitory computer readable medium might have stored thereon computer software comprising a first set of instructions that, when executed by the at least one first processor, causes the computing system to: receive a request to transfer data from a first source to a first destination over a network; map messaging connections among two or more nodes among a plurality of nodes within a message brokering system, each node among the plurality of nodes being associated with a participant among a plurality of participants in the message brokering system, wherein the first source is associated with a first participant among the plurality of participants and the first destination is associated with a second participant among the plurality of participants; analyze a map of messaging connections among the two or more nodes within the message brokering system to identify a connection path between the first source associated with the first participant and the first destination associated with the second participant within the message brokering system; encapsulate first information associated with at least one of the first participant or the first source, second information associated with at least one of the second participant or the first destination, and third information regarding data protocol in a header portion of each of at least one first message batch transported using the message brokering system; encapsulate the requested data distributed amongst payload portions of each of the at least one first message batch transported using the message brokering system; send the at least one first message batch from the first source associated with the first participant to the first destination associated with the second participant over the network via the message brokering system over the identified connection path; and extract the requested data from the payload portions of the at least one first message batch after the first destination associated with the second participant has received the at least one first message batch via the message brokering system.

In some embodiments, the computing system might comprise at least one of a computing system of the message brokering system, a controller of the message brokering system, a zookeeper of the message brokering system, a data routing computing system, a network routing computing system, a server computer, a distributed computing system, or a cloud computing system, and/or the like.

Various modifications and additions can be made to the embodiments discussed without departing from the scope of the invention. For example, while the embodiments described above refer to particular features, the scope of this invention also includes embodiments having different combination of features and embodiments that do not include all of the above described features.

Specific Exemplary Embodiments

We now turn to the embodiments as illustrated by the drawings. FIGS. 1-6 illustrate some of the features of the method, system, and apparatus for implementing data routing over message brokering system network, and, more particularly, to methods, systems, and apparatuses for implementing data routing or prioritized data routing over message brokering system network for connected devices, as referred to above. The methods, systems, and apparatuses illustrated by FIGS. 1-6 refer to examples of different embodiments that include various components and steps, which can be considered alternatives or which can be used in conjunction with one another in the various embodiments. The description of the illustrated methods, systems, and apparatuses shown in FIGS. 1-6 is provided for purposes of illustration and should not be considered to limit the scope of the different embodiments.

With reference to the figures, FIG. 1 is a schematic diagram illustrating a system 100 for implementing data routing or prioritized data routing over message brokering system network for connected devices, in accordance with various embodiments.

In the non-limiting embodiment of FIG. 1, system 100 might comprise a source device 105 associated with a source or a first participant 110 and a destination device 115 associated with a destination or a second participant 120. System 100 might further comprise one or more computing systems 125a-125c (collectively, "computing systems 125" or the like), a database(s) 130, a message brokering system or a message brokering system network(s) 135, one or more data networks 140a-140n (collectively, "data networks 140" or the like), and/or the like. In some embodiments, the one or more computing systems 125 might include, without limitation, at least one of a computing system of the message brokering system, a controller of the message brokering system, a zookeeper of the message brokering system, a data routing computing system, a network routing computing system, a server computer, a distributed computing system, or a cloud computing system, and/or the like. In some cases, computing system 125a might be external to both the message brokering system network(s) 135 and the data networks 140, while computing system 125b might be at least one of the computing system of the message brokering system, the controller of the message brokering system, or the zookeeper of the message brokering system, and/or the like, and computing system 125c might be at least one of the data routing computing system, the network routing computing system, or the server computer, and/or the like. In some instances, the database(s) 130 might store at least one of routing information across data networks 140a-140n, status information regarding nodes 150a-150n in the data networks 140a-140n, routing information across message brokering system network(s) 135, or status information regarding nodes 160a-160n in the message brokering system network(s) 135, and/or the like.

In some aspects, computing system 125a, computing system 125b, and/or computing system 125c (collectively, "computing system" or the like) might receive a request to transfer data from a first source (e.g., source 110) to a first destination (e.g., destination 120) over a network. In some instances, the request might be sent by the first source (or the source device) or might be sent by the first destination (or the destination device). Conventionally, the computing system might route the requested data through one or more nodes 150 among a plurality of nodes 150a-150n over the one or more data networks 140a-140n from the source device 105 associated with the source or the first participant 110 to the destination device 115 associated with the destination or the second participant 120, in some cases, via a data routing path 145 through the plurality of nodes 150a-150n (e.g., through node 150b, node 150a, node 150x, node 150x+1, and node 150n, as shown in the non-limiting example of FIG. 1), depicted by dashed-lined arrow 145. Such data routing, however, is susceptible to at least one of latency issues, bandwidth constraints, network hand-off issues between or among networks that are owned and/or operated by different network service providers, and/or the like.

Rather than using data routing over data networks, the various embodiments adapt and utilize message brokering systems to route or redistribute data, by converting the data packets into data message batches. In some embodiments, the messaging brokering systems might be adapted with a hardware and/or software overlay (e.g., creating a special type of software defined network ("SDN"), or the like) that allows use of the messaging brokering systems (e.g., Apache Kafka® or Confluent® Platform, or the like) to act as a packet relay agent. In some cases, reduced instruction set computing ("RISC") architectures (such as ARM-based hardware) and/or software components, and/or the like, may be used to plug into the framework of the messaging brokering systems. The use of the message brokering systems, as described herein with respect to the various embodiments, allows one to sustain a maximum throughput (e.g., 4 Tbps or greater) across a highly distributed network without regard for network ownership, resulting in an "over-the-top ('OTT') network translation." In other words, rather than encapsulating network traffic and routing information in packet header and packet body, the packet information and payload are abstracted (in some cases, at the network layer and rewritten as OSI model layer 7 message)—with a consumer (i.e., the destination) and a producer (i.e., the source), along with header attributes (such as protocol, etc.), encapsulated in a message header. A message clustering solution of the message brokering systems is designed to manage the faster route between the consumer and the producer. The system also provides a registration process that allows consumers to sign up for the OTT routing capability.

In operation, in response to receiving the request to transfer data from the first source (e.g., source 110) to the first destination (e.g., destination 120) over a network, the computing system might map messaging connections among two or more nodes 160 among a plurality of nodes 160a-160n within the message brokering system or the message brokering system network(s) 135, each node 160 among the plurality of nodes 160a-160n being associated with a participant among a plurality of participants in the message brokering system 135. In some instances, the first source 110 might be associated with the first participant 110 among the plurality of participants and the first destination 120 might be associated with the second participant 120 among the plurality of participants. The computing system might analyze a map of messaging connections among the two or more nodes 160 within the message brokering system or the message brokering system network(s) 135 to identify a connection path between the first source associated with the first participant and the first destination associated with the second participant within the message brokering system.

The computing system might encapsulate first information associated with at least one of the first participant or the first source, second information associated with at least one of the second participant or the first destination, and third information regarding data protocol in a header portion of each of at least one first message batch transported using the message brokering system; might encapsulate the requested data distributed amongst payload portions of each of the at least one first message batch transported using the message brokering system or the message brokering system network(s) 135; and might send the at least one first message batch from the first source associated with the first participant to the first destination associated with the second participant over the network via the message brokering system or the message brokering system network(s) 135 over the identified connection path. Here, if the requested data can be contained within the payload portion of a single message batch, only a single message batch of the at least one first message batch may be used or sent from the first source associated with the first participant to the first destination associated with the second participant over the network via the message brokering system or the message brokering system network(s) 135 over the identified connection path. However, if the requested data cannot be contained within the payload portion of a single message batch, the requested data is distributed across the payload portions of multiple message batches of the at least one first message batch (as described above) and the multiple message batches are subsequent sent from the first source associated with the first participant to the first destination associated with the second participant over the network via the message brokering system or the message brokering system network(s) 135 over the identified connection path.

In some cases, the identified connection path 155 might include routing through the plurality of nodes 160a-160n (e.g., through source node 160a associated with the source device 105, node 160f, node 160c, node 160d, node 160e, and destination node 160b associated with the destination device 115, as shown in the non-limiting example of FIG. 1), depicted by bold solid arrow 155. According to some embodiments, encapsulating the first information, the second information, and the third information in the header portion of each of at least one first message batch and encapsulating the requested data distributed amongst payload portions of each of the at least one first message batch might occur at layer 7 or application layer of open systems interconnection ("OSI") model. The computing system might extract the requested data from the payload portions of the at least one first message batch after the first destination associated with the second participant has received the at least one first message batch via the message brokering system.

In some embodiments, identifying a connection path between the first source associated with the first participant and the first destination associated with the second participant within the message brokering system might comprise determining whether there is a direct connection between the first source associated with the first participant and the first destination associated with the second participant within the message brokering system. Based on a determination that there is a direct connection between the first source associated with the first participant and the first destination associated with the second participant within the message brokering system, the computing system might encapsulate first information associated with at least one of the first participant or the first source, second information associated with at least one of the second participant or the first destination, and third information regarding data protocol in a header portion of each of at least one first message batch transported using the message brokering system; might encapsulate the requested data distributed amongst payload portions of each of the at least one first message batch transported using the message brokering system; might send the at least one first message batch from the first source associated with the first participant to the first destination associated with the second participant over the network via the message brokering system; and might extract the requested data from the payload portions of the at least one first message batch after the first destination associated with the second participant has received the at least one first message batch via the message brokering system.

Based on a determination that there is no direct connection between the first source associated with the first participant and the first destination associated with the second participant within the message brokering system, the computing system might analyze the map of messaging connections among the two or more nodes within the message brokering system to identify one or more intermediate nodes or participants between the first source associated with the first participant and the first destination associated with the second participant within the message brokering system. Based on a determination that one or more intermediate nodes or participants between the first source associated with the first participant and the first destination associated with the second participant within the message brokering system have been identified, the computing system might encapsulate the first information associated with at least one of the first participant or the first source, the second information associated with at least one of the second participant or the first destination, the third information regarding data protocol, and fourth information associated with each of the one or more intermediate nodes or participants in a header portion of each of at least one second message batch transported using the message brokering system; might encapsulate the requested data distributed amongst payload portions of each of the at least one second message batch transported using the message brokering system; might send the at least one second message batch from the first source associated with the first participant to the first destination associated with the second participant via each of the one or more intermediate nodes over the network via the message brokering system; and might extract the requested data from the payload portions of the at least one second message batch after the first destination associated with the second participant has received the at least one second message batch via the message brokering system.

In some embodiments, the one or more intermediate nodes (e.g., nodes 160c-160n, or the like) might include, but are not limited to, one or more of at least one first intermediate node each associated with a third participant among a plurality of third participants listed in a contact list of the first participant, at least one second intermediate node each associated with a fourth participant among a plurality of fourth participants listed in a contact list of the second participant, or at least one third intermediate node each associated with one of a fourth participant among a plurality of fourth participants listed in a contact list of a third participant or a fifth participant among a plurality of fifth participants listed in a contact list of a fourth participant, and/or the like. Alternatively, the one or more intermediate nodes (e.g., nodes 160c-160n, or the like) might include, without limitation, one or more fourth intermediate nodes each not associated with any contact lists of the first participant, the second participant, and the third participants.

According to some embodiments, sending the at least one second message batch from the first source associated with the first participant to the first destination associated with the second participant via each of the one or more intermediate nodes over the network via the message brokering system might comprise the computing system causing the first source to publish the at least one second message batch; causing each of the one or more intermediate nodes, in turn, to subscribe to the at least one second message batch and to publish the at least one second message batch; and causing the first destination to subscribe to the at least one second message batch.

In some embodiments, a connection path may be identified according to various different implementations. For example, identifying a connection path between the first source associated with the first participant and the first destination associated with the second participant within the message brokering system might comprise the computing system identifying a plurality of different candidate connection paths between the first source associated with the first participant and the first destination associated with the second participant within the message brokering system, based on analysis of the map of messaging connections among the two or more nodes within the message brokering system; determining a bandwidth available over each sub-path for each candidate connection path among the plurality of different candidate connection paths between the first source associated with the first participant and the first destination associated with the second participant within the message brokering system; and selecting a candidate connection path among the plurality of different candidate connection paths that best matches available bandwidth across each sub-path of the candidate connection path.

Alternatively, identifying a connection path between the first source associated with the first participant and the first destination associated with the second participant within the message brokering system might comprise the computing system identifying a plurality of different candidate connection paths between the first source associated with the first participant and the first destination associated with the second participant within the message brokering system, based on analysis of the map of messaging connections among the two or more nodes within the message brokering system; determining at least one of a message transfer latency or a message transfer length over each sub-path for each candidate connection path among the plurality of different candidate connection paths between the first source associated with the first participant and the first destination associated with the second participant within the message brokering system; and selecting a candidate connection path among the plurality of different candidate connection paths that provides the most optimal connection path between the first source associated with the first participant and the first destination associated with the second participant within the message brokering system in terms of at least one of time or distance.

According to some embodiments, the system might take into account priority for data transfer. After encapsulating the first, second, and third information in the header portion of each of the at least one first message batch and after encapsulating the requested data distributed amongst the payload portions of each of the at least one first message batch, the computing system might determine whether the requested data comprises one or more sub-data having different priority levels. Based on a determination that one or more sub-data of the requested data have different priority levels, identifying, with the computing system, one or more first sub-data among the one or more sub-data that has the highest priority, the computing system might identify one or more first sub-data among the one or more sub-data that has the highest priority. In such cases, sending the at least one first message batch from the first source associated with the first participant to the first destination associated with the second participant over the network via the message brokering system over the identified connection path might comprise the computing system sending the identified one or more first sub-data having the highest priority ahead of the other sub-data (or in order of priority) among the one or more sub-data via the message brokering system over the identified connection path.

Figure 3A:
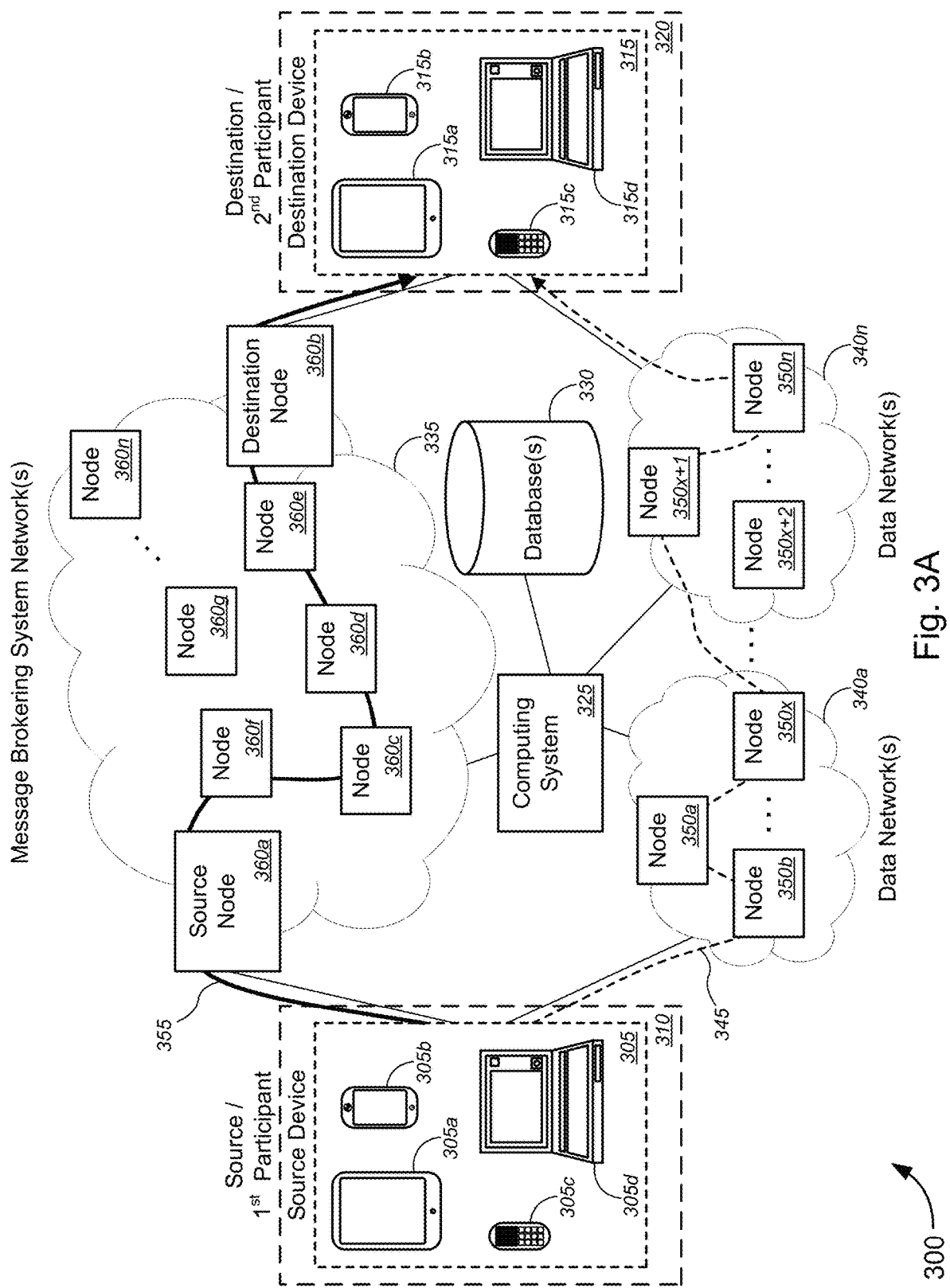
FIGS. 3A-3C are schematic diagrams illustrating various non-limiting examples of implementations for data routing or prioritized data routing over message brokering system network for connected devices, in accordance with various embodiments.

Merely by way of example, in some cases, the plurality of participants might be people (such as shown in FIG. 3A, or the like), wherein the plurality of nodes might include, without limitation, one of one or more user devices each associated with a participant, one or more proxy devices each associated with a participant, one or more virtual devices each associated with a participant, or one or more user accounts each associated with a participant, and/or the like.

Figure 3B:
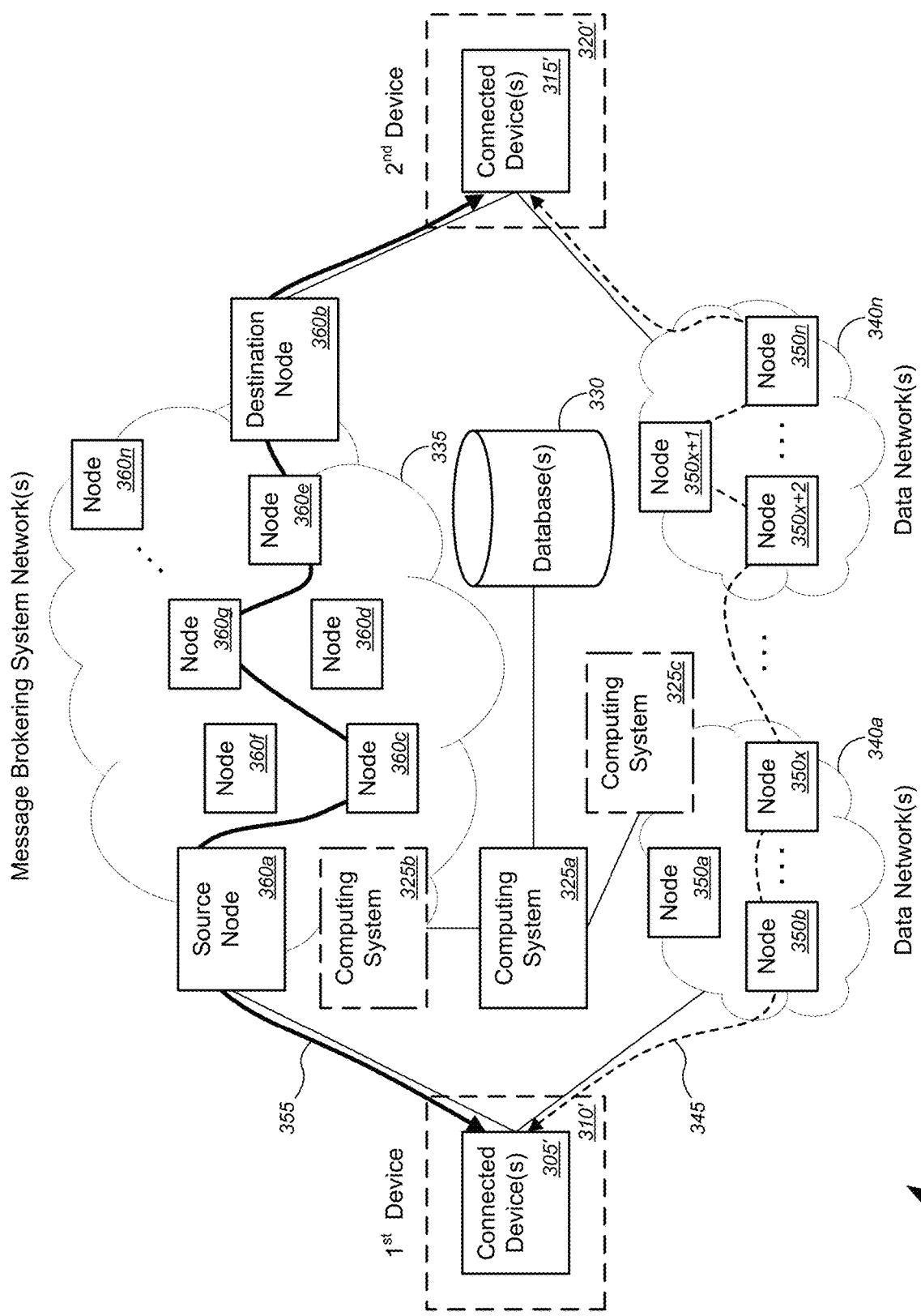

Alternatively, the plurality of participants or the plurality of nodes might be connected devices (such as shown in FIG. 3B, or the like), wherein the connected devices might include, but are not limited to, at least one of one or more Internet of things ("IoT") or IoT-capable devices, one or more intelligence enabled things ("IET") tagged objects, one or more user devices (as described in detail in the '918 Application, which has already been incorporated herein by reference in its entirety for all purposes), one or more user interface devices, one or more network devices, one or more kitchen appliances, one or more household devices, one or more environmental control systems, one or more landscape maintenance systems, one or more device maintenance systems, one or more cleaning devices, one or more office devices, one or more communications devices, one or more lighting systems, one or more tools, one or more vehicles, one or more drones, or one or more sensors, and/or the like.

According to some embodiments, the one or more IoT-capable devices and/or the one or more household devices might comprise one or more IoT-capable sensors, and/or might further include, without limitation, a desktop computer, a laptop computer, a tablet computer, a smart phone, a mobile phone, a portable gaming device, a database or data storage device, a network access point ("NAP"), a television or monitor, a set-top box ("STB"), a gaming console, an image capture device, a video capture device, a time piece (including, without limitation, a clock, a watch, or other time piece, and the like), a thermostat or environmental control system, a kitchen appliance (e.g., among the one or more kitchen appliances) (including, but not limited to, a microwave oven, a refrigerator, an oven, a range, a stove, an induction cooktop, a pressure cooker, a rice cooker, a bread maker, a coffee machine, a kettle, a dishwasher, a food thermometer, and/or the like), a medical device, a telephone system, a speaker, a media recording and/or playback device, a lighting system, a customer premises security control system, one or more dedicated remote control devices, one or more universal remote control devices, and/or other IoT-capable devices. In some cases, the other IoT-capable devices might include, without limitation, a personal digital assistant, a fitness tracking device, a printer, a scanner, an image projection device, a video projection device, a household appliance, a vehicle, an audio headset, earbuds, virtual reality goggles or headset, augmented reality goggles or headset, a door unlocking/locking system, an automated door opening/closing system, a window locking system, an automated window opening or closing system, an automated window covering control system, a smart window, a solar cell or solar cell array, an electrical outlet or smart node, a power strip or bar, a dimmer switch, a data port, a sprinkler system, exercise equipment, and/or the like.

The one or more IoT-capable devices and/or the one or more household devices might further include, but are not limited to, one or more of a furnace, an air conditioner, one or more automated skylight opening or closing systems, one or more humidifiers, one or more dehumidifiers one or more ventilation fans, one or more automated lawn mowers, one or more automated trimmers, one or more sprinkler systems, one or more fertilizer dispensers, one or more animal deterrent systems, one or more automated snow shovels, one or more automated snow blowers, one or more animal deterrent systems, one or more speakers warning people about machinery in use, one or more lights or display devices warning people about machinery in use, one or more de-icing machines, one or more heating mats, one or more built-in radiant heat systems under the at least one pathway, one or more drones with mounted heat lamps, one or more automated vacuum machines, one or more automated sweeping machines, one or more automated mopping machines, one or more drones with dusting tool, one or more aerial drones with vacuuming tool, one or more aerial drones with wiping tool, one or more air purifiers, one or more air filters, one or more electrostatic particulate collecting tools, a washing machine, a clothes dryer, one or more drones transferring clothes to one or more hampers, one or more drones sorting which clothes go into which hampers based on cleaning requirements for each article of clothing, one or more drones transferring clothes from each hamper into the washing machine, one or more drones transferring clothes from the washing machine into the clothes dryer, one or more drones transferring clothes from the clothes dryer to a clean laundry surface, one or more drones folding and stacking clothes, one or more drones with steamer tool, one or more drones with clothes hanging tool, a fire suppression system, one or more emergency exit markers, one or more exit route markers, one or more lights (e.g., LEDs, indicator lights, warning lights, etc.), one or more fire suppression drones, one or more white noise generators, and/or the like.

Merely by way of example, in some instances, the one or more vehicles might include, but are not limited to, a car, minivan, pickup truck, a motorcycle, an all-terrain vehicle, a scooter, a police vehicle, a fire engine, an ambulance, a recreational vehicle, a semi-tractor-trailer truck, a commercial truck, a bus, a boat, a ship, a submersible, an amphibious vehicle, an airplane, a helicopter, a space vehicle, and/or the like. In some instances, the one or more sensors or one or more IoT-capable sensors might include, without limitation, one or more temperature sensors (e.g., heat sensors, infrared sensors, thermometers, etc.), one or more light sensors (e.g., ambient light sensors, luminosity sensors, illuminance sensors, solar light sensors, etc.), one or more proximity sensors (e.g., vehicle camera-based collision avoidance system, the vehicle radar-based proximity detection system, the vehicle lidar-based proximity detection system, the vehicle sonar-based proximity detection system, etc.), one or more speed sensors, one or more cameras, one or more fuel level sensors (e.g., gasoline tank level sensors, diesel tank level sensors, battery charge level sensors, etc.), one or more location sensors (e.g., global positioning system ("GPS") devices, global navigation satellite system ("GNSS") devices, other location sensors, etc.), one or more other sensors, and/or the like. In some cases, the one or more other sensors might include, but are not limited to, one or more brake sensors, one or more air quality sensors, one or more carbon monoxide sensors, one or more smoke detectors, one or more fluid leak detectors, one or more contact sensors (e.g., for the door lock system, the hood ajar detector, the trunk ajar detector, the moon/sky light ajar detector, the window open detector, and/or the like), one or more audio sensors, one or more accelerometers, one or more telecommunications signal sensors, one or more tire pressure sensors, an engine temperature sensor, one or more fluid leak detectors, one or more occupant sensors, one or more impact sensors, or one or more suspension system diagnostic sensors, and/or the like.

According to some embodiments, the one or more IET tagged objects, when assembled, might form part of one of a building, a tower, a tunnel, a bridge, a railway, a road, an industrial facility, a parking structure, an aqueduct, a viaduct, a canal, a dam, a waterfront structure, or a retaining wall, and/or the like. In such cases, the one or more IET tagged objects might include, without limitation, at least one of one or more bricks, one or more stone blocks, one or more support frame components, one or more roofing components, one or more building structure support pieces, one or more heating, ventilation, and air conditioning ("HVAC") components, one or more railing pieces, one or more wood planks, one or more wood blocks, one or more screws, one or more nails, one or more rivets, one or more bolts, one or more nuts, one or more hinges, one or more brackets, one or more door handle pieces, one or more door lock pieces, one or more drywall pieces, one or more ceiling components, one or more floor tiles, one or more flooring planks, one or more concrete blocks, one or more window frame pieces, one or more window component pieces, one or more doorway pieces, one or more door component pieces, one or more gateway pieces, one or more gate component pieces, one or more fence post pieces, one or more fence components, one or more premises security components, one or more gas conduit pieces, one or more water pipe pieces, one or more plumbing component pieces, one or more electrical wires, one or more electrical conduit pieces, one or more electrical sockets, one or more lighting component pieces, one or more appliance hookup pieces, one or more pump system components, one or more stairway components, one or more elevator structural component, one or more elevator component pieces, one or more escalator structural component, one or more escalator component pieces, one or more siding components, one or more façade pieces, one or more pillar component pieces, one or more pathway component pieces, or one or more shading component pieces, and/or the like.

Figure 3C:
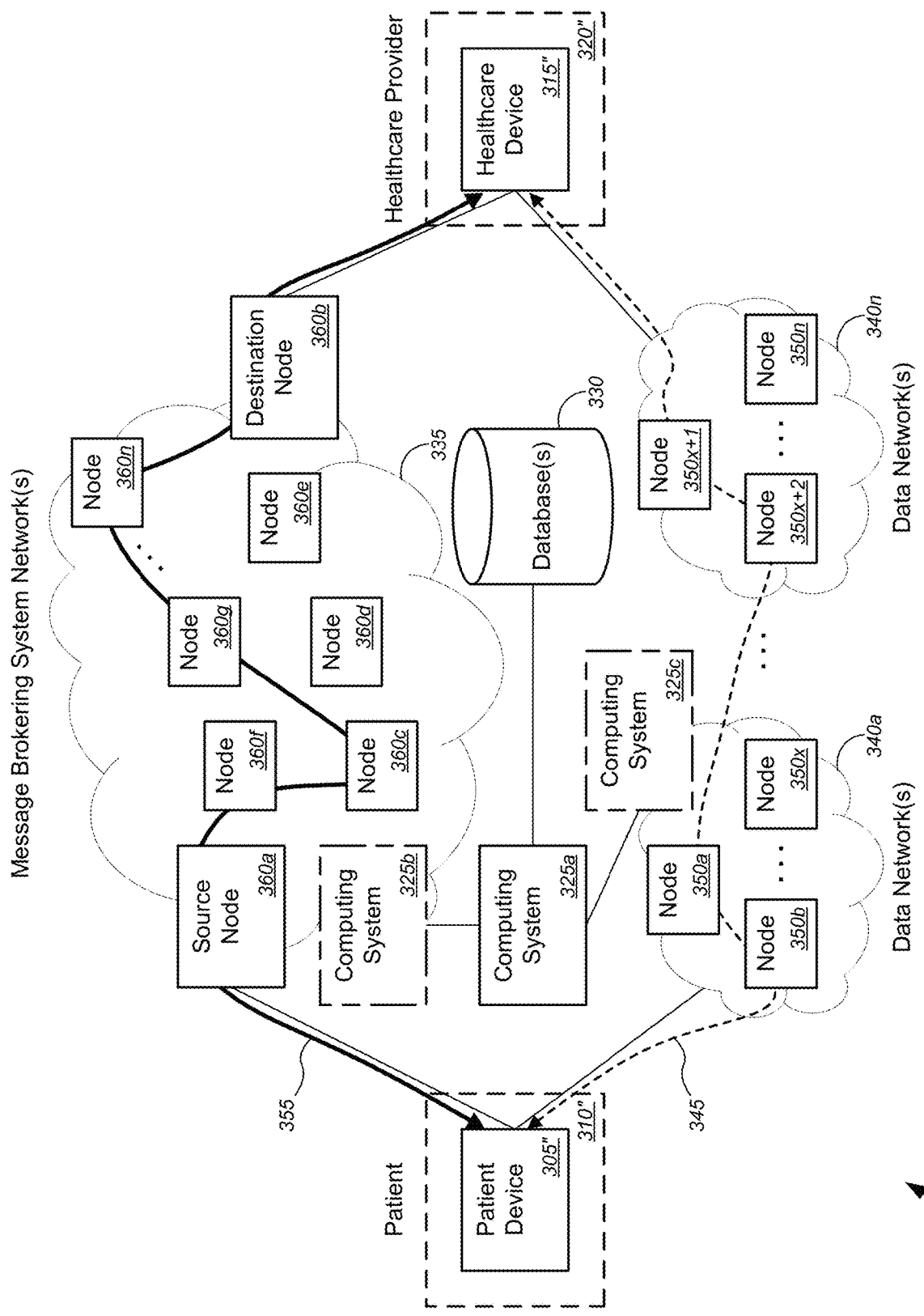

Alternatively, the plurality of nodes might include, without limitation, at least one patient device each associated with a patient and at least one healthcare device each associated with one or more healthcare providers (such as shown in FIG. 3C, or the like), wherein the one or more healthcare providers might include, but is not limited to, at least one of a physician, a doctor, a surgeon, a nurse practitioner, a nurse, a medical assistant, a clinical receptionist, a pharmacist, a medical laboratory technician, a healthcare scheduler, or a health insurance agent, and/or the like. In some embodiments, the at least one patient device might include, without limitation, at least one of one or more health monitoring devices, one or more personal tracking devices, an insulin pump, a pace maker, a drug delivery device, a drug storage and dispensing device, or one or more patient user devices, and/or the like, wherein the at least one healthcare device might include, but is not limited to, at least one of a healthcare server, an electronic medical record ("EMR") system, an electronic health record ("EHR") system, or one or more healthcare provider user devices, and/or the like. In some cases, the first source might comprise the at least one patient device, wherein the first destination might comprise the at least one healthcare device, wherein the requested data might include, without limitation, at least one of data regarding physiology of the patient, health tracking data of the patient, or data regarding a health alert associated with the patient, and/or the like. Alternatively, the first source might be the at least one healthcare device, wherein the first destination might be the at least one patient device, wherein the requested data might include, but is not limited to, at least one of data regarding drug prescriptions for the patient, data regarding fitness regime, or data regarding diet, and/or the like.

In some embodiments, the one or more health monitoring devices, the one or more personal tracking devices, and/or the one or more patient user devices might comprise one or more first sensors that monitor physical conditions of a body of the patient and/or one or more second sensors that monitor environmental conditions external to the body of the patient. In some cases, the one or more health monitoring devices, the one or more personal tracking devices, and/or the one or more patient user devices might be a wearable device that can be removably affixed to at least one of a portion of skin of the patient, a limb of the patient, an appendage of the patient, a torso of the patient, a head of the patient, or a piece of clothing worn by the patient, and/or the like. Alternatively, the one or more health monitoring devices, the one or more personal tracking devices, and/or the one or more patient user devices might be an implantable device that can be at least one of implanted under one or more layers of skin of the patient, implanted within an organ of the patient, implanted within a torso of the patient, implanted in an internal cavity of the patient, or implanted in an external cavity of the patient, and/or the like. In some embodiments, multiple devices among the one or more health monitoring devices, the one or more personal tracking devices, and/or the one or more patient user devices may be used to monitor the physiological conditions of the patient's body and/or to monitor the environmental conditions external to the patient's body, and can comprise either a plurality of wearable personal trackers, a plurality of implantable personal trackers, or a combination of at least one wearable personal tracker and at least one implantable personal tracker.

Herein, "personal tracker" or "personal tracking device" might refer to at least one of a fitness tracker, an activity tracker, a medical monitor, an environmental safety monitor, and/or the like. The fitness tracker, activity tracker, and medical monitor might be worn by, or implanted in, any person or by a patient under the care of a physician or other doctor. The environmental safety monitor might be worn by, or implanted in, people entering or working in hazardous environments, including, but not limited to, miners, astronauts, test pilots, emergency responders, deep sea explorers, oil rig workers, construction workers, volcanologists, onsite meteorologists (e.g., stormchasers, etc.), nuclear facility operators, nuclear clean-up crew members, submersible crew members, military combatants, law enforcement officers, peacekeepers, mountain climbers, canyoneers, cavers, and/or the like.

In some aspects, in some embodiments, the one or more health monitoring devices, the one or more personal tracking devices, and/or the one or more patient user devices might include, without limitation, at least one of a wearable drug delivery device, an implantable drug delivery device, a medical server, a medical database, a user device accessible by a physician, a user device accessible by a healthcare provider, a user device associated with the user, a user device associated with a relative or guardian of the user, a user device accessible by an emergency response team member, a smart medical alert bracelet, an IoT management node, an IoT human interface device, an IoT vehicle node, one or more household devices, one or more office devices, one or more lighting systems, one or more environmental control systems, one or more speakers, one or more display devices, or one or more communications systems, and/or the like.

According to some embodiments, the one or more first sensors might include, without limitation, at least one of a heart rate monitor, a pulse oximeter, an oximeter, a blood glucose monitor, a blood pressure monitor, a blood flow monitor, a nitrogen monitor, a carbon dioxide monitor, a sleep monitor, an activity monitor, a step counter, one or more limb movement monitors, one or more thermometers, one or more accelerometers, one or more gyroscopes, one or more body fat monitors, one or more body muscle monitors, one or more bone density monitors, one or more pH monitors, a body fluid monitor, an electroencephalograph, an electrocardiograph, a respiratory rate monitor, a serotonin monitor, an epilepsy monitor, a skin toxicity monitor, a blood toxicity monitor, an organ toxicity monitor, a cancer monitor, a blood tester, one or more blood alcohol level detectors, one or more drug testers, or one or more location monitors, and/or the like.

In some embodiments, the one or more second sensors might include, but are not limited to, at least one of an ambient temperature sensor, a flame detector, a particulate sensor, a light sensor, a humidity sensor, an air quality sensor, an atmospheric oxygen level monitor, an atmospheric carbon dioxide level monitor, an atmospheric nitrogen level monitor, an atmospheric pressure sensor, an environmental carbon monoxide sensor, a smoke detector, a gas toxicity monitor, a carcinogen detector, a radiation sensor, a location sensor, a telecommunications signal sensor, a sound amplitude sensor, a frequency sensor, an accelerometer, a proximity sensor, a weather sensor, or a seismic sensor, and/or the like.

These and other functions of the system 100 (and its components) are described in greater detail below with respect to FIGS. 2-4.

Figure 2:
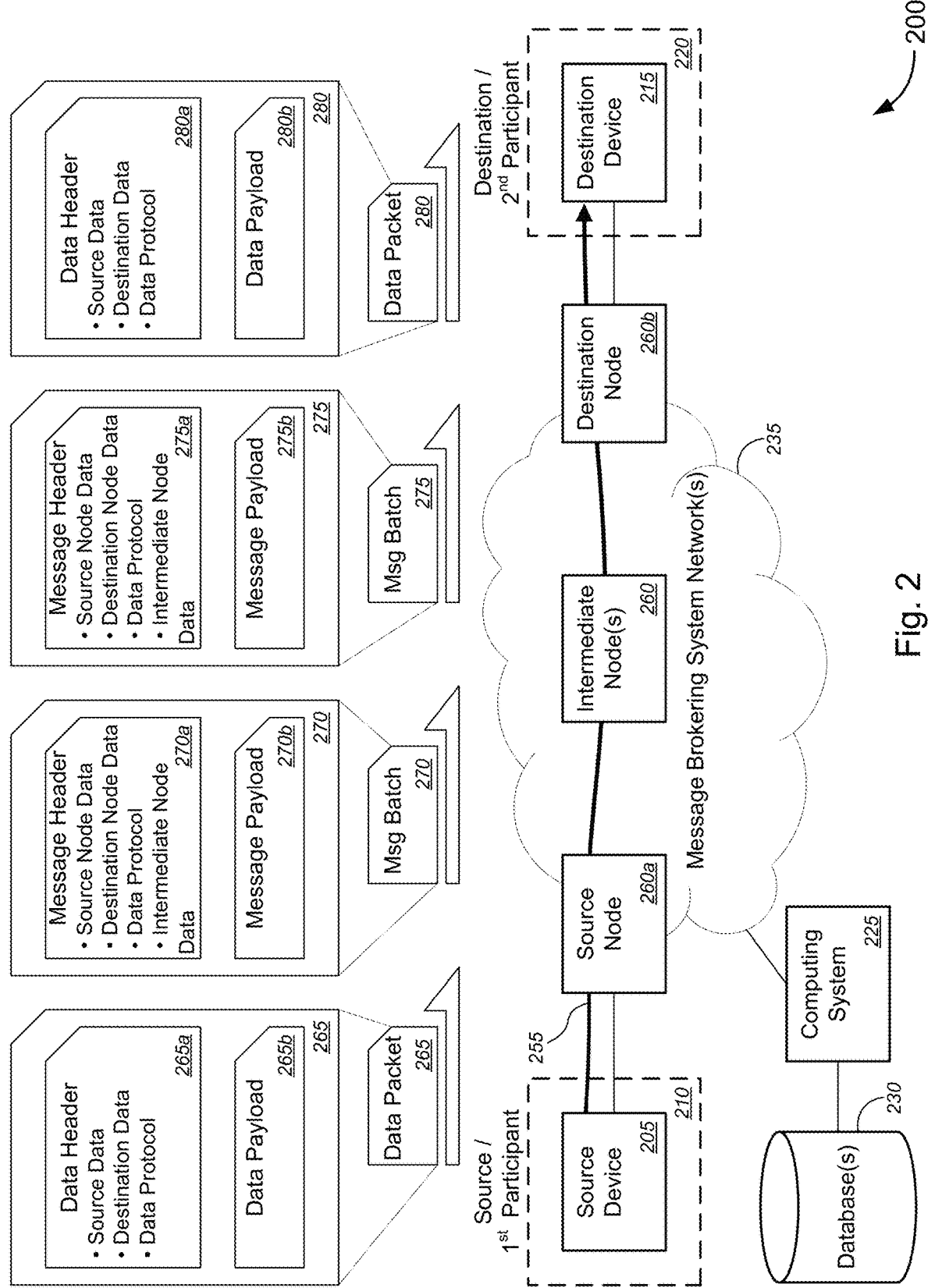
FIG. 2 is a schematic diagram illustrating a non-limiting example of translation between data packets and message batches when implementing data routing or prioritized data routing over message brokering system network for connected devices, in accordance with various embodiments.

FIG. 2 is a schematic diagram illustrating a non-limiting example 200 of translation between data packets and message batches when implementing data routing or prioritized data routing over message brokering system network for connected devices, in accordance with various embodiments.

With reference to the non-limiting embodiment 200 of FIG. 2, the system might comprise a source device 205 (similar to source device 105 of FIG. 1, or the like) associated with a source or a first participant 210 (similar to source/first participant 110 of FIG. 1, or the like) and a destination device 215 (similar to destination device 115 of FIG. 1, or the like) associated with a destination or a second participant 220 (similar to destination/second participant 120 of FIG. 1, or the like). The system might further comprise computing system 225 (similar to computing system 125a, 125b, or 125c of FIG. 1, or the like), database(s) 230 (similar to database(s) 130 of FIG. 1, or the like), a message brokering system or a message brokering system network(s) 235 (similar to message brokering system or message brokering system network(s) 135 of FIG. 1, or the like), a source node 260a associated with at least one of the source device 205 or the first participant 210, a destination node 260b associated with at least one of the destination device 215 or the second participant 220, and one or more intermediate nodes 260 (if required). The source node 260a, the destination node 260b, and the one or more intermediate nodes 260 (collectively, "nodes 260" or the like; similar to nodes 160 of FIG. 1, or the like) are part of the message brokering system or the message brokering system network(s) 235.

In operation, the computing system 225 might receive a request to transfer data from a first source (e.g., source 210) to a first destination (e.g., destination 220) over a network, might map messaging connections among two or more nodes 260 among a plurality of nodes 260a-260n within the message brokering system or the message brokering system network(s) 235, each node 260 among the plurality of nodes 260a-260n being associated with a participant among a plurality of participants in the message brokering system 235. In some instances, the first source 210 might be associated with the first participant 210 among the plurality of participants and the first destination 220 might be associated with the second participant 220 among the plurality of participants. The computing system might analyze a map of messaging connections among the two or more nodes 260 within the message brokering system or the message brokering system network(s) 235 to identify a connection path between the first source associated with the first participant and the first destination associated with the second participant within the message brokering system.

The computing system might encapsulate first information associated with at least one of the first participant or the first source, second information associated with at least one of the second participant or the first destination, and third information regarding data protocol in a header portion of each of at least one first message batch transported using the message brokering system; might encapsulate the requested data distributed amongst payload portions of each of the at least one first message batch transported using the message brokering system or the message brokering system network(s) 235; and might send the at least one first message batch from the first source associated with the first participant to the first destination associated with the second participant over the network via the message brokering system or the message brokering system network(s) 235 over the identified connection path. Here, if the requested data can be contained within the payload portion of a single message batch, only a single message batch of the at least one first message batch may be used or sent from the first source associated with the first participant to the first destination associated with the second participant over the network via the message brokering system or the message brokering system network(s) 235 over the identified connection path. However, if the requested data cannot be contained within the payload portion of a single message batch, the requested data is distributed across the payload portions of multiple message batches of the at least one first message batch (as described above) and the multiple message batches are subsequent sent from the first source associated with the first participant to the first destination associated with the second participant over the network via the message brokering system or the message brokering system network(s) 235 over the identified connection path.

In some cases, the identified connection path 255 might include routing through the plurality of nodes 260a-260n (e.g., through source node 260a associated with the source device 205, node 260f, node 260c, node 260d, node 260e, and destination node 260b associated with the destination device 215, as shown in the non-limiting example of FIG. 2), depicted by bold solid arrow 255. According to some embodiments, encapsulating the first information, the second information, and the third information in the header portion of each of at least one first message batch and encapsulating the requested data distributed amongst payload portions of each of the at least one first message batch might occur at layer 7 or application layer of open systems interconnection ("OSI") model. The computing system might extract the requested data from the payload portions of the at least one first message batch after the first destination associated with the second participant has received the at least one first message batch via the message brokering system.

In some embodiments, identifying a connection path between the first source associated with the first participant and the first destination associated with the second participant within the message brokering system might comprise determining whether there is a direct connection between the first source associated with the first participant and the first destination associated with the second participant within the message brokering system. Based on a determination that there is a direct connection between the first source associated with the first participant and the first destination associated with the second participant within the message brokering system, the computing system might encapsulate first information associated with at least one of the first participant or the first source, second information associated with at least one of the second participant or the first destination, and third information regarding data protocol in a header portion of each of at least one first message batch transported using the message brokering system; might encapsulate the requested data distributed amongst payload portions of each of the at least one first message batch transported using the message brokering system; might send the at least one first message batch from the first source associated with the first participant to the first destination associated with the second participant over the network via the message brokering system; and might extract the requested data from the payload portions of the at least one first message batch after the first destination associated with the second participant has received the at least one first message batch via the message brokering system.

Based on a determination that there is no direct connection between the first source associated with the first participant and the first destination associated with the second participant within the message brokering system, the computing system might analyze the map of messaging connections among the two or more nodes within the message brokering system to identify one or more intermediate nodes or participants between the first source associated with the first participant and the first destination associated with the second participant within the message brokering system. Based on a determination that one or more intermediate nodes or participants between the first source associated with the first participant and the first destination associated with the second participant within the message brokering system have been identified, the computing system might encapsulate the first information associated with at least one of the first participant or the first source, the second information associated with at least one of the second participant or the first destination, the third information regarding data protocol, and fourth information associated with each of the one or more intermediate nodes or participants in a header portion of each of at least one second message batch transported using the message brokering system; might encapsulate the requested data distributed amongst payload portions of each of the at least one second message batch transported using the message brokering system; might send the at least one second message batch from the first source associated with the first participant to the first destination associated with the second participant via each of the one or more intermediate nodes over the network via the message brokering system; and might extract the requested data from the payload portions of the at least one second message batch after the first destination associated with the second participant has received the at least one second message batch via the message brokering system.

In some embodiments, the one or more intermediate nodes (e.g., nodes 260c-260n, or the like) might include, but are not limited to, one or more of at least one first intermediate node each associated with a third participant among a plurality of third participants listed in a contact list of the first participant, at least one second intermediate node each associated with a fourth participant among a plurality of fourth participants listed in a contact list of the second participant, or at least one third intermediate node each associated with one of a fourth participant among a plurality of fourth participants listed in a contact list of a third participant or a fifth participant among a plurality of fifth participants listed in a contact list of a fourth participant, and/or the like. Alternatively, the one or more intermediate nodes (e.g., nodes 260c-260n, or the like) might include, without limitation, one or more fourth intermediate nodes each not associated with any contact lists of the first participant, the second participant, and the third participants.

According to some embodiments, sending the at least one second message batch from the first source associated with the first participant to the first destination associated with the second participant via each of the one or more intermediate nodes over the network via the message brokering system might comprise the computing system causing the first source to publish the at least one second message batch; causing each of the one or more intermediate nodes, in turn, to subscribe to the at least one second message batch and to publish the at least one second message batch; and causing the first destination to subscribe to the at least one second message batch.

In some embodiments, a connection path may be identified according to various different implementations. For example, identifying a connection path between the first source associated with the first participant and the first destination associated with the second participant within the message brokering system might comprise the computing system identifying a plurality of different candidate connection paths between the first source associated with the first participant and the first destination associated with the second participant within the message brokering system, based on analysis of the map of messaging connections among the two or more nodes within the message brokering system; determining a bandwidth available over each sub-path for each candidate connection path among the plurality of different candidate connection paths between the first source associated with the first participant and the first destination associated with the second participant within the message brokering system; and selecting a candidate connection path among the plurality of different candidate connection paths that best matches available bandwidth across each sub-path of the candidate connection path.

Alternatively, identifying a connection path between the first source associated with the first participant and the first destination associated with the second participant within the message brokering system might comprise the computing system identifying a plurality of different candidate connection paths between the first source associated with the first participant and the first destination associated with the second participant within the message brokering system, based on analysis of the map of messaging connections among the two or more nodes within the message brokering system; determining at least one of a message transfer latency or a message transfer length over each sub-path for each candidate connection path among the plurality of different candidate connection paths between the first source associated with the first participant and the first destination associated with the second participant within the message brokering system; and selecting a candidate connection path among the plurality of different candidate connection paths that provides the most optimal connection path between the first source associated with the first participant and the first destination associated with the second participant within the message brokering system in terms of at least one of time or distance.

According to some embodiments, the system might take into account priority for data transfer. After encapsulating the first, second, and third information in the header portion of each of the at least one first message batch and after encapsulating the requested data distributed amongst the payload portions of each of the at least one first message batch, the computing system might determine whether the requested data comprises one or more sub-data having different priority levels. Based on a determination that one or more sub-data of the requested data have different priority levels, identifying, with the computing system, one or more first sub-data among the one or more sub-data that has the highest priority, the computing system might identify one or more first sub-data among the one or more sub-data that has the highest priority. In such cases, sending the at least one first message batch from the first source associated with the first participant to the first destination associated with the second participant over the network via the message brokering system over the identified connection path might comprise the computing system sending the identified one or more first sub-data having the highest priority ahead of the other sub-data (or in order of priority) among the one or more sub-data via the message brokering system over the identified connection path.

Referring to the non-limiting embodiment of FIG. 2, the process of sending the data via the nodes 260 of the message brokering system or the message brokering system network(s) 235 might comprise the source device 205 sending a data packet 265 that the source device 205 might conventionally send over a data network(s) (such as data networks 140a-140n of FIG. 1, or the like) to source node 260a. The data packet 265 might comprise a data header 265a and a data payload 265b. The data header 265a might include, without limitation, at least one of information or data regarding at least one of the source device 205 or the first participant 210 (referred to herein as "source data" or the like), information or data regarding at least one of the destination device 215 or the second participant 220 (referred to herein as "destination data" or the like), information or data regarding data protocol (e.g., protocol regarding segmenting and reassembly of data portions, data formats, data transfer protocol that would be used when transferring the data over a data network(s), or the like) (referred to herein as "data protocol" or the like), and/or the like (collectively, "data header information" or the like). The data payload 265b might include the requested data.

The computing system 225 might extract or abstract the data header information from the data header 265a, and might encapsulate the extracted or abstracted data header information in message header 270a of each of at least one first message batch 270. In some cases, computing system 225 might further encapsulate at least one of information or data regarding the source node 260a (referred to herein as "source node data" or the like), or information or data regarding the destination node 260b (referred to herein as "destination node data" or the like), and/or the like. Alternative to using data packet 265, the computing system 225 might receive the source data, the destination data, the data protocol, and the requested data directly from source device 205, might encapsulate the received source data, the received destination data, and the received data protocol in the message header 270a of each of the at least one first message batch 270, and might encapsulate the requested data in the message payload 270b of each of the at least one first message batch 270.

In the case that the identified connection path includes routing the at least one first message batch 270 via one or more intermediate nodes 260, the computing system 225 might further encapsulate at least one of information or data regarding each of the one or more intermediate nodes 260, or information or data regarding the next one of the one or more intermediate nodes 260 along the identified connection path, and/or the like (collectively, "intermediate node data" or the like). The encapsulated data header information (including the source data, the destination data, and the data protocol, or the like), the encapsulated source node data, the encapsulated destination node data, and the encapsulated intermediate node data might collectively be referred to as "message header information" or the like. The message payload 270b might include the requested data that is extracted with data payload 265b. The computing system 225 might relay the at least one first message batch 270 from the source node 260a to the destination node 260b or to each of the one or more intermediate nodes 260 (in turn) along the identified connection path. In the case that there are intermediate nodes 260 along the identified connection path, the computing system 225 might relay the at least one first message batch 270 as at least one second message batch 275 (depicted in FIG. 2) from intermediate node 260 to intermediate node, and eventually to destination node 260b. The at least one second message batch 275 might comprise message header 275a and message payload 275b, the message header 275a and the message payload 27b being similar or identical to message header 270a and message payload 270b of the at least one first message batch 270 in terms of content or structure.

After the destination node 260b has received the at least one first message batch 270 or the at least one second message batch 275, the computing system 225 might extract the data header information (including the source data, the destination data, and the data protocol, or the like) from message header 270a or 275a, and might extract the requested data from the message payload 270b or 275b. In some cases, the computing system 225 might use the data protocol to format or reformat the requested data. In some cases, the destination device 215 associated with the second participant 220 might directly access or receive the extracted requested data from the message payload 270b or 275b that is received at the destination node 260b. Alternatively, computing system 225 might encapsulate the extracted data header information in data header 280a of data packet 280, might encapsulate the extracted requested data in data payload 280b, and might relay the data packet 280 to destination device 215. In some cases, the database(s) 230 might store at least one of routing information across message brokering system network(s) 235 or status information regarding nodes 260a, 260b, and/or 260 in the message brokering system network(s) 235, and/or the like.

The system might otherwise be the same or might otherwise operate in a similar, if not identical, manner as system 100 of FIG. 1.

FIGS. 3A-3C (collectively, "FIG. 3") are schematic diagrams illustrating various non-limiting examples 300, 300', and 300" of implementations for data routing or prioritized data routing over message brokering system network for connected devices, in accordance with various embodiments. In the non-limiting examples 300, 300', and 300" of FIG. 3, the system might comprise a source device 305 (similar to source device 105 or 205 of FIGS. 1 and 2, or the like) associated with a source or a first participant 310 (similar to source/first participant 110 or 210 of FIGS. 1 and 2, or the like) and a destination device 315 (similar to destination device 115 or 215 of FIGS. 1 and 2, or the like) associated with a destination or a second participant 320 (similar to destination/second participant 120 or 220 of FIGS. 1 and 2, or the like). The system might further comprise computing system 325 (similar to computing system 125*a*, 125*b*, 125*c*, or 225 of FIGS. 1 and 2, or the like), database(s) 330 (similar to database(s) 130 or 230 of FIGS. 1 and 2, or the like), a message brokering system or a message brokering system network(s) 335 (similar to message brokering system or message brokering system network(s) 135 or 235 of FIGS. 1 and 2, or the like), one or more data networks 340*a*-340*n* (similar to data networks 140*a*-140*n* of FIG. 1, or the like), nodes 350*a*-350*n* (similar to nodes 350 of FIG. 1, or the like), a source node 360*a* associated with at least one of the source/connected/patient device 305, 305', or 305" or the first participant/first device/patient 310, 310', or 310", a destination node 360*b* associated with at least one of the destination/connected/healthcare device 315, 315', or 315" or the second participant/second device/healthcare provider 320, 320', or 320", and one or more intermediate nodes 360*c*-360*n* (if required). The nodes 350*a*-350*n* are part of the one or more data networks 340*a*-340*n*, while the source node 360*a*, the destination node 360*b*, and the one or more intermediate nodes 360*c*-360*n* (collectively, "nodes 360" or the like; similar to nodes 160 of FIG. 1, or the like) are part of the message brokering system or the message brokering system network(s) 335.

FIG. 3A depicts a non-limiting example 300 in which the plurality of participants (including participants 310 and 320, or the like) might be people and where the plurality of nodes 360*a*-360*n* might include, without limitation, one of one or more user devices each associated with a participant, one or more proxy devices each associated with a participant, one or more virtual devices each associated with a participant, or one or more user accounts each associated with a participant, and/or the like.

In some aspects, computing system 325 might receive a request to transfer data from a first source (e.g., source or first participant 310) to a first destination (e.g., destination or second participant 320) over a network. Conventionally, the computing system 325 might route the requested data through one or more nodes 350 among a plurality of nodes 350*a*-350*n* over the one or more data networks 340*a*-340*n* from the source device 305 associated with the source or the first participant 310 to the destination device 315 associated with the destination or the second participant 320, in some cases, via a data routing path 345 through the plurality of nodes 350*a*-350*n* (e.g., through node 350*b*, node 350*a*, node 350*x*, node 350*x*+1, and node 350*n*, as shown in the non-limiting example of FIG. 3A), depicted by dashed-lined arrow 345. In some cases, the source device 305 might include, without limitation, at least one of a tablet computer 305*a*, a smart phone 305*b*, a mobile phone 305*c*, a laptop computer 305*d*, or other user device, and/or the like. In some instances, the destination device 315 might include, without limitation, at least one of a tablet computer 315*a*, a smart phone 315*b*, a mobile phone 315*c*, a laptop computer 315*d*, or other user device, and/or the like.

In operation, in response to receiving the request to transfer data from the first source (e.g., source 310) to the first destination (e.g., destination 320) over a network, the computing system 325 might map messaging connections among two or more nodes 360 among a plurality of nodes 360*a*-360*n* within the message brokering system or the message brokering system network(s) 335, each node 360 among the plurality of nodes 360*a*-360*n* being associated with a participant among a plurality of participants in the message brokering system 335. In some instances, the first source 310 might be associated with the first participant 310 among the plurality of participants and the first destination 320 might be associated with the second participant 320 among the plurality of participants. The computing system 325 might analyze a map of messaging connections among the two or more nodes 360 within the message brokering system or the message brokering system network(s) 335 to identify a connection path between the first source associated with the first participant and the first destination associated with the second participant within the message brokering system.

The computing system 325 might encapsulate first information associated with at least one of the first participant or the first source, second information associated with at least one of the second participant or the first destination, and third information regarding data protocol in a header portion of each of at least one first message batch transported using the message brokering system; might encapsulate the requested data distributed amongst payload portions of each of the at least one first message batch transported using the message brokering system or the message brokering system network(s) 335; and might send the at least one first message batch from the first source associated with the first participant to the first destination associated with the second participant over the network via the message brokering system or the message brokering system network(s) 335 over the identified connection path. In some cases, the identified connection path 355 might include routing through the plurality of nodes 360*a*-360*n* (e.g., through source node 360*a* associated with the source device 305, node 360*f*, node 360*c*, node 360*d*, node 360*e*, and destination node 360*b* associated with the destination device 315, as shown in the non-limiting example of FIG. 3A), depicted by bold solid arrow 355. According to some embodiments, encapsulating the first information, the second information, and the third information in the header portion of each of at least one first message batch and encapsulating the requested data distributed amongst payload portions of each of the at least one first message batch might occur at layer 7 or application layer of open systems interconnection ("OSI") model. The computing system might extract the requested data from the payload portions of the at least one first message batch after the first destination associated with the second participant has received the at least one first message batch via the message brokering system.

In a non-limiting example, a user 320 might access a network (e.g., the Internet, intranet, or ethernet, or the like) and might request data from a source, a source website, or other network source (e.g., a server computer 305, or the like), using a user device(s) 315. The computing system 325 might map messaging connections among nodes 360 among the plurality of nodes 360*a*-360*n* within the message brokering system 335 between the source and the user, and might analyze a map of messaging connections to identify a connection path between the server computer 305 associated with the source 310 and the user device(s) 315 associated with the user 320. The computing system 325 might access the requested data, might encapsulate the routing information associated with the identified connection path in a message header of at least one message batch, and might encapsulate the requested data in a message payload of the at least one message batch. The computing system 325 might send, relay, or transport the at least one message batch along the identified connection path through the message brokering system 335 between the source and the user. After the user device(s) 315 has received the at least one message batch, the computing system 325 (and/or a software application ("app") operating on the user device(s) 315) might extract the requested data, allowing the user to access the requested data. By utilizing the message brokering system rather than using a conventional data network or conventional data routing system, the requested data can be transported at a sustained maximum throughput (e.g., 4 Tbps or greater) across a highly distributed network without regard for network ownership.

The system of FIG. 3A might otherwise be the same or might otherwise operate in a similar, if not identical, manner as system 100 of FIG. 1.

FIG. 3B depicts a non-limiting example 300' in which the plurality of participants (including first device 310' and second device 320', or the like) or the plurality of nodes 360a-360n might be connected devices (such as shown in FIG. 3B, or the like), where the connected devices (including connected devices 305' and 315', or the like) might include, but are not limited to, at least one of one or more Internet of things ("IoT") or IoT-capable devices, one or more intelligence enabled things ("IET") tagged objects, one or more user devices (as described in detail in the '918 Application, which has already been incorporated herein by reference in its entirety for all purposes), one or more user interface devices, one or more network devices, one or more kitchen appliances, one or more household devices, one or more environmental control systems, one or more landscape maintenance systems, one or more device maintenance systems, one or more cleaning devices, one or more office devices, one or more communications devices, one or more lighting systems, one or more tools, one or more vehicles, one or more drones, or one or more sensors, and/or the like.

According to some embodiments, the one or more IoT-capable devices and/or the one or more household devices might comprise one or more IoT-capable sensors, and/or might further include, without limitation, a desktop computer, a laptop computer, a tablet computer, a smart phone, a mobile phone, a portable gaming device, a database or data storage device, a network access point ("NAP"), a television or monitor, a set-top box ("STB"), a gaming console, an image capture device, a video capture device, a time piece (including, without limitation, a clock, a watch, or other time piece, and the like), a thermostat or environmental control system, a kitchen appliance (e.g., among the one or more kitchen appliances) (including, but not limited to, a microwave oven, a refrigerator, an oven, a range, a stove, an induction cooktop, a pressure cooker, a rice cooker, a bread maker, a coffee machine, a kettle, a dishwasher, a food thermometer, and/or the like), a medical device, a telephone system, a speaker, a media recording and/or playback device, a lighting system, a customer premises security control system, one or more dedicated remote control devices, one or more universal remote control devices, and/or other IoT-capable devices. In some cases, the other IoT-capable devices might include, without limitation, a personal digital assistant, a fitness tracking device, a printer, a scanner, an image projection device, a video projection device, a household appliance, a vehicle, an audio headset, earbuds, virtual reality goggles or headset, augmented reality goggles or headset, a door unlocking/locking system, an automated door opening/closing system, a window locking system, an automated window opening or closing system, an automated window covering control system, a smart window, a solar cell or solar cell array, an electrical outlet or smart node, a power strip or bar, a dimmer switch, a data port, a sprinkler system, exercise equipment, and/or the like.

The one or more IoT-capable devices and/or the one or more household devices might further include, but are not limited to, one or more of a furnace, an air conditioner, one or more automated skylight opening or closing systems, one or more humidifiers, one or more dehumidifiers one or more ventilation fans, one or more automated lawn mowers, one or more automated trimmers, one or more sprinkler systems, one or more fertilizer dispensers, one or more animal deterrent systems, one or more automated snow shovels, one or more automated snow blowers, one or more animal deterrent systems, one or more speakers warning people about machinery in use, one or more lights or display devices warning people about machinery in use, one or more de-icing machines, one or more heating mats, one or more built-in radiant heat systems under the at least one pathway, one or more drones with mounted heat lamps, one or more automated vacuum machines, one or more automated sweeping machines, one or more automated mopping machines, one or more drones with dusting tool, one or more aerial drones with vacuuming tool, one or more aerial drones with wiping tool, one or more air purifiers, one or more air filters, one or more electrostatic particulate collecting tools, a washing machine, a clothes dryer, one or more drones transferring clothes to one or more hampers, one or more drones sorting which clothes go into which hampers based on cleaning requirements for each article of clothing, one or more drones transferring clothes from each hamper into the washing machine, one or more drones transferring clothes from the washing machine into the clothes dryer, one or more drones transferring clothes from the clothes dryer to a clean laundry surface, one or more drones folding and stacking clothes, one or more drones with steamer tool, one or more drones with clothes hanging tool, a fire suppression system, one or more emergency exit markers, one or more exit route markers, one or more lights (e.g., LEDs, indicator lights, warning lights, etc.), one or more fire suppression drones, one or more white noise generators, and/or the like.

Merely by way of example, in some instances, the one or more vehicles might include, but are not limited to, a car, minivan, pickup truck, a motorcycle, an all-terrain vehicle, a scooter, a police vehicle, a fire engine, an ambulance, a recreational vehicle, a semi-tractor-trailer truck, a commercial truck, a bus, a boat, a ship, a submersible, an amphibious vehicle, an airplane, a helicopter, a space vehicle, and/or the like. In some instances, the one or more sensors or one or more IoT-capable sensors might include, without limitation, one or more temperature sensors (e.g., heat sensors, infrared sensors, thermometers, etc.), one or more light sensors (e.g., ambient light sensors, luminosity sensors, illuminance sensors, solar light sensors, etc.), one or more proximity sensors (e.g., vehicle camera-based collision avoidance system, the vehicle radar-based proximity detection system, the vehicle lidar-based proximity detection system, the vehicle sonar-based proximity detection system, etc.), one or more speed sensors, one or more cameras, one or more fuel level sensors (e.g., gasoline tank level sensors, diesel tank level sensors, battery charge level sensors, etc.), one or more location sensors (e.g., global positioning system ("GPS") devices, global navigation satellite system ("GNSS") devices, other location sensors, etc.), one or more other sensors, and/or the like. In some cases, the one or more other sensors might include, but are not limited to, one or more brake sensors, one or more air quality sensors, one or more carbon monoxide sensors, one or more smoke detectors, one or more fluid leak detectors, one or more contact sensors (e.g., for the door lock system, the hood ajar detector, the trunk ajar detector, the moon/sky light ajar detector, the window open detector, and/or the like), one or more audio sensors, one or more accelerometers, one or more telecommunications signal sensors, one or more tire pressure sensors, an engine temperature sensor, one or more fluid leak detectors, one or more occupant sensors, one or more impact sensors, or one or more suspension system diagnostic sensors, and/or the like.

According to some embodiments, the one or more IET tagged objects, when assembled, might form part of one of a building, a tower, a tunnel, a bridge, a railway, a road, an industrial facility, a parking structure, an aqueduct, a viaduct, a canal, a dam, a waterfront structure, or a retaining wall, and/or the like. In such cases, the one or more IET tagged objects might include, without limitation, at least one of one or more bricks, one or more stone blocks, one or more support frame components, one or more roofing components, one or more building structure support pieces, one or more heating, ventilation, and air conditioning ("HVAC") components, one or more railing pieces, one or more wood planks, one or more wood blocks, one or more screws, one or more nails, one or more rivets, one or more bolts, one or more nuts, one or more hinges, one or more brackets, one or more door handle pieces, one or more door lock pieces, one or more drywall pieces, one or more ceiling components, one or more floor tiles, one or more flooring planks, one or more concrete blocks, one or more window frame pieces, one or more window component pieces, one or more doorway pieces, one or more door component pieces, one or more gateway pieces, one or more gate component pieces, one or more fence post pieces, one or more fence components, one or more premises security components, one or more gas conduit pieces, one or more water pipe pieces, one or more plumbing component pieces, one or more electrical wires, one or more electrical conduit pieces, one or more electrical sockets, one or more lighting component pieces, one or more appliance hookup pieces, one or more pump system components, one or more stairway components, one or more elevator structural component, one or more elevator component pieces, one or more escalator structural component, one or more escalator component pieces, one or more siding components, one or more façade pieces, one or more pillar component pieces, one or more pathway component pieces, or one or more shading component pieces, and/or the like.

In some aspects, computing system 325a, computing system 325b, or computing system 325c (corresponding to computing system 125a, computing system 125b, or computing system 125c of FIG. 1, or the like; collectively, "computing system 325" or the like) might receive a request to transfer data from a first source (e.g., first device 310') to a first destination (e.g., second device 320') over a network. Conventionally, the computing system 325 might route the requested data through one or more nodes 350 among a plurality of nodes 350a-350n over the one or more data networks 340a-340n from the connected device(s) 305' associated with the source or the first device 310' to the connected device(s) 315' associated with the destination or the second device 320', in some cases, via a data routing path 345 through the plurality of nodes 350a-350n (e.g., through node 350b, node 350x, node 350x+2, node 350x+1, and node 350n, as shown in the non-limiting example of FIG. 3B), depicted by dashed-lined double-arrow 345.

In operation, in response to receiving the request to transfer data from the first source (e.g., first device 310') to the first destination (e.g., second device 320') over a network, the computing system 325 might map messaging connections among two or more nodes 360 among a plurality of nodes 360a-360n within the message brokering system or the message brokering system network(s) 335, each node 360 among the plurality of nodes 360a-360n being associated with a participant or device among a plurality of participants or devices in the message brokering system 335. In some instances, the first device 310' might be associated with the first device 310' among the plurality of participants or devices and the first second device 320' might be associated with the second device 320' among the plurality of participants or devices. The computing system 325 might analyze a map of messaging connections among the two or more nodes 360 within the message brokering system or the message brokering system network(s) 335 to identify a connection path between the connected device(s) 305' associated with the first device 310' and the connected device(s) 315' associated with the second device 320' within the message brokering system.

The computing system 325 might encapsulate first information associated with at least one of the first device 310', second information associated with at least one of the second device 320', and third information regarding data protocol in a header portion of each of at least one first message batch transported using the message brokering system; might encapsulate the requested data distributed amongst payload portions of each of the at least one first message batch transported using the message brokering system or the message brokering system network(s) 335; and might send the at least one first message batch from the connected device(s) 305' associated with the first device 310' to the connected device(s) 315' associated with the second device 320' over the network via the message brokering system or the message brokering system network(s) 335 over the identified connection path. In some cases, the identified connection path 355 might include routing through the plurality of nodes 360a-360n (e.g., through source node 360a associated with the connected device(s) 305', node 360c, node 360g, node 360e, and destination node 360b associated with the connected device(s) 315', as shown in the non-limiting example of FIG. 3B), depicted by bold solid double-arrow 355. According to some embodiments, encapsulating the first information, the second information, and the third information in the header portion of each of at least one first message batch and encapsulating the requested data distributed amongst payload portions of each of the at least one first message batch might occur at layer 7 or application layer of open systems interconnection ("OSI") model. The computing system might extract the requested data from the payload portions of the at least one first message batch after the connected device(s) 315' associated with the second device 320' has received the at least one first message batch via the message brokering system.

Routing of data may also be implemented in a similar manner from the connected device(s) 315' associated with the second device 320' to the connected device(s) 305' associated with the first device 310' over the network via the message brokering system or the message brokering system network(s) 335 over an identified connection path (whether the same connection path as described above from the connected device(s) 305' associated with the first device 310' to the connected device(s) 315' associated with the second device 320' except in reverse (depicted in FIG. 3B by bold solid double-arrow 355) or via a different connection path through the nodes 360a-360n (not shown in FIG. 3B)).

In a non-limiting example, a connected device 315' associated with a gas company main system 320' might subscribe to data from each of a plurality of gas line sensors 305' associated with (or connected to) corresponding gas line monitors 310'. In the case of a critical event (e.g., a gas pocket being hit, or the like), one or more gas line sensors 305' might publish sensor data corresponding to the critical event. Rather than publishing the sensor data using conventional data routing techniques over conventional data networks (e.g., data networks 340a-340n, or the like) for implementing publication/subscription of the sensor data, the computing system 325 might map messaging connections among nodes 360 among the plurality of nodes 360a-360n within the message brokering system 335 between the gas line monitors 310' and the gas company main system 320', and might analyze a map of messaging connections to identify a connection path between the one or more gas line sensors 305' associated with the gas line monitors 310' and the connected device 315' associated with the gas company main system 320'. The computing system 325 might access the sensor data, might encapsulate the routing information associated with the identified connection path in a message header of at least one message batch, and might encapsulate the sensor data in a message payload of the at least one message batch. The computing system 325 might send, relay, or transport the at least one message batch along the identified connection path through the message brokering system 335 between the gas line monitors 310' and the gas company main system 320'. After the connected device 315' has received the at least one message batch, the computing system 325 (and/or a software application ("app") operating on the connected device 315') might extract the sensor data, allowing the gas company main system 320' (or a user) to access the sensor data. By utilizing the message brokering system rather than using a conventional data network or conventional data routing system, the sensor data can be transported at a sustained maximum throughput (e.g., 4 Tbps or greater) across a highly distributed network without regard for network ownership.

In another non-limiting example, a navigation system 315' associated with a vehicle 320' might subscribe to data from each of a plurality of traffic light communications systems 305' associated with (or connected to) corresponding traffic lights 310'. One or more traffic light communications systems 305' might publish or broadcast traffic data corresponding to traffic signal lights. Rather than publishing or broadcasting the traffic data using conventional data routing techniques over conventional data networks (e.g., data networks 340a-340n, or the like) for implementing publication/subscription of the traffic data, the computing system 325 might map messaging connections among nodes 360 among the plurality of nodes 360a-360n within the message brokering system 335 between an approaching traffic light 310' and the vehicle 320', and might analyze a map of messaging connections to identify a connection path between the one or more traffic light communications systems 305' associated with the approaching traffic light 310' and the navigation system 315' associated with the vehicle 320'. The computing system 325 might access the traffic data, might encapsulate the routing information associated with the identified connection path in a message header of at least one message batch, and might encapsulate the traffic data in a message payload of the at least one message batch. The computing system 325 might send, relay, or transport the at least one message batch along the identified connection path through the message brokering system 335 between the approaching traffic light 310' and the vehicle 320'. After the navigation system 315' has received the at least one message batch, the computing system 325 (and/or a software application ("app") operating on the navigation system 315') might extract the traffic data, allowing the vehicle 320' (or a user) to access the traffic data. In some embodiments, the navigation system 315' might subscribe to a number of traffic light communications systems 305' associated with (or connected to) a plurality of corresponding traffic lights 310' within a predetermined or pre-set range extending around the vehicle 320', and might subscribe to and unsubscribe from traffic light communications systems 305' as the vehicle 320' moves within or moves out of the predetermined or pre-set range extending around the vehicle 320'. Alternatively, the navigation system 315' might subscribe to a traffic light communications systems 305' associated with (or connected to) a single approaching traffic light 310' that is within a predetermined or pre-set range extending around the vehicle 320', might unsubscribe from traffic light communications systems 305' as the vehicle 320' moves past the single approaching traffic light 310', and might subscribe to a traffic light communications systems 305' associated with (or connected to) the next approaching traffic light 310' that is within a predetermined or pre-set range extending around the vehicle 320'. In some cases, the vehicle 320' might be an autonomous vehicle. Alternatively, the vehicle 320' might be a regular driver-operated vehicle. By utilizing the message brokering system rather than using a conventional data network or conventional data routing system, the traffic data can be transported at a sustained maximum throughput (e.g., 4 Tbps or greater) across a highly distributed network without regard for network ownership.

The system of FIG. 3B might otherwise be the same or might otherwise operate in a similar, if not identical, manner as system 100 of FIG. 1.

FIG. 3C depicts a non-limiting example 300" in which the plurality of nodes 360a-360n might include, without limitation, at least one patient device 305" each associated with a patient 310" and at least one healthcare device 315" each associated with one or more healthcare providers 320", where the one or more healthcare providers 320" might include, but is not limited to, at least one of a physician, a doctor, a surgeon, a nurse practitioner, a nurse, a medical assistant, a clinical receptionist, a pharmacist, a medical laboratory technician, a healthcare scheduler, or a health insurance agent, and/or the like. In some embodiments, the at least one patient device 305" might include, without limitation, at least one of one or more health monitoring devices, one or more personal tracking devices, an insulin pump, a pace maker, a drug delivery device, a drug storage and dispensing device, or one or more patient user devices, and/or the like, where the at least one healthcare device 315" might include, but is not limited to, at least one of a healthcare server, an electronic medical record ("EMR") system, an electronic health record ("EHR") system, or one or more healthcare provider user devices, and/or the like.

In some embodiments, the one or more health monitoring devices, the one or more personal tracking devices, and/or the one or more patient user devices might comprise one or more first sensors that monitor physical conditions of a body of the patient and/or one or more second sensors that monitor environmental conditions external to the body of the patient. In some cases, the one or more health monitoring devices, the one or more personal tracking devices, and/or the one or more patient user devices might be a wearable device that can be removably affixed to at least one of a portion of skin of the patient, a limb of the patient, an appendage of the patient, a torso of the patient, a head of the patient, or a piece of clothing worn by the patient, and/or the like. Alternatively, the one or more health monitoring devices, the one or more personal tracking devices, and/or the one or more patient user devices might be an implantable device that can be at least one of implanted under one or more layers of skin of the patient, implanted within an organ of the patient, implanted within a torso of the patient, implanted in an internal cavity of the patient, or implanted in an external cavity of the patient, and/or the like. In some embodiments, multiple devices among the one or more health monitoring devices, the one or more personal tracking devices, and/or the one or more patient user devices may be used to monitor the physiological conditions of the patient's body and/or to monitor the environmental conditions external to the patient's body, and can comprise either a plurality of wearable personal trackers, a plurality of implantable personal trackers, or a combination of at least one wearable personal tracker and at least one implantable personal tracker.

Herein, "personal tracker" or "personal tracking device" might refer to at least one of a fitness tracker, an activity tracker, a medical monitor, an environmental safety monitor, and/or the like. The fitness tracker, activity tracker, and medical monitor might be worn by, or implanted in, any person or by a patient under the care of a physician or other doctor. The environmental safety monitor might be worn by, or implanted in, people entering or working in hazardous environments, including, but not limited to, miners, astronauts, test pilots, emergency responders, deep sea explorers, oil rig workers, construction workers, volcanologists, onsite meteorologists (e.g., stormchasers, etc.), nuclear facility operators, nuclear clean-up crew members, submersible crew members, military combatants, law enforcement officers, peacekeepers, mountain climbers, canyoneers, cavers, and/or the like.

In some aspects, in some embodiments, the one or more health monitoring devices, the one or more personal tracking devices, and/or the one or more patient user devices might include, without limitation, at least one of a wearable drug delivery device, an implantable drug delivery device, a medical server, a medical database, a user device accessible by a physician, a user device accessible by a healthcare provider, a user device associated with the user, a user device associated with a relative or guardian of the user, a user device accessible by an emergency response team member, a smart medical alert bracelet, an IoT management node, an IoT human interface device, an IoT vehicle node, one or more household devices, one or more office devices, one or more lighting systems, one or more environmental control systems, one or more speakers, one or more display devices, or one or more communications systems, and/or the like.

According to some embodiments, the one or more first sensors might include, without limitation, at least one of a heart rate monitor, a pulse oximeter, an oximeter, a blood glucose monitor, a blood pressure monitor, a blood flow monitor, a nitrogen monitor, a carbon dioxide monitor, a sleep monitor, an activity monitor, a step counter, one or more limb movement monitors, one or more thermometers, one or more accelerometers, one or more gyroscopes, one or more body fat monitors, one or more body muscle monitors, one or more bone density monitors, one or more pH monitors, a body fluid monitor, an electroencephalograph, an electrocardiograph, a respiratory rate monitor, a serotonin monitor, an epilepsy monitor, a skin toxicity monitor, a blood toxicity monitor, an organ toxicity monitor, a cancer monitor, a blood tester, one or more blood alcohol level detectors, one or more drug testers, or one or more location monitors, and/or the like.

In some embodiments, the one or more second sensors might include, but are not limited to, at least one of an ambient temperature sensor, a flame detector, a particulate sensor, a light sensor, a humidity sensor, an air quality sensor, an atmospheric oxygen level monitor, an atmospheric carbon dioxide level monitor, an atmospheric nitrogen level monitor, an atmospheric pressure sensor, an environmental carbon monoxide sensor, a smoke detector, a gas toxicity monitor, a carcinogen detector, a radiation sensor, a location sensor, a telecommunications signal sensor, a sound amplitude sensor, a frequency sensor, an accelerometer, a proximity sensor, a weather sensor, or a seismic sensor, and/or the like.

In some aspects, computing system 325 might receive a request to transfer data from a first source (e.g., patient 310") to a first destination (e.g., healthcare provider 320") over a network. Conventionally, the computing system 325 might route the requested data through one or more nodes 350 among a plurality of nodes 350a-350n over the one or more data networks 340a-340n from the patient device 305" associated with the source or the patient 310" to the healthcare device 315" associated with the destination or the healthcare provider 320", in some cases, via a data routing path 345 through the plurality of nodes 350a-350n (e.g., through node 350b, node 350a, node 350x+2, and node 350x+1, as shown in the non-limiting example of FIG. 3C), depicted by dashed-lined double-arrow 345.

In operation, in response to receiving the request to transfer data from the first source (e.g., patient 310") to the first destination (e.g., healthcare provider 320") over a network, the computing system 325 might map messaging connections among two or more nodes 360 among a plurality of nodes 360a-360n within the message brokering system or the message brokering system network(s) 335, each node 360 among the plurality of nodes 360a-360n being associated with a participant among a plurality of participants in the message brokering system 335. In some instances, the patient 310" might be associated with a first participant among the plurality of participants and the healthcare provider 320" might be associated with a second participant among the plurality of participants. The computing system 325 might analyze a map of messaging connections among the two or more nodes 360 within the message brokering system or the message brokering system network(s) 335 to identify a connection path between the first source associated with the first participant and the first destination associated with the second participant within the message brokering system.

The computing system 325 might encapsulate first information associated with at least one of the first participant or the first source, second information associated with at least one of the second participant or the first destination, and third information regarding data protocol in a header portion of each of at least one first message batch transported using the message brokering system; might encapsulate the requested data distributed amongst payload portions of each of the at least one first message batch transported using the message brokering system or the message brokering system network(s) 335; and might send the at least one first message batch from the first source associated with the first participant to the first destination associated with the second participant over the network via the message brokering system or the message brokering system network(s) 335 over the identified connection path. In some cases, the identified connection path 355 might include routing through the plurality of nodes 360a-360n (e.g., through source node 360a associated with the patient device 305", node 360f, node 360c, node 360g, node 360n, and destination node 360b associated with the healthcare device 315", as shown in the non-limiting example of FIG. 3C), depicted by bold solid double-arrow 355. According to some embodiments, encapsulating the first information, the second information, and the third information in the header portion of each of at least one first message batch and encapsulating the requested data distributed amongst payload portions of each of the at least one first message batch might occur at layer 7 or application layer of open systems interconnection ("OSI") model. The computing system might extract the requested data from the payload portions of the at least one first message batch after the first destination associated with the second participant has received the at least one first message batch via the message brokering system.

As described above with respect to FIG. 3C, routing of data is implemented from the patient device 305" associated with the patient 310" to the healthcare device 315" associated with the healthcare provider 320" over the network via the message brokering system or the message brokering system network(s) 335. In such cases, the requested data might include, without limitation, at least one of data regarding physiology of the patient, health tracking data of the patient, or data regarding a health alert associated with the patient, and/or the like.

Alternatively, or additionally, routing of data may be implemented in a similar manner from the healthcare device 315" associated with the healthcare provider 320" to the patient device 305" associated with the patient 310" over the network via the message brokering system or the message brokering system network(s) 335 over an identified connection path (whether the same connection path as described above from the patient device 305" associated with the patient 310" to the healthcare device 315" associated with the healthcare provider 320" except in reverse (depicted in FIG. 3C by bold solid double-arrow 355) or via a different connection path through the nodes 360a-360n (not shown)). In such cases, the requested data might include, but is not limited to, at least one of data regarding drug prescriptions for the patient, data regarding fitness regime, or data regarding diet, and/or the like.

In a non-limiting example, to properly assess the health of a patient 310", a doctor 320" might hand out or prescribe one or more health monitoring devices 305" to the patient 310". The patient 310" would be asked to wear or attach the one or more health monitoring devices 305" on the patient's body, the one or more health monitoring devices 305" being registered on a healthcare system 315" as being associated with the patient 310". In some cases, the one or more health monitoring devices 305" might include, but are not limited to, at least one of a heart rate monitor, a pulse oximeter, an oximeter, a blood glucose monitor, a blood pressure monitor, a blood flow monitor, a nitrogen monitor, a carbon dioxide monitor, a sleep monitor, an activity monitor, a step counter, one or more limb movement monitors, one or more thermometers, one or more accelerometers, one or more gyroscopes, one or more body fat monitors, one or more body muscle monitors, one or more bone density monitors, one or more pH monitors, a body fluid monitor, an electroencephalograph, an electrocardiograph, a respiratory rate monitor, a serotonin monitor, an epilepsy monitor, a skin toxicity monitor, a blood toxicity monitor, an organ toxicity monitor, a cancer monitor, a blood tester, one or more blood alcohol level detectors, one or more drug testers, or one or more location monitors, and/or the like. In some instances, the healthcare system 315" might include, but is not limited to, at least one of a healthcare server, an electronic medical record ("EMR") system, an electronic health record ("EHR") system, or one or more healthcare provider user devices, and/or the like.

During the monitoring period, a healthcare system 315" associated with a doctor 320" might subscribe to data from each of the one or more health monitoring devices 305" associated with (or registered to) the patient 310". Whether as a continuous monitor or as an event-based monitor (e.g., in response to sensors detecting when the patient's physiological condition worsens or when the patient suffers an injury, stroke, heart attack, or other serious condition, or the like), one or more health monitoring devices 305" might publish sensor data associated with the health condition of the patient 310". Rather than publishing the sensor data using conventional data routing techniques over conventional data networks (e.g., data networks 340a-340n, or the like) for implementing publication/subscription of the sensor data, the computing system 325 might map messaging connections among nodes 360 among the plurality of nodes 360a-360n within the message brokering system 335 between the patient 310" and the doctor 320", and might analyze a map of messaging connections to identify a connection path between the one or more health monitoring devices 305" associated with the patient 310" and the healthcare system 315" associated with the doctor 320". The computing system 325 might access the sensor data, might encapsulate the routing information associated with the identified connection path in a message header of at least one message batch, and might encapsulate the sensor data in a message payload of the at least one message batch. The computing system 325 might send, relay, or transport the at least one message batch along the identified connection path through the message brokering system 335 between the patient 310" and the doctor 320". After the healthcare system 315" has received the at least one message batch, the computing system 325 (and/or a software application ("app") operating on the healthcare system 315") might extract the sensor data, allowing the doctor 320" to access the sensor data. In this way, the doctor can remotely monitor the health of the patient, and the one or more health monitoring devices can alert the doctor if sensors on the health monitoring devices are triggered to send an alert message when the patient's physiological condition worsens or when the patient suffers an injury, stroke, heart attack, or other serious condition. By utilizing the message brokering system rather than using a conventional data network or conventional data routing system, the sensor data can be transported at a sustained maximum throughput (e.g., 4 Tbps or greater) across a highly distributed network without regard for network ownership.

Rather than one or more health monitoring devices, the doctor 320" might surgically implant, hand out, or prescribe at least one of an insulin pump, a pacemaker, a drug delivery device (e.g., an implantable drug delivery device, a wearable drug delivery device, or the like), or a drug storage or dispensing device (e.g., a smart pill bottle, a smart pill case, or the like), and/or the like.

Alternatively, or additionally, the message brokering system might be used to send data in the reverse direction, or along another identified path through the nodes 360a-360n from the healthcare system 315" associated with the doctor 320" to the one or more patient devices 305" associated with the patient 310, e.g., to update programming on the one or more health monitoring devices 305", to pull sensor data from the one or more health monitoring devices 305" in response to the doctor's request, to update drug prescription for the drug delivery device 305" or drug dispensing device 305", to adjust settings for the insulin pump 305" or pacemaker 305", to send information (including, without limitation, at least one of data regarding drug prescriptions for the patient, data regarding fitness regime, or data regarding diet, and/or the like) to the patient 310" on a user device 305" (e.g., a tablet computer, a smart phone, a mobile phone, a laptop computer, a desktop computer, a handheld medical communication device, etc.) of the patient 310", and/or the like.

The system of FIG. 3C might otherwise be the same or might otherwise operate in a similar, if not identical, manner as system 100 of FIG. 1.

FIGS. 4A-4F (collectively, "FIG. 4") are flow diagrams illustrating a method 400 for implementing data routing or prioritized data routing over message brokering system network for connected devices, in accordance with various embodiments. Method 400 of FIG. 4B returns to FIG. 4A following the circular marker denoted, "A," or continues from FIG. 4B onto FIG. 4C following the circular marker denoted, "B." Method 400 of FIG. 4A continues onto FIG. 4F following the circular marker denoted, "C," and returns to FIG. 4A following the circular marker denoted, "D," or following the circular marker denoted, "E."

While the techniques and procedures are depicted and/or described in a certain order for purposes of illustration, it should be appreciated that certain procedures may be reordered and/or omitted within the scope of various embodiments. Moreover, while the method 400 illustrated by FIG. 4 can be implemented by or with (and, in some cases, are described below with respect to) the systems, examples, or embodiments 100, 200, 300, 300', and 300" of FIGS. 1, 2, and 3, respectively (or components thereof), such methods may also be implemented using any suitable hardware (or software) implementation. Similarly, while each of the systems, examples, or embodiments 100, 200, 300, 300', and 300" of FIGS. 1, 2, and 3, respectively (or components thereof), can operate according to the method 400 illustrated by FIG. 4 (e.g., by executing instructions embodied on a computer readable medium), the systems, examples, or embodiments 100, 200, 300, 300', and 300" of FIGS. 1, 2, and 3 can each also operate according to other modes of operation and/or perform other suitable procedures.

Figure 4A:
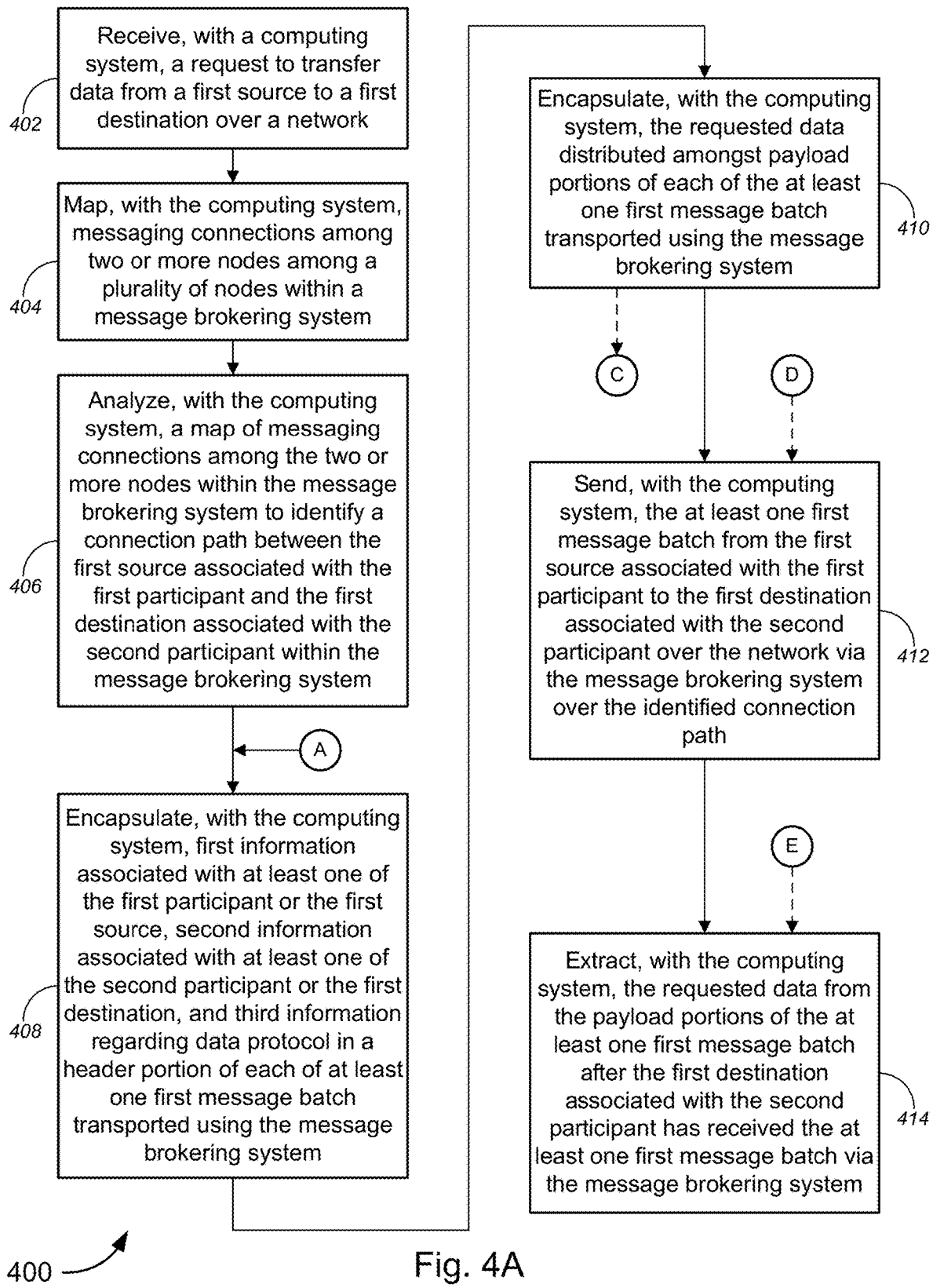
FIGS. 4A-4F are flow diagrams illustrating a method for implementing data routing or prioritized data routing over message brokering system network for connected devices, in accordance with various embodiments.

In the non-limiting embodiment of FIG. 4A, method 400, at block 402, might comprise receiving, with a computing system, a request to transfer data from a first source to a first destination over a network. In some embodiments, the computing system might include, without limitation, at least one of a computing system of the message brokering system, a controller of the message brokering system, a zookeeper of the message brokering system, a data routing computing system, a network routing computing system, a server computer, a distributed computing system, or a cloud computing system, and/or the like.

At block 404, method 400 might comprise mapping, with the computing system, messaging connections among two or more nodes among a plurality of nodes within a message brokering system, each node among the plurality of nodes being associated with a participant among a plurality of participants in the message brokering system, wherein the first source is associated with a first participant among the plurality of participants and the first destination is associated with a second participant among the plurality of participants.

Method 400 might further comprise, at block 406, analyzing, with the computing system, a map of messaging connections among the two or more nodes within the message brokering system to identify a connection path between the first source associated with the first participant and the first destination associated with the second participant within the message brokering system.

Method 400 might further comprise encapsulating, with the computing system, first information associated with at least one of the first participant or the first source, second information associated with at least one of the second participant or the first destination, and third information regarding data protocol (e.g., protocol regarding segmenting and reassembly of data portions, data formats, data transfer protocol that would be used when transferring the data over a data network(s), or the like) in a header portion of each of at least one first message batch transported using the message brokering system (block 408); and encapsulating, with the computing system, the requested data distributed amongst payload portions of each of the at least one first message batch transported using the message brokering system (block 410). According to some embodiments, encapsulating the first information, the second information, and the third information in the header portion of each of at least one first message batch and encapsulating the requested data distributed amongst payload portions of each of the at least one first message batch might occur at layer 7 or application layer of open systems interconnection ("OSI") model.

Method 400, at block 412, might comprise sending, with the computing system, the at least one first message batch from the first source associated with the first participant to the first destination associated with the second participant over the network via the message brokering system over the identified connection path. At block 414, method 400 might comprise extracting, with the computing system, the requested data from the payload portions of the at least one first message batch after the first destination associated with the second participant has received the at least one first message batch via the message brokering system.

Figure 4B:
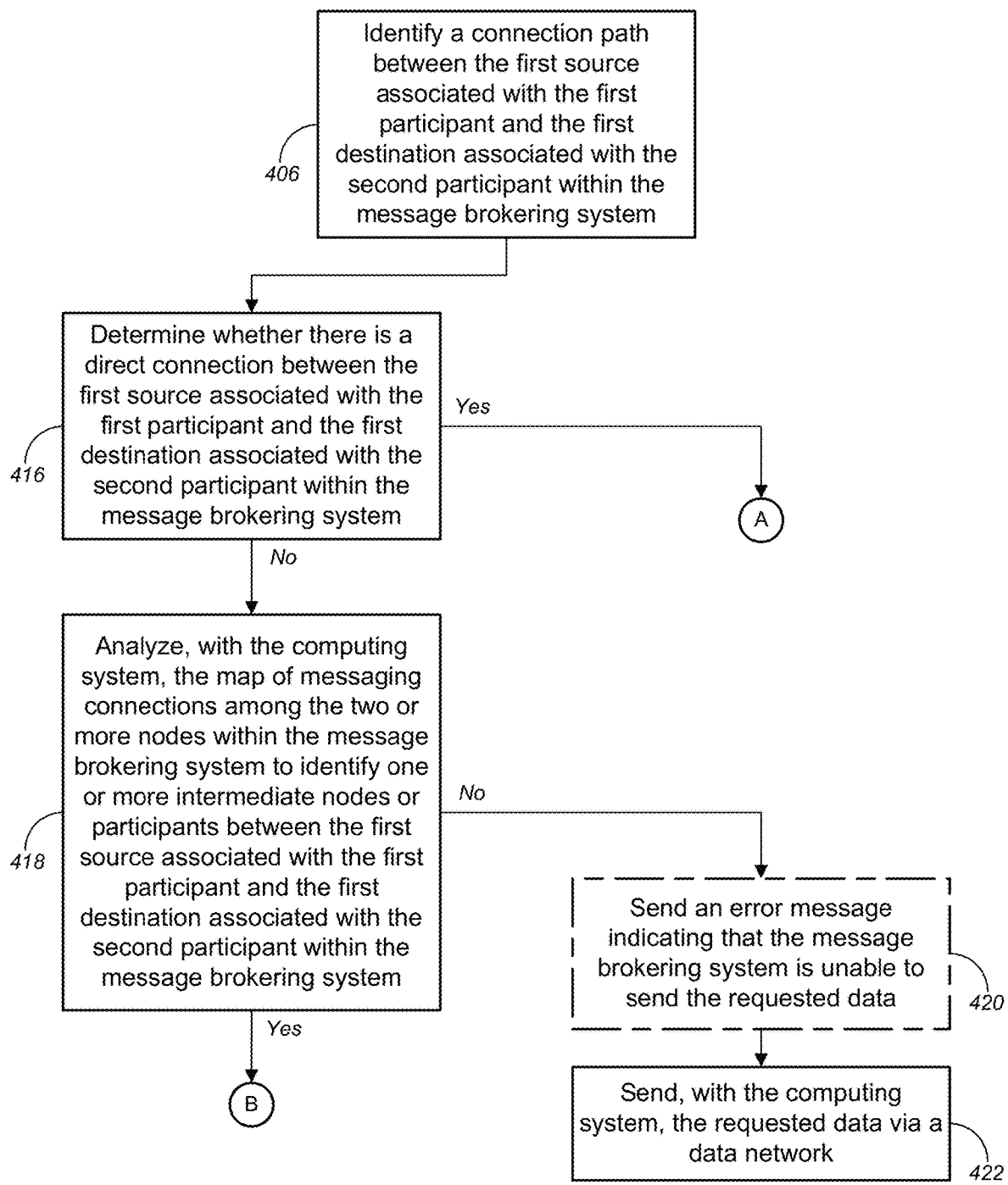

Referring to FIG. 4B, identifying a connection path between the first source associated with the first participant and the first destination associated with the second participant within the message brokering system (at block 406) might comprise determining whether there is a direct connection between the first source associated with the first participant and the first destination associated with the second participant within the message brokering system (block 416). If so, method 400 might return to the processes at blocks 408-414 in FIG. 4A following the circular marker denoted, "A." If not, method 400 might continue onto the process at block 418.

At block 418, method 400 might comprise analyzing, with the computing system, the map of messaging connections among the two or more nodes within the message brokering system to identify one or more intermediate nodes or participants between the first source associated with the first participant and the first destination associated with the second participant within the message brokering system. If so, method 400 might continue onto the process at block 424 in FIG. 4C following the circular marker denoted, "B." If not, method 400 might continue onto the process at optional block 420. At optional block 420, method 400 might comprise sending, with the computing system and to the requesting device or participant, an error message indicating that the message brokering system is unable to send the requested data. Method 400 might further comprise, at block 422, sending, with the computing system, the requested data via a data network (i.e., via conventional data routing system network(s), or the like).

Figure 4C:
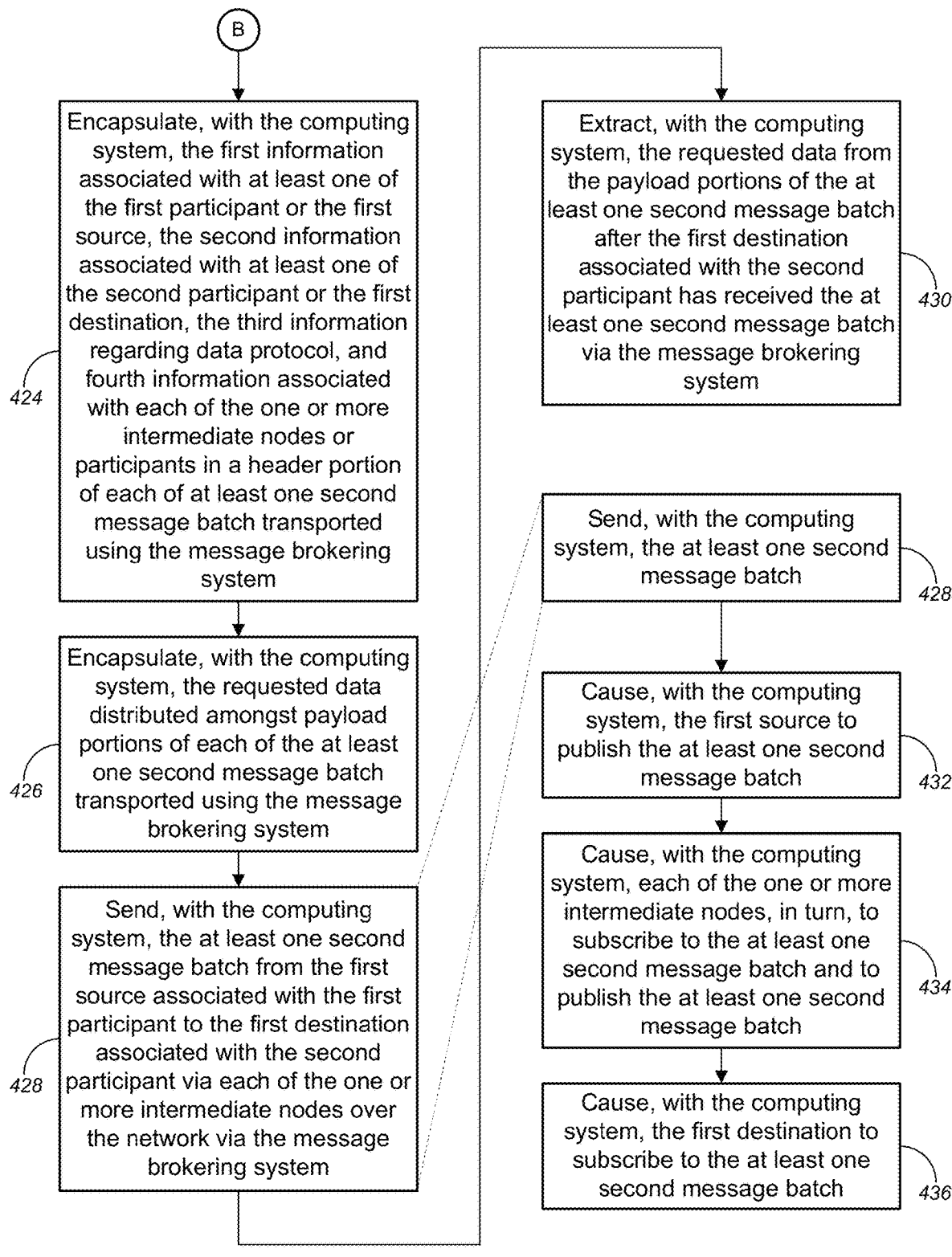

At block 424 in FIG. 4C (following the circular marker denoted, "B"), method 400 might comprise encapsulating, with the computing system, the first information associated with at least one of the first participant or the first source, the second information associated with at least one of the second participant or the first destination, the third information regarding data protocol, and fourth information associated with each of the one or more intermediate nodes or participants in a header portion of each of at least one second message batch transported using the message brokering system. Method 400 might further comprise encapsulating, with the computing system, the requested data distributed amongst payload portions of each of the at least one second message batch transported using the message brokering system (block 426); sending, with the computing system, the at least one second message batch from the first source associated with the first participant to the first destination associated with the second participant via each of the one or more intermediate nodes over the network via the message brokering system (block 428); and extracting, with the computing system, the requested data from the payload portions of the at least one second message batch after the first destination associated with the second participant has received the at least one second message batch via the message brokering system (block 430).

In some embodiments, the one or more intermediate nodes might include, but are not limited to, one or more of at least one first intermediate node each associated with a third participant among a plurality of third participants listed in a contact list of the first participant, at least one second intermediate node each associated with a fourth participant among a plurality of fourth participants listed in a contact list of the second participant, or at least one third intermediate node each associated with one of a fourth participant among a plurality of fourth participants listed in a contact list of a third participant or a fifth participant among a plurality of fifth participants listed in a contact list of a fourth participant, and/or the like. Alternatively, the one or more intermediate nodes might include, without limitation, one or more fourth intermediate nodes each not associated with any contact lists of the first participant, the second participant, and the third participants.

According to some embodiments, sending the at least one second message batch from the first source associated with the first participant to the first destination associated with the second participant via each of the one or more intermediate nodes over the network via the message brokering system (at block 428) might comprise causing, with the computing system, the first source to publish the at least one second message batch (block 432); causing, with the computing system, each of the one or more intermediate nodes, in turn, to subscribe to the at least one second message batch and to publish the at least one second message batch (block 434); and causing, with the computing system, the first destination to subscribe to the at least one second message batch (block 436).

Figure 4D:
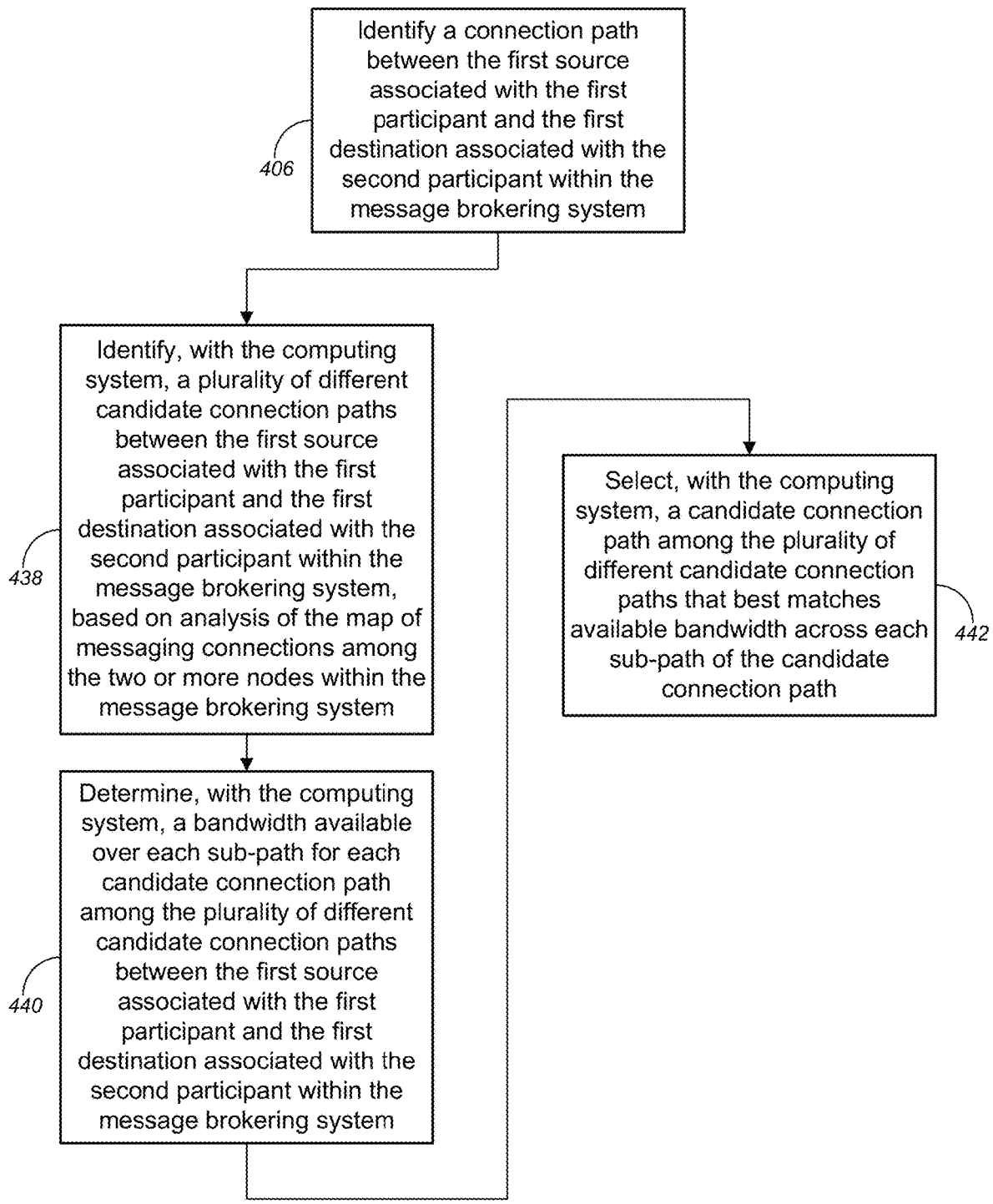
Figure 4E:
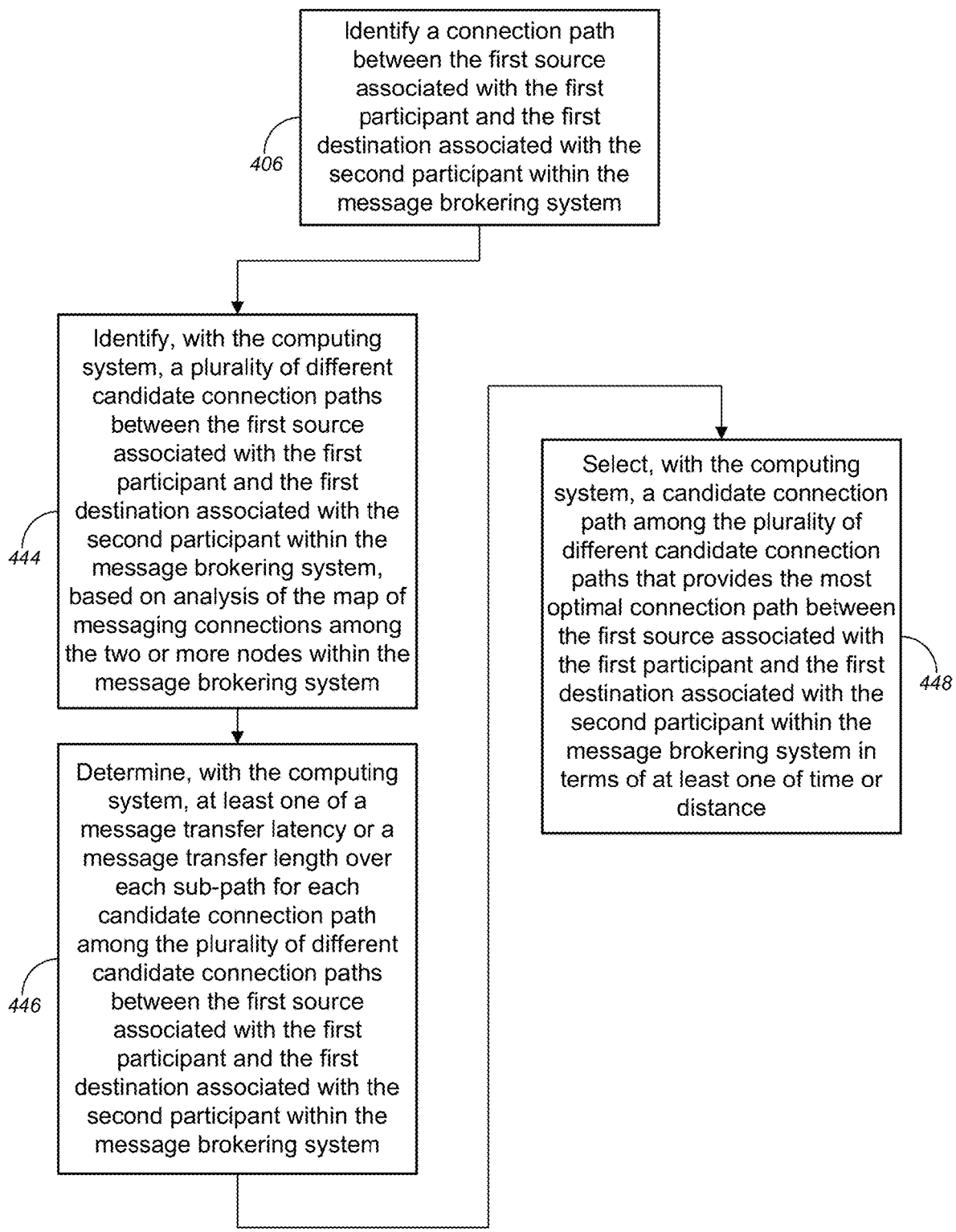

Turning to the non-limiting embodiments of FIGS. 4D and 4E, a connection path may be identified according to various different implementations. For example, in the non-limiting embodiment of FIG. 4D, identifying a connection path between the first source associated with the first participant and the first destination associated with the second participant within the message brokering system (at block 406) might comprise identifying, with the computing system, a plurality of different candidate connection paths between the first source associated with the first participant and the first destination associated with the second participant within the message brokering system, based on analysis of the map of messaging connections among the two or more nodes within the message brokering system (block 438); determining, with the computing system, a bandwidth available over each sub-path for each candidate connection path among the plurality of different candidate connection paths between the first source associated with the first participant and the first destination associated with the second partici-pant within the message brokering system (block 440); and selecting, with the computing system, a candidate connection path among the plurality of different candidate connection paths that best matches available bandwidth across each sub-path of the candidate connection path (block 442).

Alternatively, as shown in the non-limiting embodiment of FIG. 4E, identifying a connection path between the first source associated with the first participant and the first destination associated with the second participant within the message brokering system (at block 406) might comprise identifying, with the computing system, a plurality of different candidate connection paths between the first source associated with the first participant and the first destination associated with the second participant within the message brokering system, based on analysis of the map of messaging connections among the two or more nodes within the message brokering system (block 444); determining, with the computing system, at least one of a message transfer latency or a message transfer length over each sub-path for each candidate connection path among the plurality of different candidate connection paths between the first source associated with the first participant and the first destination associated with the second participant within the message brokering system (block 446); and selecting, with the computing system, a candidate connection path among the plurality of different candidate connection paths that provides the most optimal connection path between the first source associated with the first participant and the first destination associated with the second participant within the message brokering system in terms of at least one of time or distance (block 448).

Figure 4F:
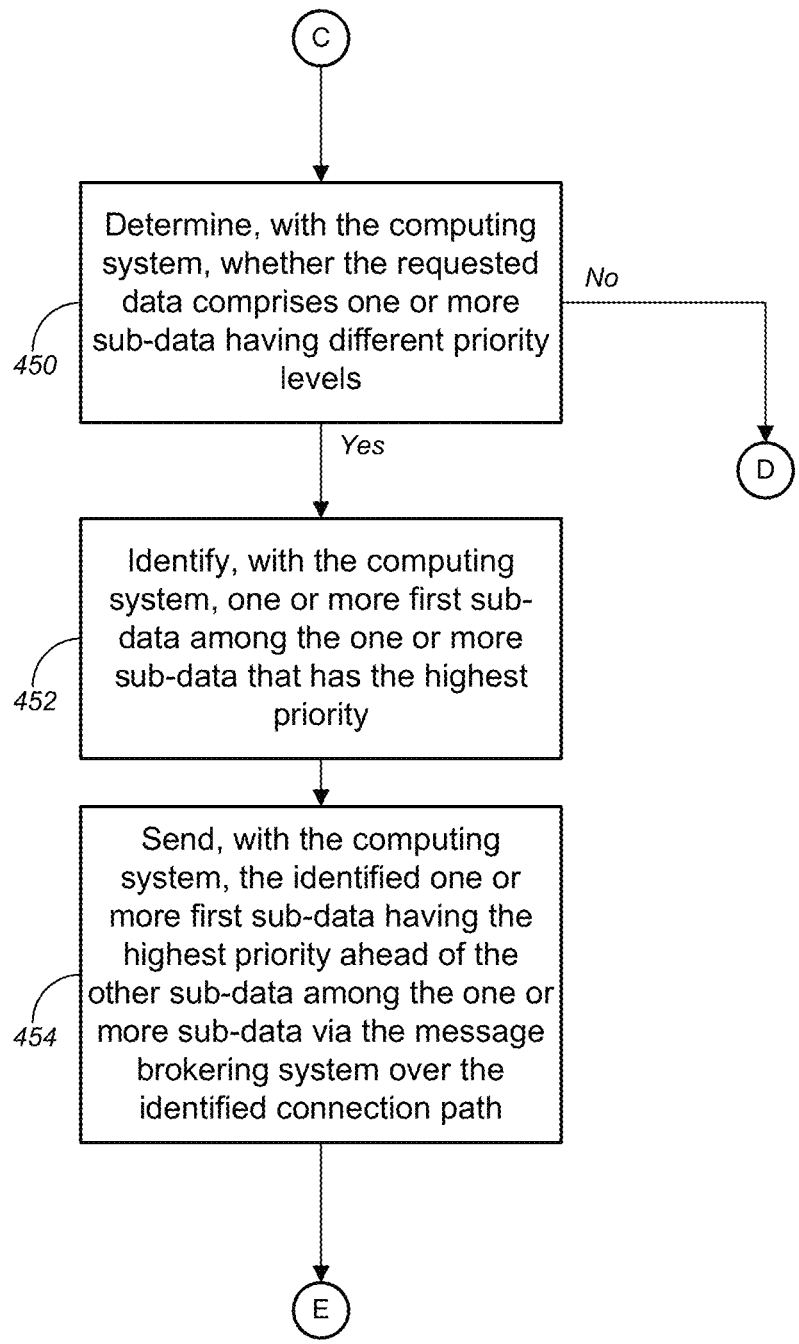

With reference to FIGS. 4A and 4F, the system might take into account priority for data transfer. After encapsulating the first, second, and third information in the header portion of each of the at least one first message batch (at block 408) and after encapsulating the requested data distributed amongst the payload portions of each of the at least one first message batch (at block 410), as shown in FIG. 4A, method 400 might continue onto the process at block 450 in FIG. 4F following the circular marker denoted, "C."

At block 450 in FIG. 4F (following the circular marker denoted, "C"), method 400 might comprise determining, with the computing system, whether the requested data comprises one or more sub-data having different priority levels. If so, method 400 might continue onto the process at block 452. If not, method 400 might return to the process at block 412 in FIG. 4A following the circular marker denoted, "D." At block 452, method 400 might comprise identifying, with the computing system, one or more first sub-data among the one or more sub-data that has the highest priority. Method 400 might further comprise sending, with the computing system, the identified one or more first sub-data having the highest priority ahead of the other sub-data (or in order of priority) among the one or more sub-data via the message brokering system over the identified connection path (block 454). Method 400 might subsequently return to the process at block 414 in FIG. 4A following the circular marker denoted, "E."

Merely by way of example, in some cases, the plurality of participants might be people, wherein the plurality of nodes might include, without limitation, one of one or more user devices each associated with a participant, one or more proxy devices each associated with a participant, one or more virtual devices each associated with a participant, or one or more user accounts each associated with a participant, and/or the like.

Alternatively, the plurality of participants or the plurality of nodes might be connected devices, wherein the connected devices might include, but are not limited to, at least one of one or more Internet of things ("IoT") or IoT-capable devices, one or more intelligence enabled things ("IET") tagged objects, one or more user devices (as described in detail in the '918 Application, which has already been incorporated herein by reference in its entirety for all purposes), one or more user interface devices, one or more network devices, one or more kitchen appliances, one or more household devices, one or more environmental control systems, one or more landscape maintenance systems, one or more device maintenance systems, one or more cleaning devices, one or more office devices, one or more communications devices, one or more lighting systems, one or more tools, one or more vehicles, one or more drones, or one or more sensors, and/or the like.

According to some embodiments, the one or more IoT-capable devices and/or the one or more household devices might comprise one or more IoT-capable sensors, and/or might further include, without limitation, a desktop computer, a laptop computer, a tablet computer, a smart phone, a mobile phone, a portable gaming device, a database or data storage device, a network access point ("NAP"), a television or monitor, a set-top box ("STB"), a gaming console, an image capture device, a video capture device, a time piece (including, without limitation, a clock, a watch, or other time piece, and the like), a thermostat or environmental control system, a kitchen appliance (e.g., among the one or more kitchen appliances) (including, but not limited to, a microwave oven, a refrigerator, an oven, a range, a stove, an induction cooktop, a pressure cooker, a rice cooker, a bread maker, a coffee machine, a kettle, a dishwasher, a food thermometer, and/or the like), a medical device, a telephone system, a speaker, a media recording and/or playback device, a lighting system, a customer premises security control system, one or more dedicated remote control devices, one or more universal remote control devices, and/or other IoT-capable devices. In some cases, the other IoT-capable devices might include, without limitation, a personal digital assistant, a fitness tracking device, a printer, a scanner, an image projection device, a video projection device, a household appliance, a vehicle, an audio headset, earbuds, virtual reality goggles or headset, augmented reality goggles or headset, a door unlocking/locking system, an automated door opening/closing system, a window locking system, an automated window opening or closing system, an automated window covering control system, a smart window, a solar cell or solar cell array, an electrical outlet or smart node, a power strip or bar, a dimmer switch, a data port, a sprinkler system, exercise equipment, and/or the like.

The one or more IoT-capable devices and/or the one or more household devices might further include, but are not limited to, one or more of a furnace, an air conditioner, one or more automated skylight opening or closing systems, one or more humidifiers, one or more dehumidifiers one or more ventilation fans, one or more automated lawn mowers, one or more automated trimmers, one or more sprinkler systems, one or more fertilizer dispensers, one or more animal deterrent systems, one or more automated snow shovels, one or more automated snow blowers, one or more animal deterrent systems, one or more speakers warning people about machinery in use, one or more lights or display devices warning people about machinery in use, one or more de-icing machines, one or more heating mats, one or more built-in radiant heat systems under the at least one pathway, one or more drones with mounted heat lamps, one or more automated vacuum machines, one or more automated sweeping machines, one or more automated mopping machines, one or more drones with dusting tool, one or more aerial drones with vacuuming tool, one or more aerial drones with wiping tool, one or more air purifiers, one or more air filters, one or more electrostatic particulate collecting tools, a washing machine, a clothes dryer, one or more drones transferring clothes to one or more hampers, one or more drones sorting which clothes go into which hampers based on cleaning requirements for each article of clothing, one or more drones transferring clothes from each hamper into the washing machine, one or more drones transferring clothes from the washing machine into the clothes dryer, one or more drones transferring clothes from the clothes dryer to a clean laundry surface, one or more drones folding and stacking clothes, one or more drones with steamer tool, one or more drones with clothes hanging tool, a fire suppression system, one or more emergency exit markers, one or more exit route markers, one or more lights (e.g., LEDs, indicator lights, warning lights, etc.), one or more fire suppression drones, one or more white noise generators, and/or the like.

Merely by way of example, in some instances, the one or more vehicles might include, but are not limited to, a car, minivan, pickup truck, a motorcycle, an all-terrain vehicle, a scooter, a police vehicle, a fire engine, an ambulance, a recreational vehicle, a semi-tractor-trailer truck, a commercial truck, a bus, a boat, a ship, a submersible, an amphibious vehicle, an airplane, a helicopter, a space vehicle, and/or the like. In some instances, the one or more sensors or one or more IoT-capable sensors might include, without limitation, one or more temperature sensors (e.g., heat sensors, infrared sensors, thermometers, etc.), one or more light sensors (e.g., ambient light sensors, luminosity sensors, illuminance sensors, solar light sensors, etc.), one or more proximity sensors (e.g., vehicle camera-based collision avoidance system, the vehicle radar-based proximity detection system, the vehicle lidar-based proximity detection system, the vehicle sonar-based proximity detection system, etc.), one or more speed sensors, one or more cameras, one or more fuel level sensors (e.g., gasoline tank level sensors, diesel tank level sensors, battery charge level sensors, etc.), one or more location sensors (e.g., global positioning system ("GPS") devices, global navigation satellite system ("GNSS") devices, other location sensors, etc.), one or more other sensors, and/or the like. In some cases, the one or more other sensors might include, but are not limited to, one or more brake sensors, one or more air quality sensors, one or more carbon monoxide sensors, one or more smoke detectors, one or more fluid leak detectors, one or more contact sensors (e.g., for the door lock system, the hood ajar detector, the trunk ajar detector, the moon/sky light ajar detector, the window open detector, and/or the like), one or more audio sensors, one or more accelerometers, one or more telecommunications signal sensors, one or more tire pressure sensors, an engine temperature sensor, one or more fluid leak detectors, one or more occupant sensors, one or more impact sensors, or one or more suspension system diagnostic sensors, and/or the like.

According to some embodiments, the one or more IET tagged objects, when assembled, might form part of one of a building, a tower, a tunnel, a bridge, a railway, a road, an industrial facility, a parking structure, an aqueduct, a viaduct, a canal, a dam, a waterfront structure, or a retaining wall, and/or the like. In such cases, the one or more IET tagged objects might include, without limitation, at least one of one or more bricks, one or more stone blocks, one or more support frame components, one or more roofing components, one or more building structure support pieces, one or more heating, ventilation, and air conditioning ("HVAC") components, one or more railing pieces, one or more wood planks, one or more wood blocks, one or more screws, one or more nails, one or more rivets, one or more bolts, one or more nuts, one or more hinges, one or more brackets, one or more door handle pieces, one or more door lock pieces, one or more drywall pieces, one or more ceiling components, one or more floor tiles, one or more flooring planks, one or more concrete blocks, one or more window frame pieces, one or more window component pieces, one or more doorway pieces, one or more door component pieces, one or more gateway pieces, one or more gate component pieces, one or more fence post pieces, one or more fence components, one or more premises security components, one or more gas conduit pieces, one or more water pipe pieces, one or more plumbing component pieces, one or more electrical wires, one or more electrical conduit pieces, one or more electrical sockets, one or more lighting component pieces, one or more appliance hookup pieces, one or more pump system components, one or more stairway components, one or more elevator structural component, one or more elevator component pieces, one or more escalator structural component, one or more escalator component pieces, one or more siding components, one or more façade pieces, one or more pillar component pieces, one or more pathway component pieces, or one or more shading component pieces, and/or the like.

Alternatively, the plurality of nodes might include, without limitation, at least one patient device each associated with a patient and at least one healthcare device each associated with one or more healthcare providers, wherein the one or more healthcare providers might include, but is not limited to, at least one of a physician, a doctor, a surgeon, a nurse practitioner, a nurse, a medical assistant, a clinical receptionist, a pharmacist, a medical laboratory technician, a healthcare scheduler, or a health insurance agent, and/or the like. In some embodiments, the at least one patient device might include, without limitation, at least one of one or more health monitoring devices, one or more personal tracking devices, an insulin pump, a pace maker, a drug delivery device, a drug storage and dispensing device, or one or more patient user devices, and/or the like, wherein the at least one healthcare device might include, but is not limited to, at least one of a healthcare server, an electronic medical record ("EMR") system, an electronic health record ("EHR") system, or one or more healthcare provider user devices, and/or the like. In some cases, the first source might comprise the at least one patient device, wherein the first destination might comprise the at least one healthcare device, wherein the requested data might include, without limitation, at least one of data regarding physiology of the patient, health tracking data of the patient, or data regarding a health alert associated with the patient, and/or the like. Alternatively, the first source might be the at least one healthcare device, wherein the first destination might be the at least one patient device, wherein the requested data might include, but is not limited to, at least one of data regarding drug prescriptions for the patient, data regarding fitness regime, or data regarding diet, and/or the like.

In some embodiments, the one or more health monitoring devices, the one or more personal tracking devices, and/or the one or more patient user devices might comprise one or more first sensors that monitor physical conditions of a body of the patient and/or one or more second sensors that monitor environmental conditions external to the body of the patient. In some cases, the one or more health monitoring devices, the one or more personal tracking devices, and/or the one or more patient user devices might be a wearable device that can be removably affixed to at least one of a portion of skin of the patient, a limb of the patient, an appendage of the patient, a torso of the patient, a head of the patient, or a piece of clothing worn by the patient, and/or the like. Alternatively, the one or more health monitoring devices, the one or more personal tracking devices, and/or the one or more patient user devices might be an implantable device that can be at least one of implanted under one or more layers of skin of the patient, implanted within an organ of the patient, implanted within a torso of the patient, implanted in an internal cavity of the patient, or implanted in an external cavity of the patient, and/or the like. In some embodiments, multiple devices among the one or more health monitoring devices, the one or more personal tracking devices, and/or the one or more patient user devices may be used to monitor the physiological conditions of the patient's body and/or to monitor the environmental conditions external to the patient's body, and can comprise either a plurality of wearable personal trackers, a plurality of implantable personal trackers, or a combination of at least one wearable personal tracker and at least one implantable personal tracker.

Herein, "personal tracker" or "personal tracking device" might refer to at least one of a fitness tracker, an activity tracker, a medical monitor, an environmental safety monitor, and/or the like. The fitness tracker, activity tracker, and medical monitor might be worn by, or implanted in, any person or by a patient under the care of a physician or other doctor. The environmental safety monitor might be worn by, or implanted in, people entering or working in hazardous environments, including, but not limited to, miners, astronauts, test pilots, emergency responders, deep sea explorers, oil rig workers, construction workers, volcanologists, onsite meteorologists (e.g., stormchasers, etc.), nuclear facility operators, nuclear clean-up crew members, submersible crew members, military combatants, law enforcement officers, peacekeepers, mountain climbers, canyoneers, cavers, and/or the like.

In some aspects, in some embodiments, the one or more health monitoring devices, the one or more personal tracking devices, and/or the one or more patient user devices might include, without limitation, at least one of a wearable drug delivery device, an implantable drug delivery device, a medical server, a medical database, a user device accessible by a physician, a user device accessible by a healthcare provider, a user device associated with the user, a user device associated with a relative or guardian of the user, a user device accessible by an emergency response team member, a smart medical alert bracelet, an IoT management node, an IoT human interface device, an IoT vehicle node, one or more household devices, one or more office devices, one or more lighting systems, one or more environmental control systems, one or more speakers, one or more display devices, or one or more communications systems, and/or the like.

According to some embodiments, the one or more first sensors might include, without limitation, at least one of a heart rate monitor, a pulse oximeter, an oximeter, a blood glucose monitor, a blood pressure monitor, a blood flow monitor, a nitrogen monitor, a carbon dioxide monitor, a sleep monitor, an activity monitor, a step counter, one or more limb movement monitors, one or more thermometers, one or more accelerometers, one or more gyroscopes, one or more body fat monitors, one or more body muscle monitors, one or more bone density monitors, one or more pH monitors, a body fluid monitor, an electroencephalograph, an electrocardiograph, a respiratory rate monitor, a serotonin monitor, an epilepsy monitor, a skin toxicity monitor, a blood toxicity monitor, an organ toxicity monitor, a cancer monitor, a blood tester, one or more blood alcohol level detectors, one or more drug testers, or one or more location monitors, and/or the like.

In some embodiments, the one or more second sensors might include, but are not limited to, at least one of an ambient temperature sensor, a flame detector, a particulate sensor, a light sensor, a humidity sensor, an air quality sensor, an atmospheric oxygen level monitor, an atmospheric carbon dioxide level monitor, an atmospheric nitrogen level monitor, an atmospheric pressure sensor, an environmental carbon monoxide sensor, a smoke detector, a gas toxicity monitor, a carcinogen detector, a radiation sensor, a location sensor, a telecommunications signal sensor, a sound amplitude sensor, a frequency sensor, an accelerometer, a proximity sensor, a weather sensor, or a seismic sensor, and/or the like.

Exemplary System and Hardware Implementation

Figure 5:
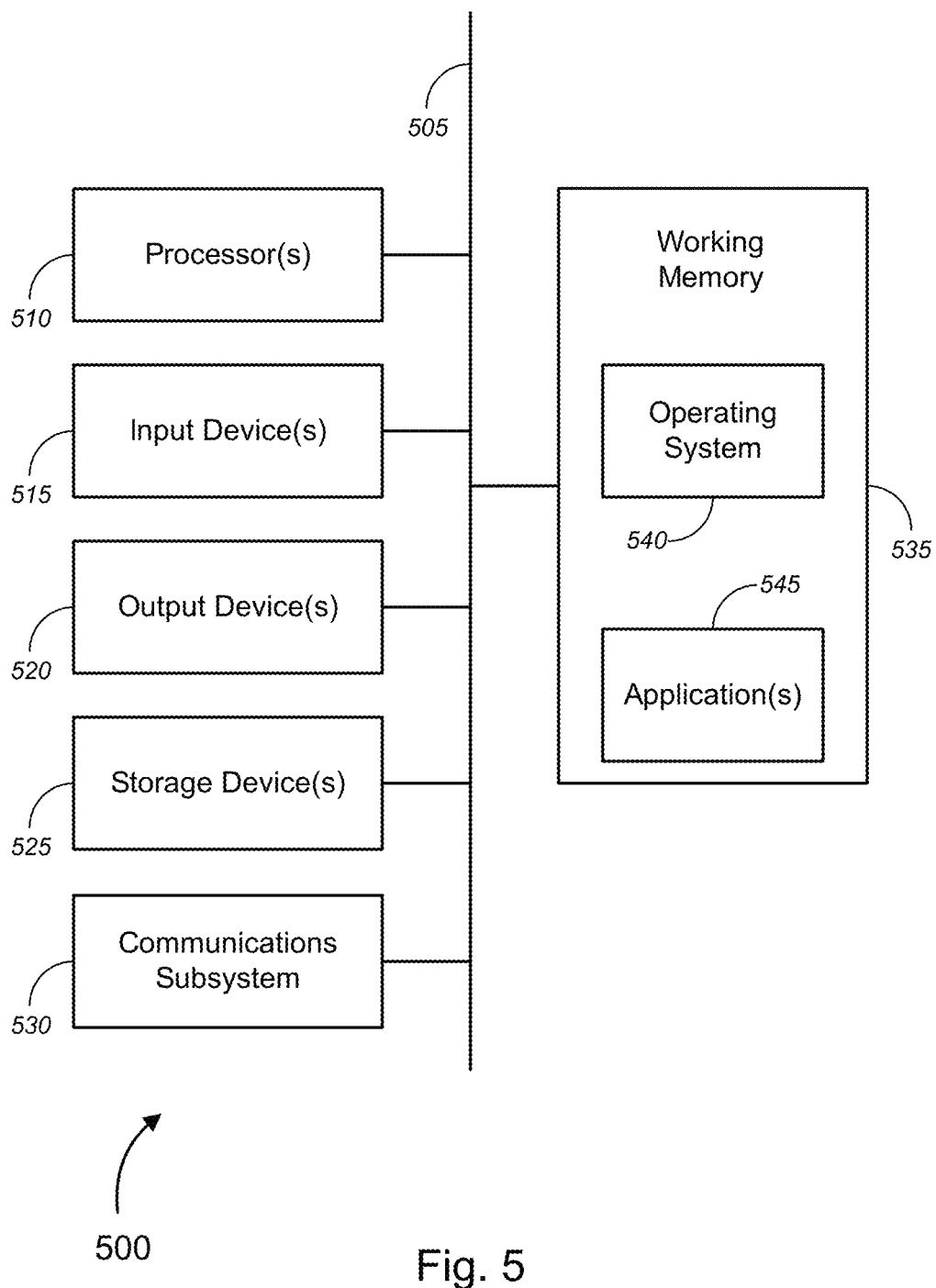
FIG. 5 is a block diagram illustrating an exemplary computer or system hardware architecture, in accordance with various embodiments.

FIG. 5 is a block diagram illustrating an exemplary computer or system hardware architecture, in accordance with various embodiments. FIG. 5 provides a schematic illustration of one embodiment of a computer system 500 of the service provider system hardware that can perform the methods provided by various other embodiments, as described herein, and/or can perform the functions of computer or hardware system (i.e., source/connected/patient devices 105, 205, 305, 305', and 305", destination/connected/healthcare devices 115, 215, 315, 315', and 315", computing systems 125a-125c, 225, 325, and 325a-325c, nodes 150a-150n and 350a-350n, and nodes 160a-160n, 260a-260n, and 360a-360n, etc.), as described above. It should be noted that FIG. 5 is meant only to provide a generalized illustration of various components, of which one or more (or none) of each may be utilized as appropriate. FIG. 5, therefore, broadly illustrates how individual system elements may be implemented in a relatively separated or relatively more integrated manner.

The computer or hardware system 500—which might represent an embodiment of the computer or hardware system (i.e., source/connected/patient devices 105, 205, 305, 305', and 305", destination/connected/healthcare devices 115, 215, 315, 315', and 315", computing systems 125a-125c, 225, 325, and 325a-325c, nodes 150a-150n and 350a-350n, and nodes 160a-160n, 260a-260n, and 360a-360n, etc.), described above with respect to FIGS. 1-4—is shown comprising hardware elements that can be electrically coupled via a bus 505 (or may otherwise be in communication, as appropriate). The hardware elements may include one or more processors 510, including, without limitation, one or more general-purpose processors and/or one or more special-purpose processors (such as microprocessors, digital signal processing chips, graphics acceleration processors, and/or the like); one or more input devices 515, which can include, without limitation, a mouse, a keyboard, and/or the like; and one or more output devices 520, which can include, without limitation, a display device, a printer, and/or the like.

The computer or hardware system 500 may further include (and/or be in communication with) one or more storage devices 525, which can comprise, without limitation, local and/or network accessible storage, and/or can include, without limitation, a disk drive, a drive array, an optical storage device, solid-state storage device such as a random access memory ("RAM") and/or a read-only memory ("ROM"), which can be programmable, flash-updateable, and/or the like. Such storage devices may be configured to implement any appropriate data stores, including, without limitation, various file systems, database structures, and/or the like.

The computer or hardware system 500 might also include a communications subsystem 530, which can include, without limitation, a modem, a network card (wireless or wired), an infra-red communication device, a wireless communication device and/or chipset (such as a Bluetooth™ device, an 802.11 device, a WiFi device, a WiMax device, a WWAN device, cellular communication facilities, etc.), and/or the like. The communications subsystem 530 may permit data to be exchanged with a network (such as the network described below, to name one example), with other computer or hardware systems, and/or with any other devices described herein. In many embodiments, the computer or hardware system 500 will further comprise a working memory 535, which can include a RAM or ROM device, as described above.

The computer or hardware system 500 also may comprise software elements, shown as being currently located within the working memory 535, including an operating system 540, device drivers, executable libraries, and/or other code, such as one or more application programs 545, which may comprise computer programs provided by various embodiments (including, without limitation, hypervisors, VMs, and the like), and/or may be designed to implement methods, and/or configure systems, provided by other embodiments, as described herein. Merely by way of example, one or more procedures described with respect to the method(s) discussed above might be implemented as code and/or instructions executable by a computer (and/or a processor within a computer); in an aspect, then, such code and/or instructions can be used to configure and/or adapt a general purpose computer (or other device) to perform one or more operations in accordance with the described methods.

A set of these instructions and/or code might be encoded and/or stored on a non-transitory computer readable storage medium, such as the storage device(s) 525 described above. In some cases, the storage medium might be incorporated within a computer system, such as the system 500. In other embodiments, the storage medium might be separate from a computer system (i.e., a removable medium, such as a compact disc, etc.), and/or provided in an installation package, such that the storage medium can be used to program, configure, and/or adapt a general purpose computer with the instructions/code stored thereon. These instructions might take the form of executable code, which is executable by the computer or hardware system 500 and/or might take the form of source and/or installable code, which, upon compilation and/or installation on the computer or hardware system 500 (e.g., using any of a variety of generally available compilers, installation programs, compression/decompression utilities, etc.) then takes the form of executable code.

It will be apparent to those skilled in the art that substantial variations may be made in accordance with specific requirements. For example, customized hardware (such as programmable logic controllers, field-programmable gate arrays, application-specific integrated circuits, and/or the like) might also be used, and/or particular elements might be implemented in hardware, software (including portable software, such as applets, etc.), or both. Further, connection to other computing devices such as network input/output devices may be employed.

As mentioned above, in one aspect, some embodiments may employ a computer or hardware system (such as the computer or hardware system 500) to perform methods in accordance with various embodiments of the invention. According to a set of embodiments, some or all of the procedures of such methods are performed by the computer or hardware system 500 in response to processor 510 executing one or more sequences of one or more instructions (which might be incorporated into the operating system 540 and/or other code, such as an application program 545) contained in the working memory 535. Such instructions may be read into the working memory 535 from another computer readable medium, such as one or more of the storage device(s) 525. Merely by way of example, execution of the sequences of instructions contained in the working memory 535 might cause the processor(s) 510 to perform one or more procedures of the methods described herein.

The terms "machine readable medium" and "computer readable medium," as used herein, refer to any medium that participates in providing data that causes a machine to operate in a specific fashion. In an embodiment implemented using the computer or hardware system 500, various computer readable media might be involved in providing instructions/code to processor(s) 510 for execution and/or might be used to store and/or carry such instructions/code (e.g., as signals). In many implementations, a computer readable medium is a non-transitory, physical, and/or tangible storage medium. In some embodiments, a computer readable medium may take many forms, including, but not limited to, non-volatile media, volatile media, or the like. Non-volatile media includes, for example, optical and/or magnetic disks, such as the storage device(s) 525. Volatile media includes, without limitation, dynamic memory, such as the working memory 535. In some alternative embodiments, a computer readable medium may take the form of transmission media, which includes, without limitation, coaxial cables, copper wire, and fiber optics, including the wires that comprise the bus 505, as well as the various components of the communication subsystem 530 (and/or the media by which the communications subsystem 530 provides communication with other devices). In an alternative set of embodiments, transmission media can also take the form of waves (including without limitation radio, acoustic, and/or light waves, such as those generated during radio-wave and infra-red data communications).

Common forms of physical and/or tangible computer readable media include, for example, a floppy disk, a flexible disk, a hard disk, magnetic tape, or any other magnetic medium, a CD-ROM, any other optical medium, punch cards, paper tape, any other physical medium with patterns of holes, a RAM, a PROM, and EPROM, a FLASH-EPROM, any other memory chip or cartridge, a carrier wave as described hereinafter, or any other medium from which a computer can read instructions and/or code.

Various forms of computer readable media may be involved in carrying one or more sequences of one or more instructions to the processor(s) 510 for execution. Merely by way of example, the instructions may initially be carried on a magnetic disk and/or optical disc of a remote computer. A remote computer might load the instructions into its dynamic memory and send the instructions as signals over a transmission medium to be received and/or executed by the computer or hardware system 500. These signals, which might be in the form of electromagnetic signals, acoustic signals, optical signals, and/or the like, are all examples of carrier waves on which instructions can be encoded, in accordance with various embodiments of the invention.

The communications subsystem 530 (and/or components thereof) generally will receive the signals, and the bus 505 then might carry the signals (and/or the data, instructions, etc. carried by the signals) to the working memory 535, from which the processor(s) 505 retrieves and executes the instructions. The instructions received by the working memory 535 may optionally be stored on a storage device 525 either before or after execution by the processor(s) 510.

Figure 6:
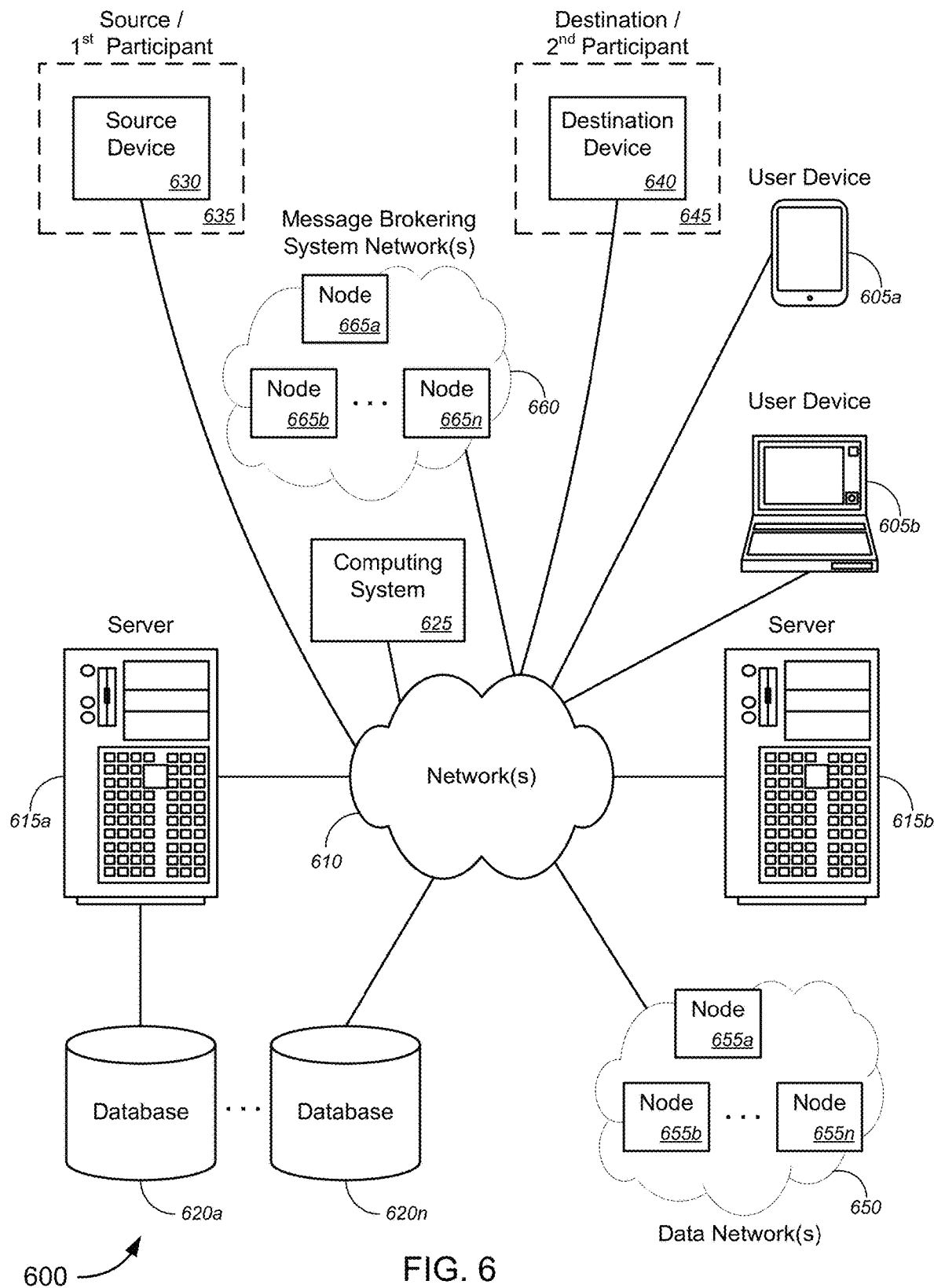
FIG. 6 is a block diagram illustrating a networked system of computers, computing systems, or system hardware architecture, which can be used in accordance with various embodiments.

As noted above, a set of embodiments comprises methods and systems for implementing data routing over message brokering system network, and, more particularly, to methods, systems, and apparatuses for implementing data routing or prioritized data routing over message brokering system network for connected devices. FIG. 6 illustrates a schematic diagram of a system 600 that can be used in accordance with one set of embodiments. The system 600 can include one or more user computers, user devices, or customer devices 605. A user computer, user device, or customer device 605 can be a general purpose personal computer (including, merely by way of example, desktop computers, tablet computers, laptop computers, handheld computers, and the like, running any appropriate operating system, several of which are available from vendors such as Apple, Microsoft Corp., and the like), cloud computing devices, a server(s), and/or a workstation computer(s) running any of a variety of commercially-available UNIX™ or UNIX-like operating systems. A user computer, user device, or customer device 605 can also have any of a variety of applications, including one or more applications configured to perform methods provided by various embodiments (as described above, for example), as well as one or more office applications, database client and/or server applications, and/or web browser applications. Alternatively, a user computer, user device, or customer device 605 can be any other electronic device, such as a thin-client computer, Internet-enabled mobile telephone, and/or personal digital assistant, capable of communicating via a network (e.g., the network(s) 610 described below) and/or of displaying and navigating web pages or other types of electronic documents. Although the exemplary system 600 is shown with two user computers, user devices, or customer devices 605, any number of user computers, user devices, or customer devices can be supported.

Certain embodiments operate in a networked environment, which can include a network(s) 610. The network(s) 610 can be any type of network familiar to those skilled in the art that can support data communications using any of a variety of commercially-available (and/or free or proprietary) protocols, including, without limitation, TCP/IP, SNA™, IPX™, AppleTalk™, and the like. Merely by way of example, the network(s) 610 (similar to networks 135 and 140a-140n of FIG. 1, network(s) 235 of FIG. 2, and/or networks 335 and 340a-340n of FIG. 3, or the like) can each include a local area network ("LAN"), including, without limitation, a fiber network, an Ethernet network, a Token-Ring™ network, and/or the like; a wide-area network ("WAN"); a wireless wide area network ("WWAN"); a virtual network, such as a virtual private network ("VPN"); the Internet; an intranet; an extranet; a public switched telephone network ("PSTN"); an infra-red network; a wireless network, including, without limitation, a network operating under any of the IEEE 802.11 suite of protocols, the Bluetooth™ protocol known in the art, and/or any other wireless protocol; and/or any combination of these and/or other networks. In a particular embodiment, the network might include an access network of the service provider (e.g., an Internet service provider ("ISP")). In another embodiment, the network might include a core network of the service provider, and/or the Internet.

Embodiments can also include one or more server computers 615. Each of the server computers 615 may be configured with an operating system, including, without limitation, any of those discussed above, as well as any commercially (or freely) available server operating systems. Each of the servers 615 may also be running one or more applications, which can be configured to provide services to one or more clients 605 and/or other servers 615.

Merely by way of example, one of the servers 615 might be a data server, a web server, a cloud computing device(s), or the like, as described above. The data server might include (or be in communication with) a web server, which can be used, merely by way of example, to process requests for web pages or other electronic documents from user computers 605. The web server can also run a variety of server applications, including HTTP servers, FTP servers, CGI servers, database servers, Java servers, and the like. In some embodiments of the invention, the web server may be configured to serve web pages that can be operated within a web browser on one or more of the user computers 605 to perform methods of the invention.

The server computers 615, in some embodiments, might include one or more application servers, which can be configured with one or more applications accessible by a client running on one or more of the client computers 605 and/or other servers 615. Merely by way of example, the server(s) 615 can be one or more general purpose computers capable of executing programs or scripts in response to the user computers 605 and/or other servers 615, including, without limitation, web applications (which might, in some cases, be configured to perform methods provided by various embodiments). Merely by way of example, a web application can be implemented as one or more scripts or programs written in any suitable programming language, such as Java™, C, C#™ or C++, and/or any scripting language, such as Perl, Python, or TCL, as well as combinations of any programming and/or scripting languages. The application server(s) can also include database servers, including, without limitation, those commercially available from Oracle™, Microsoft™, Sybase™, IBM™, and the like, which can process requests from clients (including, depending on the configuration, dedicated database clients, API clients, web browsers, etc.) running on a user computer, user device, or customer device 605 and/or another server 615. In some embodiments, an application server can perform one or more of the processes for implementing data routing over message brokering system network, and, more particularly, to methods, systems, and apparatuses for implementing data routing or prioritized data routing over message brokering system network for connected devices, as described in detail above. Data provided by an application server may be formatted as one or more web pages (comprising HTML, JavaScript, etc., for example) and/or may be forwarded to a user computer 605 via a web server (as described above, for example). Similarly, a web server might receive web page requests and/or input data from a user computer 605 and/or forward the web page requests and/or input data to an application server. In some cases, a web server may be integrated with an application server.

In accordance with further embodiments, one or more servers 615 can function as a file server and/or can include one or more of the files (e.g., application code, data files, etc.) necessary to implement various disclosed methods, incorporated by an application running on a user computer 605 and/or another server 615. Alternatively, as those skilled in the art will appreciate, a file server can include all necessary files, allowing such an application to be invoked remotely by a user computer, user device, or customer device 605 and/or server 615.

It should be noted that the functions described with respect to various servers herein (e.g., application server, database server, web server, file server, etc.) can be performed by a single server and/or a plurality of specialized servers, depending on implementation-specific needs and parameters.

In certain embodiments, the system can include one or more databases 620a-620n (collectively, "databases 620"). The location of each of the databases 620 is discretionary: merely by way of example, a database 620a might reside on a storage medium local to (and/or resident in) a server 615a (and/or a user computer, user device, or customer device 605). Alternatively, a database 620n can be remote from any or all of the computers 605, 615, so long as it can be in communication (e.g., via the network 610) with one or more of these. In a particular set of embodiments, a database 620 can reside in a storage-area network ("SAN") familiar to those skilled in the art. (Likewise, any necessary files for performing the functions attributed to the computers 605, 615 can be stored locally on the respective computer and/or remotely, as appropriate.) In one set of embodiments, the database 620 can be a relational database, such as an Oracle database, that is adapted to store, update, and retrieve data in response to SQL-formatted commands. The database might be controlled and/or maintained by a database server, as described above, for example.

According to some embodiments, system 600 might further comprise a computing system 625 (similar to computing systems 125a-125c, 225, 325, and 325a-325c of FIGS. 1-3, or the like), a source device 630 (similar to source/connected/patient devices 105, 205, 305, 305', or 305" of FIGS. 1-3, or the like) that is associated with a source or a first participant 635 (similar to source/first participant 110, 210, or 310, first device 310', or patient 310" of FIGS. 1-3, or the like), and a destination device 640 (similar to destination/connected/healthcare devices 115, 215, 315, 315', or 315" of FIGS. 1-3, or the like) that is associated with a destination or a second participant 645 (similar to destination/second participant 120, 220, or 320, second device 320', or healthcare provider 320" of FIGS. 1-3, or the like). System 600 might further comprise nodes 655a-655n (similar to nodes 150a-150n and 350a-350n of FIGS. 1 and 3, or the like) that are part of data network(s) 650 (similar to data networks 140a-140n and 340a-340n of FIGS. 1 and 3, or the like) and nodes 665a-665n (similar to nodes 160a-160n, 260a-260n, and 360a-360n of FIGS. 1-3, or the like) that are part of message brokering system network(s) 660 (similar to message brokering system networks 135, 235, and 335 of FIGS. 1-3, or the like).

In some aspects, computing system 625 might receive a request to transfer data from a first source (e.g., source or first participant 635) to a first destination (e.g., destination or second participant 645) over a network. In some instances, the request might be sent by the first source (or the source device) or might be sent by the first destination (or the destination device). Conventionally, the computing system 625 might route the requested data through one or more nodes 655 among a plurality of nodes 655a-655n over the one or more data networks 650 from the source device 630 associated with the source or the first participant 635 to the destination device 640 associated with the destination or the second participant 645, in some cases, via a data routing path (such as data routing path 145 through node 155b, node

155a, node 155x, node 155x+1, and node 155n, as shown in the non-limiting example of FIG. 1, depicted by dashed-lined arrow 145). Such data routing, however, is susceptible to at least one of latency issues, bandwidth constraints, network hand-off issues between or among networks that are owned and/or operated by different network service providers, and/or the like.

Rather than using data routing over data networks, the various embodiments adapt and utilize message brokering systems to route or redistribute data, by converting the data packets into data message batches. In some embodiments, the messaging brokering systems might be adapted with a hardware and/or software overlay (e.g., creating a special type of software defined network ("SDN"), or the like) that allows use of the messaging brokering systems (e.g., Apache Kafka® or Confluent® Platform, or the like) to act as a packet relay agent. In some cases, reduced instruction set computing ("RISC") architectures (such as ARM-based hardware) and/or software components, and/or the like, may be used to plug into the framework of the messaging brokering systems. The use of the message brokering systems, as described herein with respect to the various embodiments, allows one to sustain a maximum throughput (e.g., 4 Tbps or greater) across a highly distributed network without regard for network ownership, resulting in an "over-the-top ('OTT') network translation." In other words, rather than encapsulating network traffic and routing information in packet header and packet body, the packet information and payload are abstracted (in some cases, at the network layer and rewritten as OSI model layer 7 message)—with a consumer (i.e., the destination) and a producer (i.e., the source), along with header attributes (such as protocol, etc.), encapsulated in a message header. A message clustering solution of the message brokering systems is designed to manage the faster route between the consumer and the producer. The system also provides a registration process that allows consumers to sign up for the OTT routing capability.

In operation, in response to receiving the request to transfer data from the first source (e.g., source or first participant 635) to the first destination (e.g., destination or second participant 645) over a network, the computing system 625 might map messaging connections among two or more nodes 665 among a plurality of nodes 665a-665n within the message brokering system or the message brokering system network(s) 660, each node 665 among the plurality of nodes 665a-665n being associated with a participant among a plurality of participants in the message brokering system 660. In some instances, the first source might be associated with the first participant 635 among the plurality of participants and the first destination might be associated with the second participant 645 among the plurality of participants. The computing system 625 might analyze a map of messaging connections among the two or more nodes 665 within the message brokering system or the message brokering system network(s) 660 to identify a connection path between the first source associated with the first participant and the first destination associated with the second participant within the message brokering system.

The computing system 625 might encapsulate first information associated with at least one of the first participant or the first source, second information associated with at least one of the second participant or the first destination, and third information regarding data protocol in a header portion of each of at least one first message batch transported using the message brokering system; might encapsulate the requested data distributed amongst payload portions of each of the at least one first message batch transported using the message brokering system or the message brokering system network(s) 660; and might send the at least one first message batch from the first source associated with the first participant to the first destination associated with the second participant over the network via the message brokering system or the message brokering system network(s) 660 over the identified connection path. Here, if the requested data can be contained within the payload portion of a single message batch, only a single message batch of the at least one first message batch may be used or sent from the first source associated with the first participant to the first destination associated with the second participant over the network via the message brokering system or the message brokering system network(s) 660 over the identified connection path. However, if the requested data cannot be contained within the payload portion of a single message batch, the requested data is distributed across the payload portions of multiple message batches of the at least one first message batch (as described above) and the multiple message batches are subsequent sent from the first source associated with the first participant to the first destination associated with the second participant over the network via the message brokering system or the message brokering system network(s) 660 over the identified connection path.

In some cases, the identified connection path might include routing through the plurality of nodes 665a-665n (e.g., through source node 165a associated with the source device 130, node 165f, node 165c, node 165d, node 165e, and destination node 165b associated with the destination device 140, as shown in the non-limiting example of FIG. 1, depicted by bold solid arrow 155). According to some embodiments, encapsulating the first information, the second information, and the third information in the header portion of each of at least one first message batch and encapsulating the requested data distributed amongst payload portions of each of the at least one first message batch might occur at layer 7 or application layer of open systems interconnection ("OSI") model. The computing system 625 might extract the requested data from the payload portions of the at least one first message batch after the first destination associated with the second participant has received the at least one first message batch via the message brokering system.

In some embodiments, identifying a connection path between the first source associated with the first participant and the first destination associated with the second participant within the message brokering system might comprise determining whether there is a direct connection between the first source associated with the first participant and the first destination associated with the second participant within the message brokering system. Based on a determination that there is a direct connection between the first source associated with the first participant and the first destination associated with the second participant within the message brokering system, the computing system 625 might encapsulate first information associated with at least one of the first participant or the first source, second information associated with at least one of the second participant or the first destination, and third information regarding data protocol in a header portion of each of at least one first message batch transported using the message brokering system; might encapsulate the requested data distributed amongst payload portions of each of the at least one first message batch transported using the message brokering system; might send the at least one first message batch from the first source associated with the first participant to the first destination associated with the second participant over the network via the message brokering system; and might extract the requested data from the payload portions of the at least one first message batch after the first destination associated with the second participant has received the at least one first message batch via the message brokering system.

Based on a determination that there is no direct connection between the first source associated with the first participant and the first destination associated with the second participant within the message brokering system, the computing system 625 might analyze the map of messaging connections among the two or more nodes within the message brokering system to identify one or more intermediate nodes or participants between the first source associated with the first participant and the first destination associated with the second participant within the message brokering system. Based on a determination that one or more intermediate nodes or participants between the first source associated with the first participant and the first destination associated with the second participant within the message brokering system have been identified, the computing system 625 might encapsulate the first information associated with at least one of the first participant or the first source, the second information associated with at least one of the second participant or the first destination, the third information regarding data protocol, and fourth information associated with each of the one or more intermediate nodes or participants in a header portion of each of at least one second message batch transported using the message brokering system; might encapsulate the requested data distributed amongst payload portions of each of the at least one second message batch transported using the message brokering system; might send the at least one second message batch from the first source associated with the first participant to the first destination associated with the second participant via each of the one or more intermediate nodes over the network via the message brokering system; and might extract the requested data from the payload portions of the at least one second message batch after the first destination associated with the second participant has received the at least one second message batch via the message brokering system.

In some embodiments, the one or more intermediate nodes might include, but are not limited to, one or more of at least one first intermediate node each associated with a third participant among a plurality of third participants listed in a contact list of the first participant, at least one second intermediate node each associated with a fourth participant among a plurality of fourth participants listed in a contact list of the second participant, or at least one third intermediate node each associated with one of a fourth participant among a plurality of fourth participants listed in a contact list of a third participant or a fifth participant among a plurality of fifth participants listed in a contact list of a fourth participant, and/or the like. Alternatively, the one or more intermediate nodes might include, without limitation, one or more fourth intermediate nodes each not associated with any contact lists of the first participant, the second participant, and the third participants.

According to some embodiments, sending the at least one second message batch from the first source associated with the first participant to the first destination associated with the second participant via each of the one or more intermediate nodes over the network via the message brokering system might comprise the computing system 625 causing the first source to publish the at least one second message batch; causing each of the one or more intermediate nodes, in turn, to subscribe to the at least one second message batch and to publish the at least one second message batch; and causing the first destination to subscribe to the at least one second message batch.

In some embodiments, a connection path may be identified according to various different implementations. For example, identifying a connection path between the first source associated with the first participant and the first destination associated with the second participant within the message brokering system might comprise the computing system 625 identifying a plurality of different candidate connection paths between the first source associated with the first participant and the first destination associated with the second participant within the message brokering system, based on analysis of the map of messaging connections among the two or more nodes within the message brokering system; determining a bandwidth available over each sub-path for each candidate connection path among the plurality of different candidate connection paths between the first source associated with the first participant and the first destination associated with the second participant within the message brokering system; and selecting a candidate connection path among the plurality of different candidate connection paths that best matches available bandwidth across each sub-path of the candidate connection path.

Alternatively, identifying a connection path between the first source associated with the first participant and the first destination associated with the second participant within the message brokering system might comprise the computing system 625 identifying a plurality of different candidate connection paths between the first source associated with the first participant and the first destination associated with the second participant within the message brokering system, based on analysis of the map of messaging connections among the two or more nodes within the message brokering system; determining at least one of a message transfer latency or a message transfer length over each sub-path for each candidate connection path among the plurality of different candidate connection paths between the first source associated with the first participant and the first destination associated with the second participant within the message brokering system; and selecting a candidate connection path among the plurality of different candidate connection paths that provides the most optimal connection path between the first source associated with the first participant and the first destination associated with the second participant within the message brokering system in terms of at least one of time or distance.

According to some embodiments, the system might take into account priority for data transfer. After encapsulating the first, second, and third information in the header portion of each of the at least one first message batch and after encapsulating the requested data distributed amongst the payload portions of each of the at least one first message batch, the computing system 625 might determine whether the requested data comprises one or more sub-data having different priority levels. Based on a determination that one or more sub-data of the requested data have different priority levels, identifying, with the computing system 625, one or more first sub-data among the one or more sub-data that has the highest priority, the computing system 625 might identify one or more first sub-data among the one or more sub-data that has the highest priority. In such cases, sending the at least one first message batch from the first source associated with the first participant to the first destination associated with the second participant over the network via the message brokering system over the identified connection path might comprise the computing system 625 sending the identified one or more first sub-data having the highest priority ahead of the other sub-data (or in order of priority) among the one or more sub-data via the message brokering system over the identified connection path.

These and other functions of the system 600 (and its components) are described in greater detail above with respect to FIGS. 1-4.

While certain features and aspects have been described with respect to exemplary embodiments, one skilled in the art will recognize that numerous modifications are possible. For example, the methods and processes described herein may be implemented using hardware components, software components, and/or any combination thereof. Further, while various methods and processes described herein may be described with respect to particular structural and/or functional components for ease of description, methods provided by various embodiments are not limited to any particular structural and/or functional architecture but instead can be implemented on any suitable hardware, firmware and/or software configuration. Similarly, while certain functionality is ascribed to certain system components, unless the context dictates otherwise, this functionality can be distributed among various other system components in accordance with the several embodiments.

Moreover, while the procedures of the methods and processes described herein are described in a particular order for ease of description, unless the context dictates otherwise, various procedures may be reordered, added, and/or omitted in accordance with various embodiments. Moreover, the procedures described with respect to one method or process may be incorporated within other described methods or processes; likewise, system components described according to a particular structural architecture and/or with respect to one system may be organized in alternative structural architectures and/or incorporated within other described systems. Hence, while various embodiments are described with—or without—certain features for ease of description and to illustrate exemplary aspects of those embodiments, the various components and/or features described herein with respect to a particular embodiment can be substituted, added and/or subtracted from among other described embodiments, unless the context dictates otherwise. Consequently, although several exemplary embodiments are described above, it will be appreciated that the invention is intended to cover all modifications and equivalents within the scope of the following claims.

What is claimed is:

1. A method, comprising:
   receiving, with a computing system, a request to transfer data from a first source to a first destination over a network;
   mapping, with the computing system, messaging connections among two or more nodes among a plurality of nodes within a message brokering system, each node among the plurality of nodes being associated with a participant among a plurality of participants in the message brokering system, wherein the first source is associated with a first participant among the plurality of participants and the first destination is associated with a second participant among the plurality of participants;
   analyzing, with the computing system, a map of messaging connections among the two or more nodes within the message brokering system to determine whether there is a direct connection between the first source associated with the first participant and the first destination associated with the second participant within the message brokering system;
   based on a determination that there is a direct connection between the first source associated with the first participant and the first destination associated with the second participant within the message brokering system, performing the following:
      encapsulating, with the computing system, first information associated with at least one of the first participant or the first source, second information associated with at least one of the second participant or the first destination, and third information regarding data protocol in a header portion of each of at least one first message batch transported using the message brokering system;
      encapsulating, with the computing system, the requested data distributed amongst payload portions of each of the at least one first message batch transported using the message brokering system;
      sending, with the computing system, the at least one first message batch from the first source associated with the first participant to the first destination associated with the second participant over the network via the message brokering system; and
      extracting, with the computing system, the requested data from the payload portions of the at least one first message batch after the first destination associated with the second participant has received the at least one first message batch via the message brokering system;
   based on a determination that there is no direct connection between the first source associated with the first participant and the first destination associated with the second participant within the message brokering system, performing the following:
      analyzing, with the computing system, the map of messaging connections among the two or more nodes within the message brokering system to identify one or more intermediate nodes or participants between the first source associated with the first participant and the first destination associated with the second participant within the message brokering system;
      based on a determination that one or more intermediate nodes or participants between the first source associated with the first participant and the first destination associated with the second participant within the message brokering system have been identified, performing the following:
         encapsulating, with the computing system, the first information associated with at least one of the first participant or the first source, the second information associated with at least one of the second participant or the first destination, the third information regarding data protocol, and fourth information associated with each of the one or more intermediate nodes or participants in a header portion of each of at least one second message batch transported using the message brokering system;
         encapsulating, with the computing system, the requested data distributed amongst payload portions of each of the at least one second message batch transported using the message brokering system;
         sending, with the computing system, the at least one second message batch from the first source associated with the first participant to the first destination associated with the second participant via each of the one or more intermediate nodes over the network via the message brokering system; and extracting, with the computing system, the requested data from the payload portions of the at least one second message batch after the first destination associated with the second participant has received the at least one second message batch via the message brokering system.

2. A method, comprising:

receiving, with a computing system, a request to transfer data from a first source to a first destination over a network;

mapping, with the computing system, messaging connections among two or more nodes among a plurality of nodes within a message brokering system, each node among the plurality of nodes being associated with a participant among a plurality of participants in the message brokering system, wherein the first source is associated with a first participant among the plurality of participants and the first destination is associated with a second participant among the plurality of participants;

analyzing, with the computing system, a map of messaging connections among the two or more nodes within the message brokering system to identify a connection path between the first source associated with the first participant and the first destination associated with the second participant within the message brokering system;

encapsulating, with the computing system, first information associated with at least one of the first participant or the first source, second information associated with at least one of the second participant or the first destination, and third information regarding data protocol in a header portion of each of at least one first message batch transported using the message brokering system;

encapsulating, with the computing system, the requested data distributed amongst payload portions of each of the at least one first message batch transported using the message brokering system;

sending, with the computing system, the at least one first message batch from the first source associated with the first participant to the first destination associated with the second participant over the network via the message brokering system over the identified connection path; and extracting, with the computing system, the requested data from the payload portions of the at least one first message batch after the first destination associated with the second participant has received the at least one first message batch via the message brokering system.

3. The method of claim 2, wherein the computing system comprises at least one of a computing system of the message brokering system, a controller of the message brokering system, a zookeeper of the message brokering system, a data routing computing system, a network routing computing system, a server computer, a distributed computing system, or a cloud computing system.

4. The method of claim 2, wherein identifying a connection path between the first source associated with the first participant and the first destination associated with the second participant within the message brokering system comprises:

determining whether there is a direct connection between the first source associated with the first participant and the first destination associated with the second participant within the message brokering system;

based on a determination that there is a direct connection between the first source associated with the first participant and the first destination associated with the second participant within the message brokering system, performing the following:

encapsulating, with the computing system, first information associated with at least one of the first participant or the first source, second information associated with at least one of the second participant or the first destination, and third information regarding data protocol in a header portion of each of at least one first message batch transported using the message brokering system;

encapsulating, with the computing system, the requested data distributed amongst payload portions of each of the at least one first message batch transported using the message brokering system;

sending, with the computing system, the at least one first message batch from the first source associated with the first participant to the first destination associated with the second participant over the network via the message brokering system; and extracting, with the computing system, the requested data from the payload portions of the at least one first message batch after the first destination associated with the second participant has received the at least one first message batch via the message brokering system.

5. The method of claim 4, further comprising:

based on a determination that there is no direct connection between the first source associated with the first participant and the first destination associated with the second participant within the message brokering system, performing the following:

analyzing, with the computing system, the map of messaging connections among the two or more nodes within the message brokering system to identify one or more intermediate nodes or participants between the first source associated with the first participant and the first destination associated with the second participant within the message brokering system;

based on a determination that one or more intermediate nodes or participants between the first source associated with the first participant and the first destination associated with the second participant within the message brokering system have been identified, performing the following:

encapsulating, with the computing system, the first information associated with at least one of the first participant or the first source, the second information associated with at least one of the second participant or the first destination, the third information regarding data protocol, and fourth information associated with each of the one or more intermediate nodes or participants in a header portion of each of at least one second message batch transported using the message brokering system;

encapsulating, with the computing system, the requested data distributed amongst payload portions of each of the at least one second message batch transported using the message brokering system;

sending, with the computing system, the at least one second message batch from the first source associated with the first participant to the first destination associated with the second participant via each of the one or more intermediate nodes over the network via the message brokering system; and extracting, with the computing system, the requested data from the payload portions of the at least one second message batch after the first destination associated with the second participant has received the at least one second message batch via the message brokering system.

6. The method of claim 5, wherein the one or more intermediate nodes comprise one or more of at least one first intermediate node each associated with a third participant among a plurality of third participants listed in a contact list of the first participant, at least one second intermediate node each associated with a fourth participant among a plurality of fourth participants listed in a contact list of the second participant, or at least one third intermediate node each associated with one of a fourth participant among a plurality of fourth participants listed in a contact list of a third participant or a fifth participant among a plurality of fifth participants listed in a contact list of a fourth participant.

7. The method of claim 6, wherein the one or more intermediate nodes comprise one or more fourth intermediate nodes each not associated with any contact lists of the first participant, the second participant, and the third participants.

8. The method of claim 5, wherein sending the at least one second message batch from the first source associated with the first participant to the first destination associated with the second participant via each of the one or more intermediate nodes over the network via the message brokering system comprises:

causing, with the computing system, the first source to publish the at least one second message batch;

causing, with the computing system, each of the one or more intermediate nodes, in turn, to subscribe to the at least one second message batch and to publish the at least one second message batch; and causing, with the computing system, the first destination to subscribe to the at least one second message batch.

9. The method of claim 2, wherein identifying a connection path between the first source associated with the first participant and the first destination associated with the second participant within the message brokering system comprises:

identifying, with the computing system, a plurality of different candidate connection paths between the first source associated with the first participant and the first destination associated with the second participant within the message brokering system, based on analysis of the map of messaging connections among the two or more nodes within the message brokering system;

determining, with the computing system, a bandwidth available over each sub-path for each candidate connection path among the plurality of different candidate connection paths between the first source associated with the first participant and the first destination associated with the second participant within the message brokering system; and selecting, with the computing system, a candidate connection path among the plurality of different candidate connection paths that best matches available bandwidth across each sub-path of the candidate connection path.

10. The method of claim 2, wherein identifying a connection path between the first source associated with the first participant and the first destination associated with the second participant within the message brokering system comprises:

identifying, with the computing system, a plurality of different candidate connection paths between the first source associated with the first participant and the first destination associated with the second participant within the message brokering system, based on analysis of the map of messaging connections among the two or more nodes within the message brokering system;

determining, with the computing system, at least one of a message transfer latency or a message transfer length over each sub-path for each candidate connection path among the plurality of different candidate connection paths between the first source associated with the first participant and the first destination associated with the second participant within the message brokering system; and selecting, with the computing system, a candidate connection path among the plurality of different candidate connection paths that provides the most optimal connection path between the first source associated with the first participant and the first destination associated with the second participant within the message brokering system in terms of at least one of time or distance.

11. The method of claim 2, wherein encapsulating the first information, the second information, and the third information in the header portion of each of at least one first message batch and encapsulating the requested data distributed amongst payload portions of each of the at least one first message batch occurs at layer 7 or application layer of open systems interconnection ("OSI") model.

12. The method of claim 2, further comprising:

determining, with the computing system, whether the requested data comprises one or more sub-data having different priority levels; and based on a determination that one or more sub-data of the requested data have different priority levels, identifying, with the computing system, one or more first sub-data among the one or more sub-data that has the highest priority;

wherein sending the at least one first message batch from the first source associated with the first participant to the first destination associated with the second participant over the network via the message brokering system over the identified connection path comprises sending, with the computing system, the identified one or more first sub-data having the highest priority ahead of the other sub-data among the one or more sub-data via the message brokering system over the identified connection path.

13. The method of claim 2, wherein the plurality of participants are people, and wherein the plurality of nodes comprise one of one or more user devices each associated with a participant, one or more proxy devices each associated with a participant, one or more virtual devices each associated with a participant, or one or more user accounts each associated with a participant.

14. The method of claim 2, wherein the plurality of participants or the plurality of nodes are connected devices, wherein the connected devices comprise at least one of one or more Internet of things ("IoT") or IoT-capable devices, one or more intelligence enabled things ("IET") tagged objects, one or more user devices, one or more user interface devices, one or more network devices, one or more kitchen appliances, one or more household devices, one or more environmental control systems, one or more landscape maintenance systems, one or more device maintenance systems, one or more cleaning devices, one or more office devices, one or more communications devices, one or more lighting systems, one or more tools, one or more vehicles, one or more drones, or one or more sensors.

15. The method of claim 2, wherein the plurality of nodes comprise at least one patient device each associated with a patient and at least one healthcare device each associated with one or more healthcare providers, wherein the one or more healthcare providers comprise at least one of a physician, a doctor, a surgeon, a nurse practitioner, a nurse, a medical assistant, a clinical receptionist, a pharmacist, a medical laboratory technician, a healthcare scheduler, or a health insurance agent.

16. The method of claim 15, wherein the at least one patient device comprises at least one of one or more health monitoring devices, one or more personal tracking devices, an insulin pump, a pace maker, a drug delivery device, a drug storage and dispensing device, or one or more patient user devices, wherein the at least one healthcare device comprises at least one of a healthcare server, an electronic medical record ("EMR") system, an electronic health record ("EHR") system, or one or more healthcare provider user devices.

17. The method of claim 15, wherein the first source comprises the at least one patient device, wherein the first destination comprises the at least one healthcare device, wherein the requested data comprises at least one of data regarding physiology of the patient, health tracking data of the patient, or data regarding a health alert associated with the patient.

18. The method of claim 15, wherein the first source comprises the at least one healthcare device, wherein the first destination comprises the at least one patient device, wherein the requested data comprises at least one of data regarding drug prescriptions for the patient, data regarding fitness regime, or data regarding diet.

19. A system, comprising:
a computing system, comprising:
at least one first processor; and
a first non-transitory computer readable medium communicatively coupled to the at least one first processor, the first non-transitory computer readable medium having stored thereon computer software comprising a first set of instructions that, when executed by the at least one first processor, causes the computing system to:
receive a request to transfer data from a first source to a first destination over a network;
map messaging connections among two or more nodes among a plurality of nodes within a message brokering system, each node among the plurality of nodes being associated with a participant among a plurality of participants in the message brokering system, wherein the first source is associated with a first participant among the plurality of participants and the first destination is associated with a second participant among the plurality of participants;
analyze a map of messaging connections among the two or more nodes within the message brokering system to identify a connection path between the first source associated with the first participant and the first destination associated with the second participant within the message brokering system;
encapsulate first information associated with at least one of the first participant or the first source, second information associated with at least one of the second participant or the first destination, and third information regarding data protocol in a header portion of each of at least one first message batch transported using the message brokering system;
encapsulate the requested data distributed amongst payload portions of each of the at least one first message batch transported using the message brokering system;
send the at least one first message batch from the first source associated with the first participant to the first destination associated with the second participant over the network via the message brokering system over the identified connection path; and
extract the requested data from the payload portions of the at least one first message batch after the first destination associated with the second participant has received the at least one first message batch via the message brokering system.

20. The system of claim 19, wherein the computing system comprises at least one of a computing system of the message brokering system, a controller of the message brokering system, a zookeeper of the message brokering system, a data routing computing system, a network routing computing system, a server computer, a distributed computing system, or a cloud computing system.

* * * * *